US012715144B2

(12) United States Patent
Hamilton

(10) Patent No.: US 12,715,144 B2
(45) Date of Patent: Aug. 25, 2026

(54) ROBOT TIDYING INTO NON-STANDARD CATEGORIES

(71) Applicant: Clutterbot, Inc., Claymont, DE (US)

(72) Inventor: Justin David Hamilton, Wellington (NZ)

(73) Assignee: Clutterbot, Inc., Claymont, DE (US)

( * ) Notice: Subject to any disclaimer, the term of this patent is extended or adjusted under 35 U.S.C. 154(b) by 138 days.

(21) Appl. No.: 18/590,153

(22) Filed: Feb. 28, 2024

(65) Prior Publication Data

US 2025/0269538 A1 Aug. 28, 2025

(51) Int. Cl.
*B25J 11/00* (2006.01)
*B25J 13/08* (2006.01)
(Continued)

(52) U.S. Cl.
CPC ........... *B25J 11/008* (2013.01); *B25J 13/089* (2013.01); *G05D 1/223* (2024.01); *G05D 1/2465* (2024.01);
(Continued)

(58) Field of Classification Search
CPC ....... B25J 11/008; B25J 13/089; G05D 1/223; G05D 1/2465; G05D 2101/20; G05D 2105/10; G05D 2107/40; G06T 7/10; G06T 7/74; G06T 2207/10016; G06T 2207/10028; G06T 2207/20092; G06T 2207/30244; G06V 10/757; G06V 10/758; G06V 10/945; G06V 20/41; G06V 20/49; G06V 20/50; G06V 20/70; G06V 2201/10;
(Continued)

(56) References Cited

U.S. PATENT DOCUMENTS 6,338,013 B1 1/2002 Ruffner
6,810,305 B2 10/2004 Kirkpatrick, Jr.
(Continued)

FOREIGN PATENT DOCUMENTS

AU 2015218522 A1 9/2015
AU 2020101865 A4 10/2020
(Continued)

OTHER PUBLICATIONS

Bahl, Laavanye et al. "Cu Bi: Room De cluttering Robot". May 2019. Retrieved from the Internet (Year: 2019) Carnegie Mellon University pp. 1-29.
(Continued)

*Primary Examiner* — Jason Holloway
*Assistant Examiner* — Benjamin J Brosh
(74) *Attorney, Agent, or Firm* — Carenlian Law, LLC

(57) ABSTRACT

A method and computing apparatus are disclosed for allowing a tidying robot to organize objects into non-standard categories that match a user's needs. The tidying robot navigates an environment using cameras to map the type, size, and location of toys, clothing, obstacles, furniture, structural elements, and other objects. The robot comprises a neural network to determine the type, size, and location of objects based on input from a sensing system. An augmented reality view allows user interaction to refine and customize areas within the environment to be tidied, object categories, object home locations, and operational task rules controlling robot operations.

20 Claims, 32 Drawing Sheets

(51) Int. Cl.

| | |
|---|---|
| ***G05D 1/223*** | (2024.01) |
| ***G05D 1/246*** | (2024.01) |
| ***G06T 7/10*** | (2017.01) |
| ***G06T 7/73*** | (2017.01) |
| ***G06V 10/75*** | (2022.01) |
| ***G06V 10/94*** | (2022.01) |
| ***G06V 20/40*** | (2022.01) |
| ***G06V 20/50*** | (2022.01) |
| ***G06V 20/70*** | (2022.01) |
| *G05D 101/20* | (2024.01) |
| *G05D 105/10* | (2024.01) |
| *G05D 107/40* | (2024.01) |

(52) U.S. Cl.

CPC .................. *G06T 7/10* (2017.01); *G06T 7/74* (2017.01); *G06V 10/757* (2022.01); *G06V 10/945* (2022.01); *G06V 20/41* (2022.01); *G06V 20/49* (2022.01); *G06V 20/50* (2022.01); *G06V 20/70* (2022.01); *G05D 2101/20* (2024.01); *G05D 2105/10* (2024.01); *G05D 2107/40* (2024.01); *G06T 2207/10016* (2013.01); *G06T 2207/10028* (2013.01); *G06T 2207/20092* (2013.01); *G06T 2207/30244* (2013.01)

(58) Field of Classification Search

CPC ........ G06V 20/20; G06V 20/52; G06V 20/10; G06V 10/82; G06V 20/46; G06F 16/55; G06F 16/75

See application file for complete search history.

(56) References Cited

U.S. PATENT DOCUMENTS

| | | | |
|---|---|---|---|
| 9,089,969 | B1 | 7/2015 | Theobald |
| 9,827,677 | B1 | 11/2017 | Gilbertson et al. |
| 9,827,678 | B1 | 11/2017 | Gilbertson et al. |
| 10,207,408 | B1 | 2/2019 | Ebrahimi Afrouzi |
| 11,020,858 | B2 | 6/2021 | Amacker et al. |
| 11,407,118 | B1 | 8/2022 | Augenbraun et al. |
| 11,409,296 | B1 | 8/2022 | Kim et al. |
| 11,720,117 | B1 | 8/2023 | Kim et al. |
| 11,789,457 | B1 | 10/2023 | Woo et al. |
| 12,064,880 | B2 | 8/2024 | Hamilton et al. |
| 12,287,639 | B1 * | 4/2025 | Queiroz ............... G05D 1/0238 |
| 12,310,545 | B1 | 5/2025 | Hamilton |
| 2002/0116089 | A1 | 8/2002 | Kirkpatrick, Jr. |
| 2006/0116973 | A1 | 6/2006 | Okamoto et al. |
| 2007/0239315 | A1 | 10/2007 | Sato et al. |
| 2009/0137348 | A1 | 5/2009 | Tsai |
| 2016/0260161 | A1 | 9/2016 | Atchley et al. |
| 2017/0329333 | A1 | 11/2017 | Passot et al. |
| 2018/0104815 | A1 | 4/2018 | Yang |
| 2018/0284792 | A1 | 10/2018 | Kleiner et al. |
| 2018/0312095 | A1 | 11/2018 | Eletrabi |
| 2018/0329425 | A1 | 11/2018 | Watts |
| 2019/0217476 | A1 | 7/2019 | Jiang et al. |
| 2020/0026301 | A1 | 1/2020 | Taylor |
| 2020/0086182 | A1 | 3/2020 | New et al. |
| 2020/0156246 | A1 | 5/2020 | Srivastav |
| 2020/0279436 | A1 | 9/2020 | Bleyer et al. |
| 2020/0376675 | A1 * | 12/2020 | Bai ........................... G06T 5/94 |
| 2021/0038950 | A1 | 2/2021 | Sullivan |
| 2021/0069904 | A1 | 3/2021 | Duan et al. |
| 2021/0128989 | A1 | 5/2021 | Legg et al. |
| 2021/0132213 | A1 | 5/2021 | Advani et al. |
| 2021/0138311 | A1 | 5/2021 | Wang et al. |
| 2021/0339393 | A1 | 11/2021 | Dan |
| 2021/0373560 | A1 | 12/2021 | Koga et al. |
| 2022/0168893 | A1 | 6/2022 | Hamilton et al. |
| 2022/0171907 | A1 | 6/2022 | Chang et al. |
| 2022/0253056 | A1 | 8/2022 | Ranjan et al. |
| 2022/0398775 | A1 | 12/2022 | Streem et al. |
| 2023/0015751 | A1 * | 1/2023 | Serackis ................. G06T 7/251 |
| 2023/0116896 | A1 | 4/2023 | Hamilton et al. |
| 2023/0206755 | A1 | 6/2023 | Jha et al. |
| 2023/0401837 | A1 * | 12/2023 | Yan ......................... G06T 15/06 |
| 2024/0142994 | A1 * | 5/2024 | Ebrahimi Afrouzi ... A47L 11/30 |
| 2024/0192690 | A1 | 6/2024 | Ebrahimi Afrouzi et al. |
| 2024/0218863 | A1 | 7/2024 | Eletrabi et al. |
| 2024/0292990 | A1 | 9/2024 | Hamilton |
| 2024/0424355 | A1 | 12/2024 | Zhang et al. |
| 2024/0428560 | A1 * | 12/2024 | Buerkle ................ G06V 20/70 |

FOREIGN PATENT DOCUMENTS

| | | | |
|---|---|---|---|
| AU | 2022360549 | A1 | 5/2024 |
| CN | 202526850 | U | 11/2012 |
| CN | 107137890 | A | 9/2017 |
| CN | 107378958 | A | 11/2017 |
| CN | 107650147 | A | 2/2018 |
| CN | 108217183 | A | 6/2018 |
| CN | 108786065 | A | 11/2018 |
| CN | 110558900 | A | 12/2019 |
| CN | 210616549 | U | 5/2020 |
| CN | 111633627 | A | 9/2020 |
| CN | 112828847 | A | 5/2021 |
| CN | 114468859 | A | 5/2022 |
| CN | 218552245 | U | 3/2023 |
| CN | 116616642 | A | 8/2023 |
| CN | 116709962 | A | 9/2023 |
| CN | 117442132 | A | 1/2024 |
| DE | 102017112740 | A1 | 12/2018 |
| EP | 1942223 | B1 | 7/2008 |
| EP | 3766591 | A1 | 1/2021 |
| JP | 2019092999 | A | 6/2019 |
| JP | 2020138046 | A | 9/2020 |
| JP | 2023052271 | A | 4/2023 |
| KR | 1020190130941 | | 11/2019 |
| KR | 20200126036 | A | 11/2020 |
| KR | 20230139407 | A | 10/2023 |
| KR | 20240133919 | A | 9/2024 |
| WO | 2012103525 | A2 | 8/2012 |
| WO | 2016105702 | A1 | 6/2016 |
| WO | 2019126332 | A1 | 6/2019 |
| WO | 2020071669 | A1 | 4/2020 |
| WO | 2020190272 | A1 | 9/2020 |
| WO | 2022029730 | A1 | 2/2022 |
| WO | 2022115761 | A1 | 6/2022 |
| WO | 2023031620 | A1 | 3/2023 |
| WO | 2023060285 | A1 | 4/2023 |
| WO | 2023110103 | A1 | 6/2023 |
| WO | 2025184405 | A1 | 9/2025 |

OTHER PUBLICATIONS

FSP2024PCT PCT/US2022/077917 International Search Report dated Jan. 25, 2023.

FSP2024PCT PCT/US2022/077917 Written Opinion of the ISA Date of Mailing Jan. 25, 2023.

Official Action Translation from Japanese Patent Office dated Apr. 2, 2024 for application JP 2023-533262 100107766.

PCT/US2021/061143 International Search Report Feb. 8, 2022.

PCT/US2021/061143 Written Opinion of the International Searching Authority Feb. 6, 2022.

U.S. Appl. No. 63/119,533, filed Nov. 30, 2020, Justin David Hamilton.

Bahl, Laavanye et al. "Cu Bi: A Decluttering Robot". Dec. 2018. Retrieved from the Internet (Year: 2018).

Bahl, Laavanye et al. "Cu Bi: Room De cluttering Robot". May 2019. Retrieved from the Internet (Year: 2019).

CuBi: Room Decluttering Robot May 2019) (chromeextension://efaidnbmnnnibpcajpcglclefindmkaj/https://mrsdprojects.ri.cmu.edu/2018teamd/wpcontent/uploads/sites/34/2019/12/TeamD_FinalReport 10.pdf).

China National Intellectual Property Administration Application No. 202180080246.2 filing date May 30, 2023 First Office Action, entire document dated Nov. 3, 2025.

(56) References Cited

OTHER PUBLICATIONS

China National Intellectual Property Administration Application No. 202180080246.2 filing date May 30, 2023 First Office Action, entire document dated Nov. 3, 2025 translation.
Changsheng Shen (Bobby), "CMU MRSD 2020: Team D—Cu Bi—A Decluttering Robot," YouTube, Dec. 10, 2019. https://www.youtube.com/watch?v=IA-MaF _m8QA (accessed Jan. 19, 2026). (Year: 2019).
Gonzalez et al., Multi-Li DAR Mapping for Scene Segmentation in Indoor Environments for Mobile Robots, May 2022, MDPI, pp. 1-19. (Year: 2022).
Canberk Alper et al: "Cloth Funnels: Canonicalized-Alignment for Multi-Purpose Garment Manipulation", 2023 IEEE International Conference on Robotics and Automation (ICRA), IEEE, May 29, 2023 (May 29, 2023), pp. 5872-5879.
Guanqi Chen et al: "Language-Augmented Symbolic Planner for Open-world Task Planning", arxiv.org, Cornell University Library, Jul. 13, 2024.
PCT/US25/43792, International Search Report, Dec. 10, 2025.
PCT/US25/43792, Written Opinion, Dec. 10, 2025.
PCT/US25/43802, International Search Report, Dec. 16, 2025.
PCT/US25/43802, Written Opinion, Dec. 16, 2025.
PCT/US25/43805, International Search Report, Dec. 16, 2025.
PCT/US25/43805, Written Opinion, Dec. 16, 2025.
PCT/US25/44087, International Search Report, Jan. 8, 2026.
PCT/US25/44087, Written Opinion, Jan. 8, 2026.
PCT/US25/44271, International Search Report, Jan. 5, 2026.
PCT/US25/44271, Written Opinion, Jan. 5, 2026.
PCT/US25/44310, International Search Report, Nov. 27, 2025.
PCT/US25/44310, Written Opinion, Nov. 27, 2025.
PCT/US25/44316, ISR, Jan. 8, 2026.
PCT/US25/44316, Written Opinion, Jan. 8, 2026.
PCT/US25/44322, ISR, Dec. 11, 2025.
PCT/US25/44322, Written Opinion, Dec. 11, 2025.
PCT/US25/44326, ISR, Dec. 15, 2025.
PCT/US25/44326, Written Opinion, Dec. 15, 2025.
Tsurumine Yoshihisa et al: "Variationally Autoencoded Dynamic Policy Programming for Robotic Cloth Manipulation Planning based on Raw Images", 2022 IEEE/SICE International Symposium on System Integration (SII), IEEE, Jan. 9, 2022, pp. 416-421.

* cited by examiner

2400
Start
Process live video into a segmented view 2402
Use static objects to update the global map and localize the mobile device 2404
Uniquely identify movable objects 2406

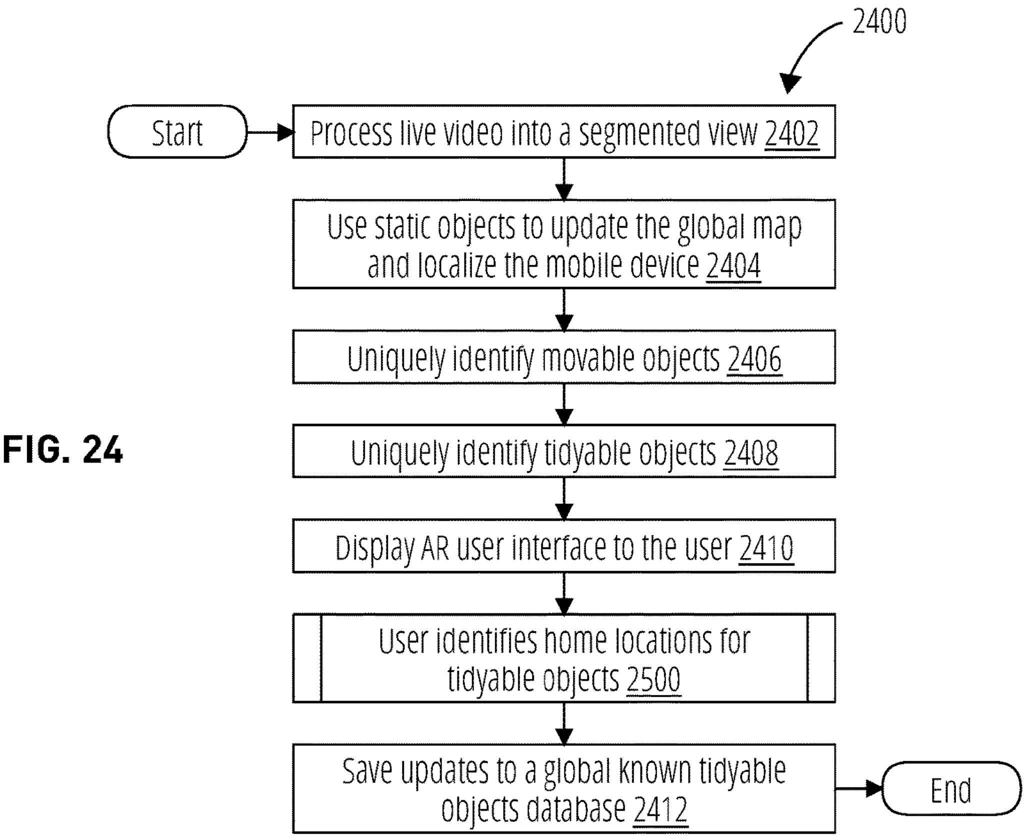

FIG. 24
Uniquely identify tidyable objects 2408
Display AR user interface to the user 2410
User identifies home locations for tidyable objects 2500
Save updates to a global known tidyable objects database 2412
End
2500
Select a displayed tidyable object 2502
Generate a list of suggested home locations 2504

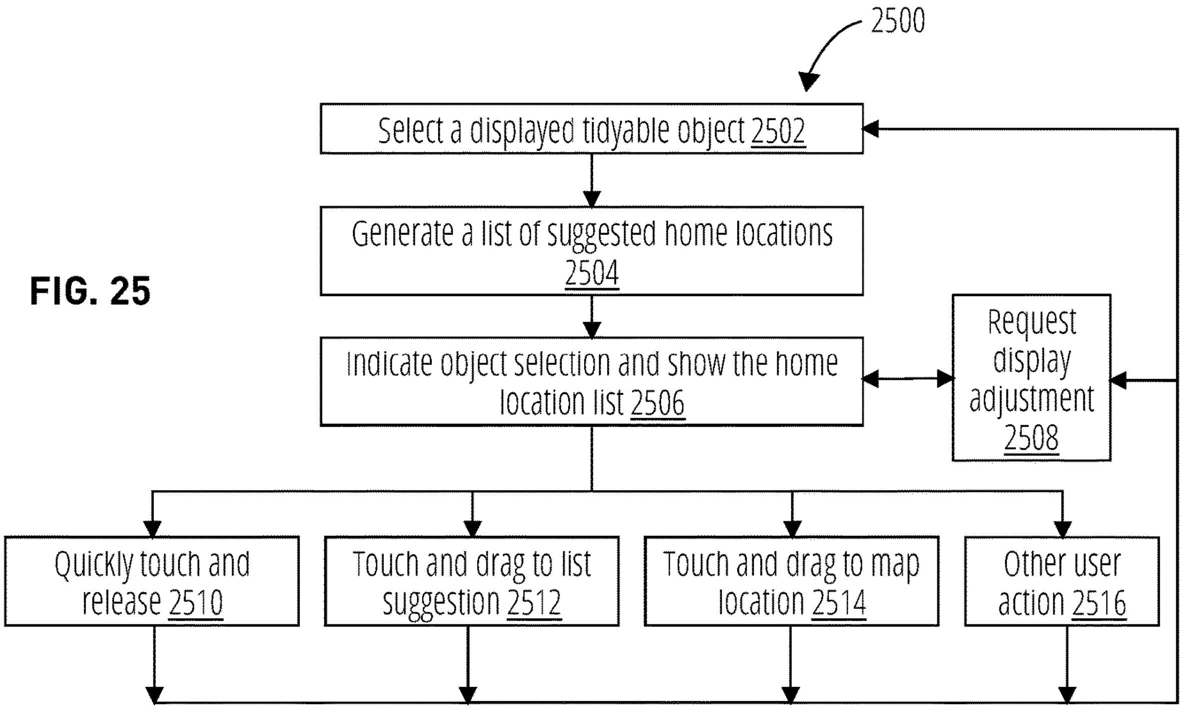

FIG. 25
Indicate object selection and show the home location list 2506
Request display adjustment 2508
Quickly touch and release 2510
Touch and drag to list suggestion 2512
Touch and drag to map location 2514
Other user action 2516

2600

ROBOT TIDYING INTO NON-STANDARD CATEGORIES

BACKGROUND

Objects underfoot represent not only a nuisance but also a safety hazard. Thousands of people each year are injured in a fall at home. A floor cluttered with loose objects may represent a danger, but many people have limited time in which to address the clutter in their homes. Automated cleaning or tidying robots may represent an effective solution.

Tidying robots conventionally organize objects into standard categories based on an object's type and other attributes that may be determined with classification. However, users often want objects organized into non-standard categories that cannot be determined using simple classification. Conventional approaches using, for example, a deep learning model on an image to perform classification, object detection, or similar, may be insufficient to meet users' needs.

As such, there is a need for an approach that allows tidying robots to organize objects into non-standard categories that match a user's needs.

BRIEF SUMMARY

In one aspect, a method is disclosed including receiving, at a mobile device camera, a live video feed capturing an environment to be tidied. The method also includes running a panoptic segmentation model to assign a semantic label, an instance identifier, and a movability attribute to each pixel in each image, thereby producing a segmented image for each scene. The method also includes detecting static objects, movable objects, and tidyable objects from each segmented image based on the movability attribute, where reidentification fingerprints are captured for each object identified in the segmented image. The method also includes removing the movable objects and the tidyable objects from each scene to create a static scene. The method also includes generating keypoints for the static scene. The method also includes generating a local static point cloud including a grid of points from inside of the static objects and the keypoints from the static scene. The method also includes comparing the reidentification fingerprints for each static object in the static scene against reidentification fingerprints for known static objects to detect visual matches to the known static objects, where the reidentification fingerprints for the known static objects are stored in a global database in communication with the mobile device. The method also includes determining matches between the local static point cloud and a global point cloud using matching static objects and matching the keypoints from the static scene. The method also includes determining a current pose of the mobile device camera relative to a global map, where the global map is a previously saved map of the environment to be tidied. The method also includes merging the local static point cloud into the global point cloud and removing duplicates. The method also includes saving a location record for each static object to the global database, where the location record includes a timestamp and the location of each static object on the global map, on condition the location record for a static object is inconsistent with past location records stored in the global database for the static object, indicating that the static object has been moving generating an inconsistent static object location alert, providing the inconsistent static object location alert to a robotic control system of a tidying robot as feedback to the robotic control system to at least one of refine, simplify, streamline, and reduce an amount of data transferred to instruct the tidying robot to perform at least one robot operation, reclassifying the static object as a reclassified movable object by updating the movability attribute in the global database, and updating the global map to reflect the reclassified movable object. The method also includes prioritizing operational task rules based on at least one of the movability attributes and the updated movability attributes, thereby at least one of optimizing navigation of the tidying robot and increasing efficiency in power utilization by the tidying robot. The method also includes instructing the robotic control system of the tidying robot to perform the at least one robot operation utilizing the operational task rules and a robot instruction database.

In another aspect, a computing apparatus is disclosed configured to perform the method described above.

In another aspect, a method is disclosed including receiving, at a mobile device camera, a live video feed capturing an environment to be tidied, where the mobile device is one of a mobile computing device operated by a user and a tidying robot. The method also includes processing the live video feed, the live video feed includes images of scenes, to display an augmented reality view to the user of a global map of the environment to be tidied. The method also includes running a panoptic segmentation model to assign a semantic label, an instance identifier, and a movability attribute to each pixel in each image, thereby producing a segmented image for each scene. The method also includes separating, from the segmented image for each scene, static objects from movable objects and tidyable objects. The method also includes generating reidentification fingerprints, in each scene, for each static object, each movable object, and each tidyable object. The method also includes placing the reidentification fingerprints into a global database including known static objects, known movable objects, and known tidyable objects. The method also includes generating keypoints for a static scene with each movable object and each tidyable object removed. The method also includes determining a basic room structure using segmentation, where the basic room structure includes at least one of a floor, a wall, and a ceiling. The method also includes determining an initial pose of the mobile device camera relative to a floor plane. The method also includes generating a local static point cloud including a grid of points from inside of the static objects and the keypoints from the static scene. The method also includes comparing each static object in the static scene against the global database to find a visual match to the known static objects using the reidentification fingerprints. The method also includes determining matches between the local static point cloud and a global point cloud using matching static objects and matching the keypoints from the static scene. The method also includes determining a current pose of the mobile device camera relative to the global map, where the global map is a previously saved map of the environment to be tidied. The method also includes merging the local static point cloud into the global point cloud and removing duplicates. The method also includes updating the current pose of the mobile device camera on the global map. The method also includes saving, to the global database, a location of each static object on the global map and a timestamp. The method also includes updating the global database with an expected location of each static object on the global map based on past location records, on condition the past location records are inconsistent for a static object indicating that the static object has been moving generating an inconsistent static object location alert, providing the inconsistent static object location alert to a robotic control system of the tidying robot as feedback to the robotic control system to at least one of refine, simplify, streamline, and reduce an amount of data transferred to instruct the tidying robot to perform at least one robot operation, reclassifying the static object as a reclassified movable object by updating the movability attribute in the global database, and updating the global map to reflect the reclassified movable object. The method also includes generating a local movable point cloud using a center coordinate of each movable object. The method also includes using the current pose of the mobile device camera on the global map to convert the local movable point cloud to a global coordinate frame. The method also includes comparing each movable object in the scene against the global database to find a visual match to the known movable objects using the reidentification fingerprints. The method also includes saving, to the global database, the location of each movable object on the global map and the timestamp. The method also includes generating a local tidyable point cloud using a center coordinate of each tidyable object. The method also includes using the current pose of the mobile device camera on the global map to convert the local tidyable point cloud to a global coordinate frame. The method also includes comparing each tidyable object in the scene against the global database to find a visual match to the known tidyable objects using the reidentification fingerprints. The method also includes saving, to the global database, a location of each tidyable object on the global map and the timestamp. The method also includes determining a bounded area on the global map by at least one of receiving a bounded area selection signal from the user. The method also includes detecting areas bounded by static objects. The method also includes on condition the past location records are inconsistent for a static object indicating that the static object has been moving determining a label for the bounded area to create a named bounded area by at least one of receiving a label selection signal from the user. The method also includes generating the label based on at least one of the static objects, the movable objects, and the tidyable objects identified in the bounded area. The method also includes on condition the past location records are inconsistent for a static object indicating that the static object has been moving determining a bounded area on the global map by at least one of defining at least one operational task rule that is an area-based rule using the named bounded area, where the area-based rule is at least one of a time rule controlling performance of the at least one robot operation based on the timestamp. The method also includes an object rule controlling the performance of the at least one robot operation based on detecting a specific tidyable object. The method also includes a category rule controlling the performance of the at least one robot operation based on detecting a tidyable object of a specific category. The method also includes where the area-based rule controls the performance of the at least one robot operation when the tidying robot is located in the named bounded area. The method also includes on condition the past location records are inconsistent for a static object indicating that the static object has been moving determining a bounded area on the global map by at least one of determining a label for the bounded area to create a named bounded area by at least one of prioritizing operational task rules based on at least one of the movability attributes and the updated movability attributes, thereby at least one of optimizing navigation of the tidying robot and increasing efficiency in power utilization by the tidying robot. The method also includes on condition the past location records are inconsistent for a static object indicating that the static object has been moving determining a bounded area on the global map by at least one of determining a label for the bounded area to create a named bounded area by at least one of instructing the tidying robot to perform the at least one robot operation utilizing the operational task rules and a robot instruction database.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 24 illustrates an AR user routine 2400 in accordance with one embodiment.

FIG. 25 illustrates a tidyable object home location identification routine 2500 in accordance with one embodiment.

DETAILED DESCRIPTION

Figure 1A:
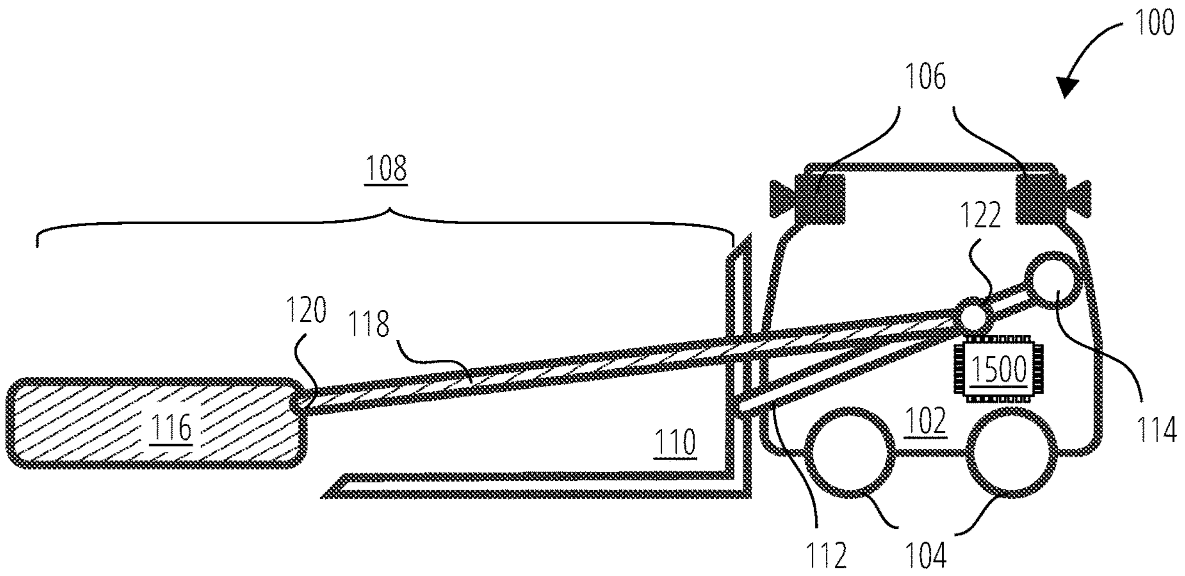
FIG. 1A-FIG. 1D illustrate aspects of a robot 100 in accordance with one embodiment.

Embodiments of a robotic system are disclosed that operate a robot to navigate an environment using cameras to map the type, size, and location of toys, clothing, obstacles, and other objects. The robot comprises a neural network to determine the type, size, and location of objects based on input from a sensing system, such as images from a forward camera, a rear camera, forward and rear left/right stereo cameras, or other camera configurations, as well as data from inertial measurement unit (IMU), lidar, odometry, and actuator force feedback sensors. The robot chooses a specific object to pick up, performs path planning, and navigates to a point adjacent to and facing the target object. Actuated pusher pad arms move other objects out of the way and maneuver pusher pads to move the target object onto a scoop to be carried. The scoop tilts up slightly and, if needed, pusher pads may close in front to keep objects in place, while the robot navigates to the next location in the planned path, such as the deposition destination.

In some embodiments, the system may include a robotic arm to reach and grasp elevated objects and move them down to the scoop. A companion "portable elevator" robot may also be utilized in some embodiments to lift the main robot up onto countertops, tables, or other elevated surfaces, and then lower it back down onto the floor. Some embodiments may utilize an up/down vertical lift (e.g., a scissor lift) to change the height of the scoop when dropping items into a container, shelf, or other tall or elevated location.

Some embodiments may also utilize one or more of the following components:

- Left/right rotating brushes on actuator arms that push objects onto the scoop
- An actuated gripper that grabs objects and moves them onto the scoop
- A rotating wheel with flaps that push objects onto the scoop from above.
- One servo or other actuator to lift the front scoop up into the air and another separate actuator that tilts the scoop forward and down to drop objects into a container
- A variation on a scissor lift that lifts the scoop up and gradually tilts it backward as it gains height
- Ramps on the container with the front scoop on a hinge so that the robot just pushes items up the ramp such that the objects drop into the container with gravity at the top of the ramp
- A storage bin on the robot for additional carrying capacity such that target objects are pushed up a ramp into the storage bin instead of using a front scoop and the storage bin tilts up and back like a dump truck to drop items into a container The robotic system may be utilized for automatic organization of surfaces where items left on the surface are binned automatically into containers on a regular schedule. In one specific embodiment, the system may be utilized to automatically neaten a children's play area (e.g., in a home, school, or business) where toys and/or other items are automatically returned to containers specific to different types of objects after the children are done playing. In other specific embodiments, the system may be utilized to automatically pick clothing up off the floor and organize the clothing into laundry basket(s) for washing, or to automatically pick up garbage off the floor and place it into a garbage bin or recycling bin(s), e.g., by type (plastic, cardboard, glass). Generally, the system may be deployed to efficiently pick up a wide variety of different objects from surfaces and may learn to pick up new types of objects.

A solution is disclosed that allows tidying robots such as are described above to organize objects into non-standard categories that match a user's needs. Examples of tasks based on non-standard categories that a user may wish the robot to perform may include:

- Understanding ownership of objects such as what toys belong to what child and hence what bedroom those toys are to be placed in.
- Understanding that users may want objects organized into non-standard categories that are not predefined such as having one bin for normal LEGO and one bin for pink LEGO.
- Understanding what housewares belong in the kitchen and what housewares belong in the kids' play area as toys.
- Understanding what objects are considered garbage, what objects are considered recycling, and what objects are to be placed in a bin for arts and crafts.
- Understanding custom user-created categories such as keeping Disney princesses separate from other dolls or figurines.
- Understanding how organizational systems may evolve over time such as placing snowman and Santa stuffed toys on a shelf in December, placing pumpkin and black cat stuffed toys on a shelf in October, or placing bunny rabbit stuffed toys on a shelf in April.

Understanding how some toys are to be left out for an activity while other toys are to be put away in a bin.

Understanding how some objects are to be left in a place that's accessible while putting other objects away in storage such as leaving out a set of clean clothing to wear the next day but putting most clean clothing away on a shelf or in the closet.

Understanding when it is to tidy and vacuum an area after people have gone away, and situations where it is to stop tidying and vacuuming if people enter the area. For example, tidying and vacuuming after dinner but stopping if people come back into the dining room for dessert.

Learning to tidy and organize based on non-standard object attributes such as organizing striped socks separate from graphic pattern socks, or organizing crochet stuffed animals separate from sewn plushies.

A map of an indoor environment is generated that detects and separates objects (including structural elements) into three high-level categories based on how they may be moved and interacted with:

Static Objects: The term "Static object" in this disclosure refers to elements of a scene that are not expected to change over time, typically because they are rigid and immovable. Some composite objects may be split into a movable part and a static part. Examples include door frames, bookshelves, walls, countertops, floors, couches, dining tables, etc.

Movable Objects: The term "Movable object" in this disclosure refers to elements of the scene that are not desired to be moved by the robot (e.g., because they are decorative, too large, or attached to something), but that may be moved or deformed in the scene due to human influence. Some composite objects may be split into a movable part and a static part. Examples include doors, windows, blankets, rugs, chairs, laundry baskets, storage bins, etc.

Tidyable Objects: The term "Tidyable object" in this disclosure refers to elements of the scene that may be moved by the robot and put away in a home location. These objects may be of a type and size such that the robot may autonomously put them away, such as toys, clothing, books, stuffed animals, soccer balls, garbage, remote controls, keys, cellphones, etc.

In situations where part of an object is rigidly fixed in the environment but another part may move (e.g., an oven with an oven door or a bed with a blanket), then the static and movable parts may be considered separate objects. Generally, structural non-moving elements of an indoor environment may be considered static along with heavy furniture that cannot be easily moved by a human.

Tidyable objects may need to be of an appropriate size, shape, and material such that they may be picked up and manipulated by a tidying robot. They may need to be non-breakable. They may also need to not be attached to other objects in a way that prevents them from being moved around by the tidying robot in the environment. For example, a light switch or power button are not tidyable.

This framework of classifying objects (including structural elements) from a visually detected environment as being static, movable, or tidyable may be used during initial robot setup, robot configuration, and robot operation.

Initial Robot Setup: Users may use an app on their mobile device with an augmented reality (AR) user interface to map the environment and choose an organizational system for tidyable objects. A home location for a tidyable object may be set to be inside a specific movable object (such as a bin or a drawer), or the home location may be set relative to a static object (such as next to a bed).

Robot Configuration: Users may use an app on their mobile device with an AR user interface to modify the organizational system being used for tidyable objects, such as changing the home location for a tidyable object to be in a drawer instead of a bin.

Robot Operation: The robot may use static objects (including structural elements) to localize itself in the environment while understanding that movable objects and tidyable objects may change locations. The robot may pick up and move tidyable objects in the environment in order to bring them to a home location and may interact with movable objects in the environment, such as placing a tidyable object in a bin or a drawer.

Figure 1B:
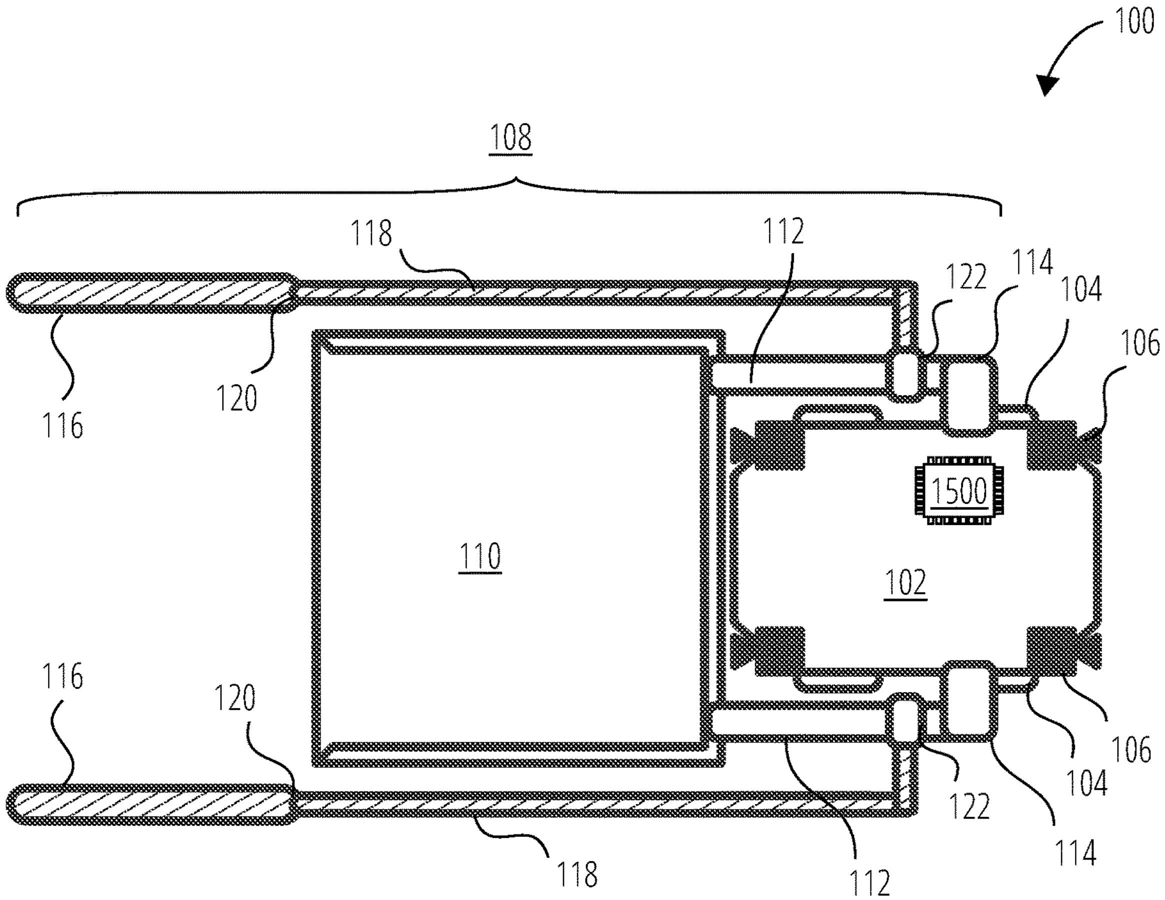

FIG. 1A through FIG. 1D illustrate a robot 100 in accordance with one embodiment. FIG. 1A illustrates a side view of the robot 100, and FIG. 1B illustrates a top view. The robot 100 may comprise a chassis 102, a mobility system 104, a sensing system 106, a capture and containment system 108, and a robotic control system 1500. The capture and containment system 108 may further comprise a scoop 110, a scoop arm 112, a scoop arm pivot point 114, two pusher pads 116, two pusher pad arms 118, and two pad arm pivot points 122.

The chassis 102 may support and contain the other components of the robot 100. The mobility system 104 may comprise wheels as indicated, as well as caterpillar tracks, conveyor belts, etc., as is well understood in the art. The mobility system 104 may further comprise motors, servos, or other sources of rotational or kinetic energy to impel the robot 100 along its desired paths. Mobility system 104 components may be mounted on the chassis 102 for the purpose of moving the entire robot without impeding or inhibiting the range of motion needed by the capture and containment system 108. Elements of a sensing system 106, such as cameras, lidar sensors, or other components, may be mounted on the chassis 102 in positions giving the robot 100 clear lines of sight around its environment in at least some configurations of the chassis 102, scoop 110, pusher pad 116, and pusher pad arm 118 with respect to each other.

The chassis 102 may house and protect all or portions of the robotic control system 1500, (portions of which may also be accessed via connection to a cloud server) comprising in some embodiments a processor, memory, and connections to the mobility system 104, sensing system 106, and capture and containment system 108. The chassis 102 may contain other electronic components such as batteries, wireless communication devices, etc., as is well understood in the art of robotics. The robotic control system 1500 may function as described in greater detail with respect to FIG. 15. The mobility system 104 and or the robotic control system 1500 may incorporate motor controllers used to control the speed, direction, position, and smooth movement of the motors. Such controllers may also be used to detect force feedback and limit maximum current (provide overcurrent protection) to ensure safety and prevent damage.

The capture and containment system 108 may comprise a scoop 110, a scoop arm 112, a scoop arm pivot point 114, a pusher pad 116, a pusher pad arm 118, a pad pivot point 120, and a pad arm pivot point 122. In some embodiments, the capture and containment system 108 may include two pusher pad arms 118, pusher pads 116, and their pivot points. In other embodiments, pusher pads 116 may attach directly to the scoop 110, without pusher pad arms 118. Such embodiments are illustrated later in this disclosure.

The geometry and of the scoop 110 and the disposition of the pusher pads 116 and pusher pad arms 118 with respect to the scoop 110 may describe a containment area, illustrated more clearly in FIG. 2A through FIG. 2E, in which objects may be securely carried. Servos, direct current (DC) motors, or other actuators at the scoop arm pivot point 114, pad pivot points 120, and pad arm pivot points 122 may be used to adjust the disposition of the scoop 110, pusher pads 116, and pusher pad arms 118 between fully lowered scoop and grabber positions and raised scoop and grabber positions, as illustrated with respect to FIG. 2A through FIG. 2C.

The point of connection shown between the scoop arms and pusher pad arms is an exemplary position and is not intended to limit the physical location of such points of connection. Such connections may be made in various locations as appropriate to the construction of the chassis and arms, and the applications of intended use.

In some embodiments, gripping surfaces may be configured on the sides of the pusher pads 116 facing inward toward objects to be lifted. These gripping surfaces may provide cushion, grit, elasticity, or some other feature that increases friction between the pusher pads 116 and objects to be captured and contained. In some embodiments, the pusher pad 116 may include suction cups in order to better grasp objects having smooth, flat surfaces. In some embodiments, the pusher pads 116 may be configured with sweeping bristles. These sweeping bristles may assist in moving small objects from the floor up onto the scoop 110. In some embodiments, the sweeping bristles may angle down and inward from the pusher pads 116, such that, when the pusher pads 116 sweep objects toward the scoop 110, the sweeping bristles form a ramp, allowing the foremost bristles to slide beneath the object, and direct the object upward toward the pusher pads 116, facilitating capture of the object within the scoop and reducing a tendency of the object to be pressed against the floor, increasing its friction and making it more difficult to move.

Figure 1C:
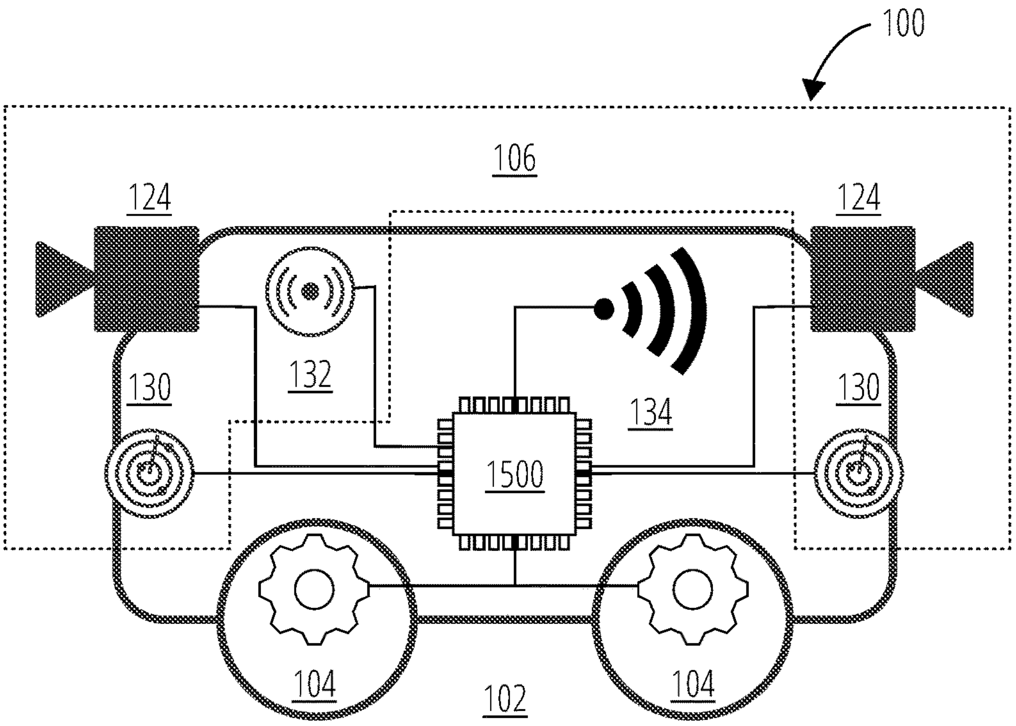
Figure 1D:
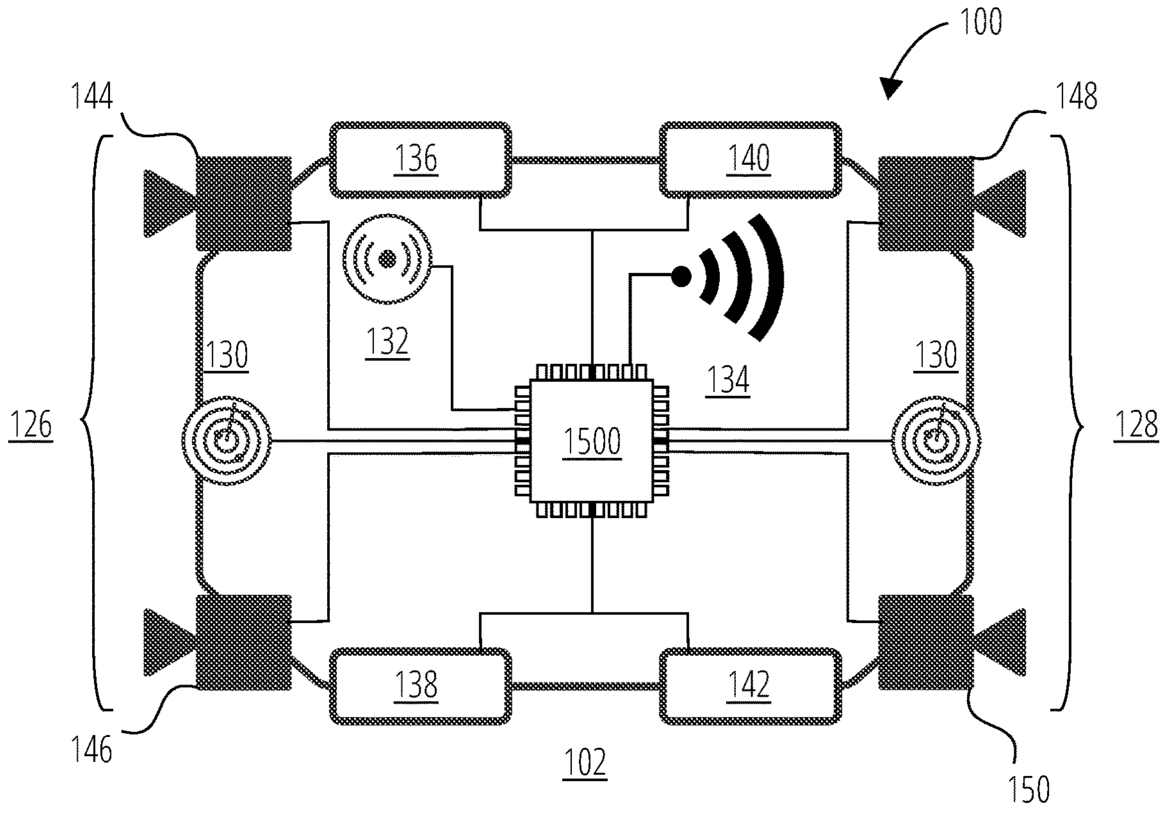

FIG. 1C and FIG. 1D illustrate a side view and top view of the chassis 102, respectively, along with the general connectivity of components of the mobility system 104, sensing system 106, and communications 134, in connection with the robotic control system 1500. In some embodiments, the communications 134 may include the network interface 1512 described in greater detail with respect to robotic control system 1500.

In one embodiment, the mobility system 104 may comprise a right front wheel 136, a left front wheel 138, a right rear wheel 140, and a left rear wheel 142. The robot 100 may have front-wheel drive, where right front wheel 136 and left front wheel 138 are actively driven by one or more actuators or motors, while the right rear wheel 140 and left rear wheel 142 spin on an axle passively while supporting the rear portion of the chassis 102. In another embodiment, the robot 100 may have rear-wheel drive, where the right rear wheel 140 and left rear wheel 142 are actuated and the front wheels turn passively. In another embodiment, each wheel may be actively actuated by separate motors or actuators.

The sensing system 106 may further comprise cameras 124 such as the front cameras 126 and rear cameras 128, light detecting and ranging (LIDAR) sensors such as lidar sensors 130, and inertial measurement unit (IMU) sensors, such as IMU sensors 132. In some embodiments, front camera 126 may include the front right camera 144 and front left camera 146. In some embodiments, rear camera 128 may include the rear left camera 148 and rear right camera 150.

Additional embodiments of the robot that may be used to perform the disclosed algorithms are illustrated in FIG. 2A through FIG. 2E, FIG. 3A through FIG. 3C, FIG. 4A through FIG. 4C, FIG. 5, FIG. 6A through FIG. 6D, FIG. 8, and FIG. 9.

Figure 2C:
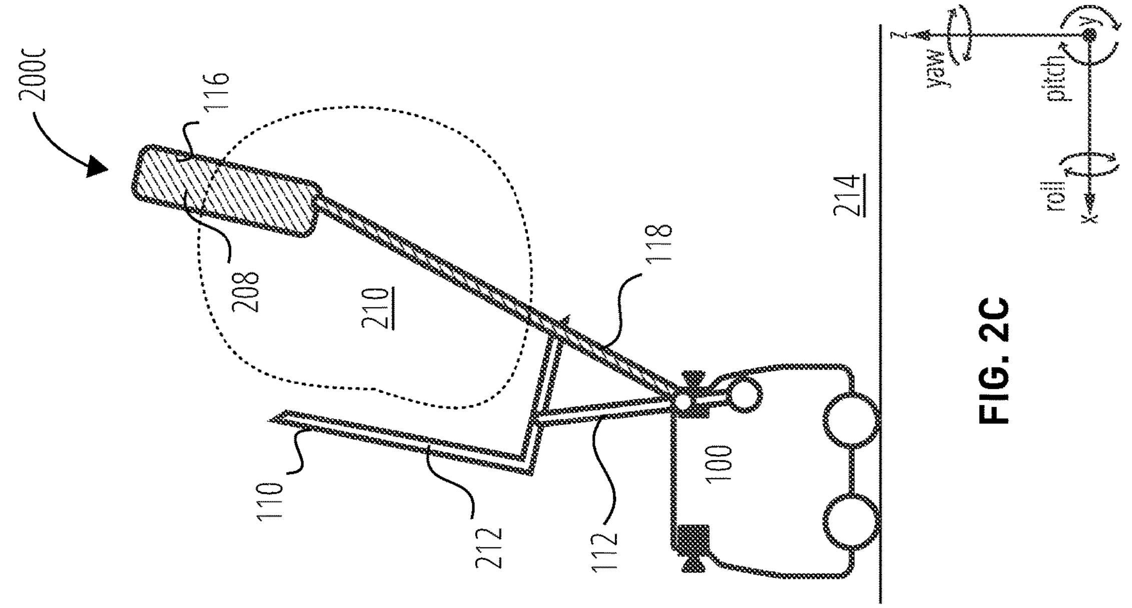
FIG. 2C illustrates a raised scoop position and raised pusher position 200*c* for the robot 100 in accordance with one embodiment.
Figure 2A:
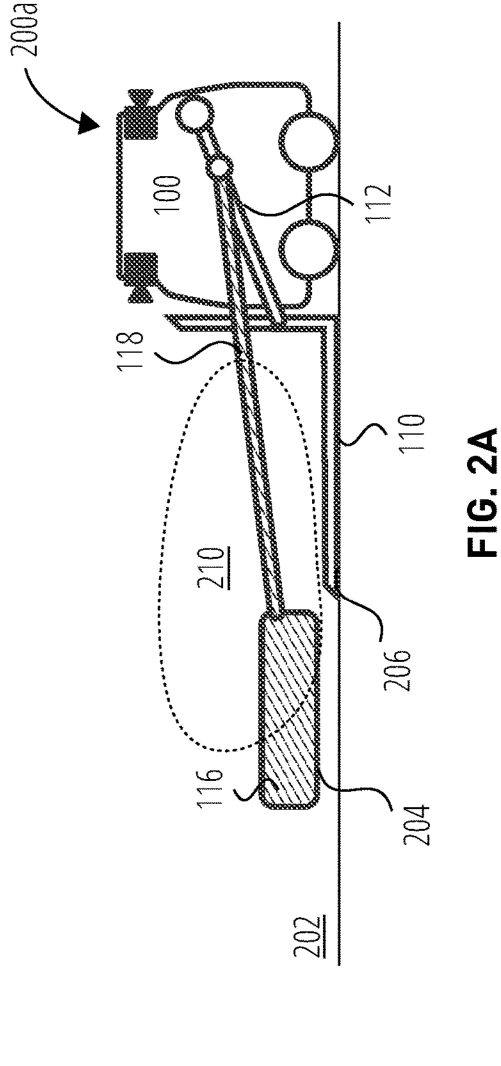
FIG. 2A illustrates a lowered scoop position and lowered pusher position 200*a* for the robot 100 in accordance with one embodiment.

FIG. 2A illustrates a robot 100 such as that introduced with respect to FIG. 1A disposed in a lowered scoop position and lowered pusher position 200*a*. In this configuration, the pusher pads 116 and pusher pad arms 118 rest in a lowered pusher position 204, and the scoop 110 and scoop arm 112 rest in a lowered scoop position 206 at the front 202 of the robot 100. In this position, the scoop 110 and pusher pads 116 may roughly describe a containment area 210 as shown.

Figure 2B:
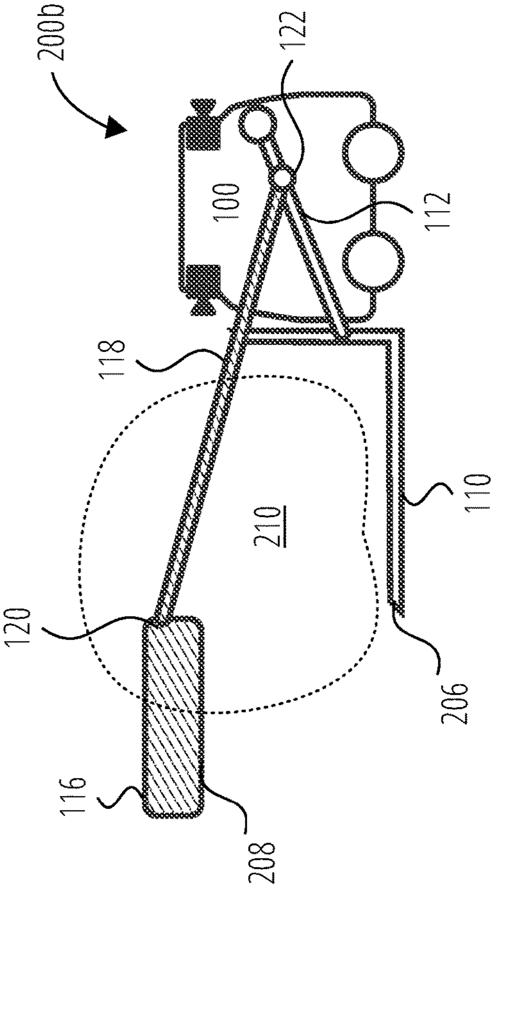
FIG. 2B illustrates a lowered scoop position and raised pusher position 200*b* for the robot 100 in accordance with one embodiment.

FIG. 2B illustrates a robot 100 with a lowered scoop position and raised pusher position 200*b*. Through the action of servos or other actuators at the pad pivot points 120 and pad arm pivot points 122, the pusher pads 116 and pusher pad arms 118 may be raised to a raised pusher position 208 while the scoop 110 and scoop arm 112 maintain a lowered scoop position 206. In this configuration, the pusher pads 116 and scoop 110 may roughly describe a containment area 210 as shown, in which an object taller than the scoop 110 height may rest within the scoop 110 and be held in place through pressure exerted by the pusher pads 116.

Figure 5:
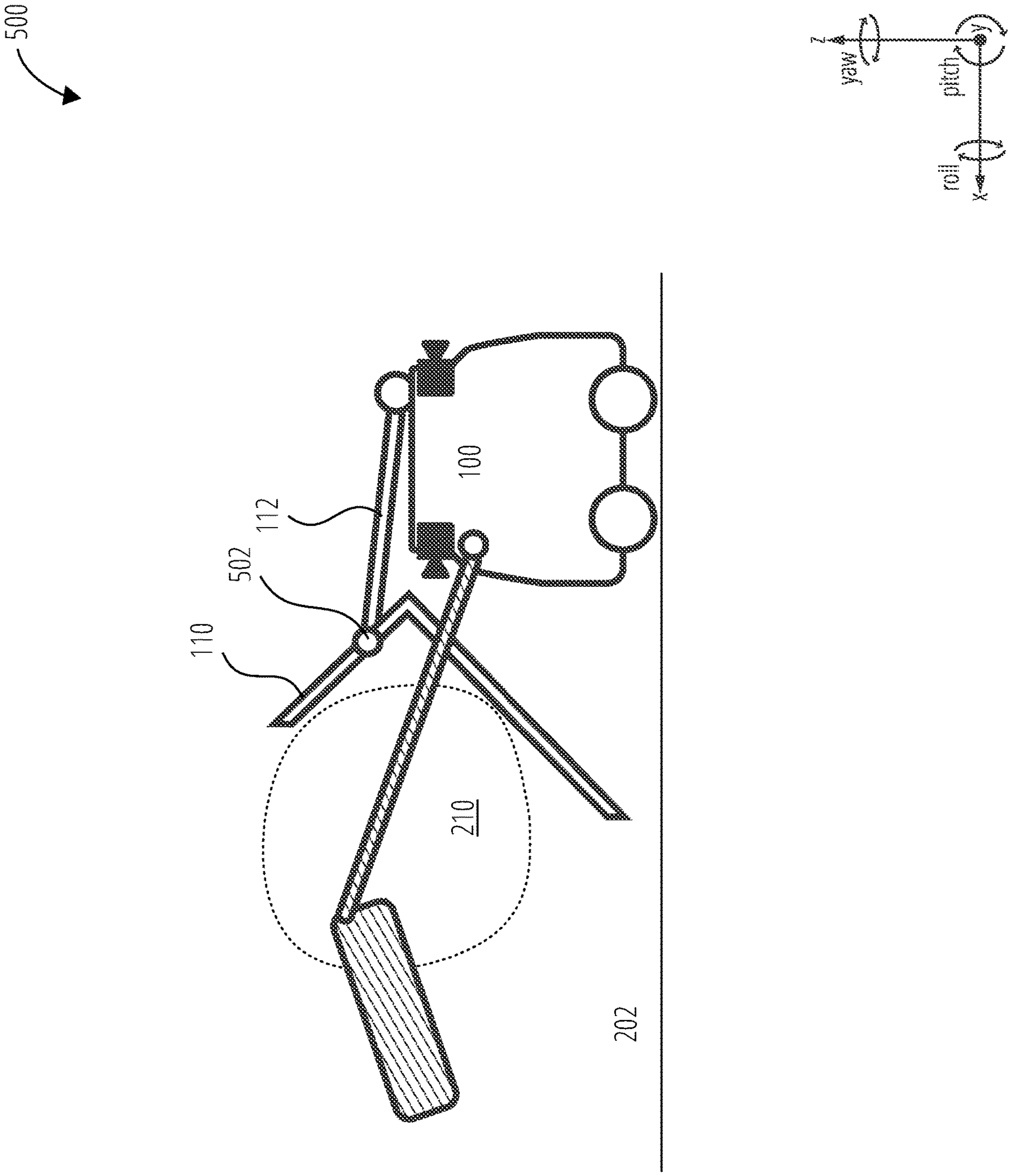
FIG. 5 illustrates a front drop position 500 for the robot 100 in accordance with one embodiment.

Pad arm pivot points 122, pad pivot points 120, scoop arm pivot points 114 and scoop pivot points 502 (as shown in FIG. 5) may provide the robot 100 a range of motion of these components beyond what is illustrated herein. The positions shown in the disclosed figures are illustrative and not meant to indicate the limits of the robot's component range of motion.

FIG. 2C illustrates a robot 100 with a raised scoop position and raised pusher position 200*c*. The pusher pads 116 and pusher pad arms 118 may be in a raised pusher position 208 while the scoop 110 and scoop arm 112 are in a raised scoop position 212. In this position, the robot 100 may be able to allow objects drop from the scoop 110 and pusher pad arms 118 to an area at the rear 214 of the robot 100.

The carrying position may involve the disposition of the pusher pads 116, pusher pad arms 118, scoop 110, and scoop arm 112, in relative configurations between the extremes of lowered scoop position and lowered pusher position 200*a* and raised scoop position and raised pusher position 200*c*.

Figure 2D:
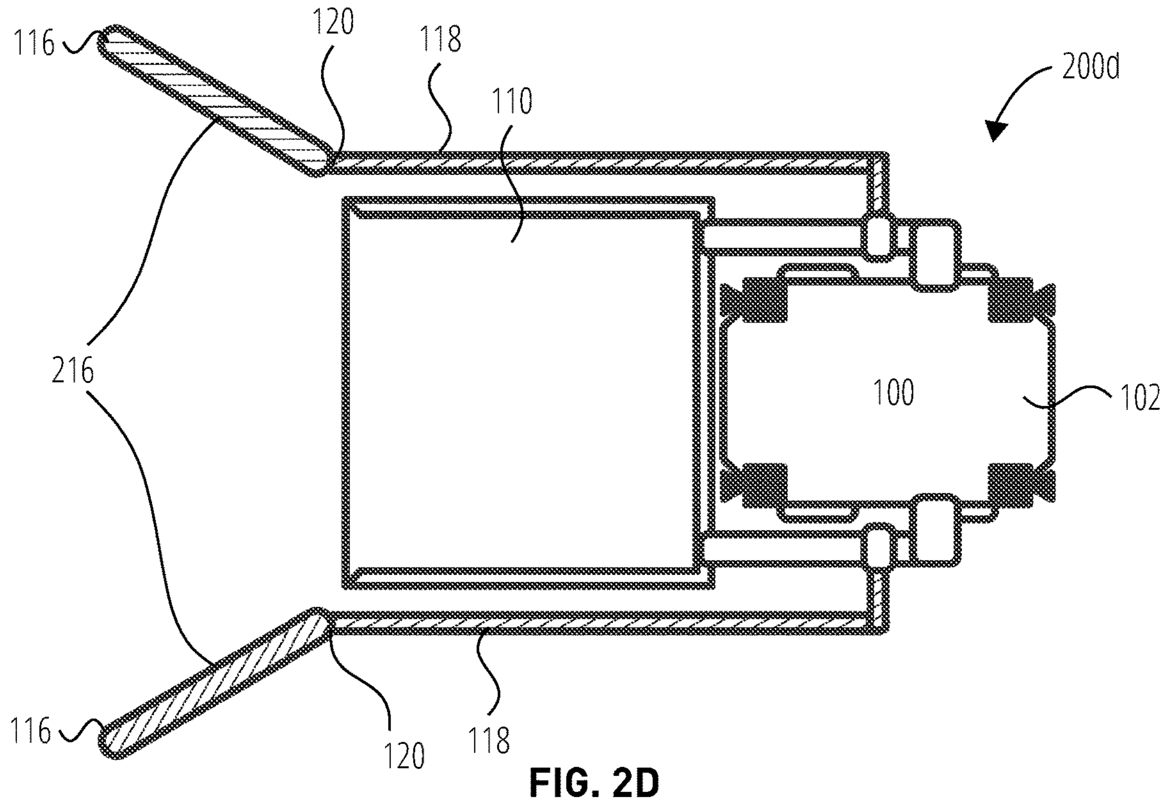
FIG. 2D illustrates a robot 100 with pusher pads extended 200*d* in accordance with one embodiment.

FIG. 2D illustrates a robot 100 with pusher pads extended 200*d*. By the action of servos or other actuators at the pad pivot points 120, the pusher pads 116 may be configured as extended pusher pads 216 to allow the robot 100 to approach objects as wide or wider than the robot chassis 102 and scoop 110. In some embodiments, the pusher pads 116 may be able to rotate through almost three hundred and sixty degrees, to rest parallel with and on the outside of their associated pusher pad arms 118 when fully extended.

Figure 2E:
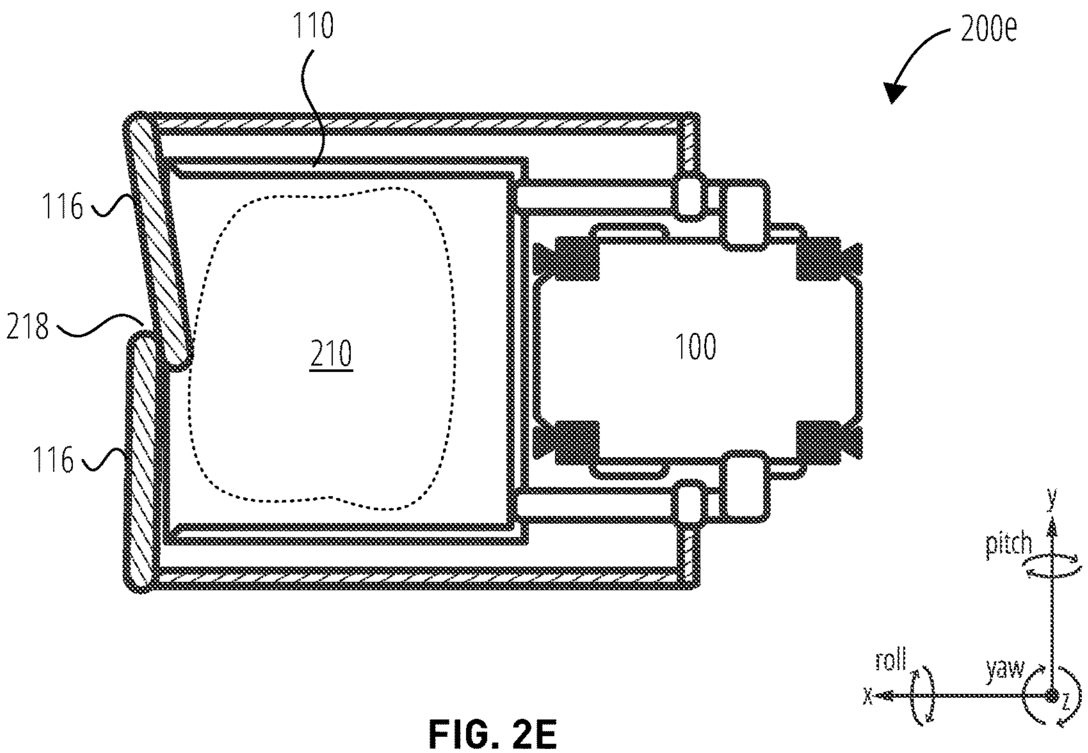
FIG. 2E illustrates a robot 100 with pusher pads retracted 200*e* in accordance with one embodiment.

FIG. 2E illustrates a robot 100 with pusher pads retracted 200*e*. The closed pusher pads 218 may roughly define a containment area 210 through their position with respect to the scoop 110. In some embodiments, the pusher pads 116 may be able to rotate farther than shown, through almost three hundred and sixty degrees, to rest parallel with and inside of the side walls of the scoop 110.

Figure 3C:
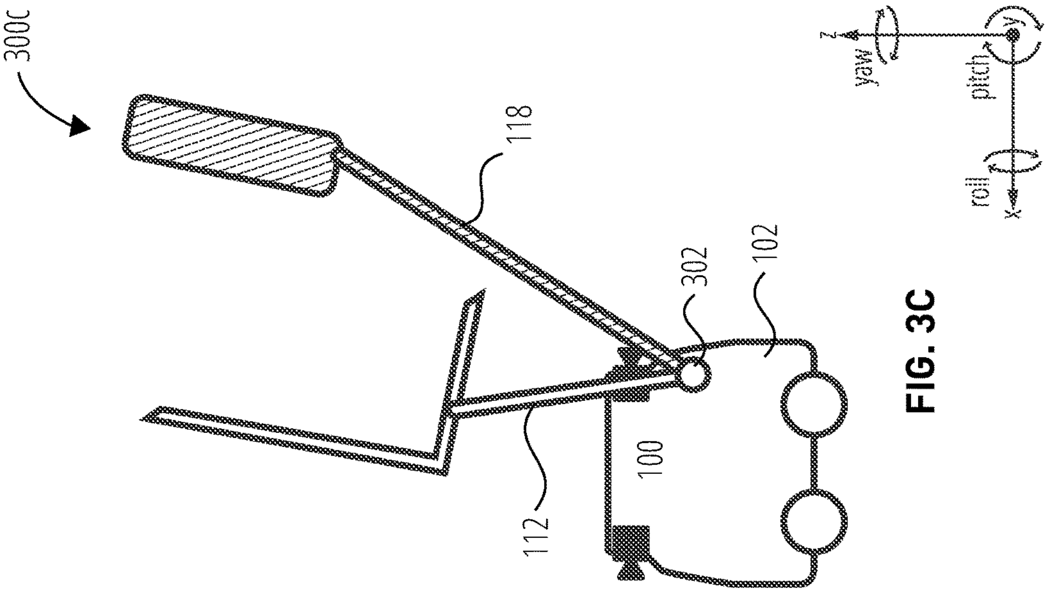
FIG. 3C illustrates a raised scoop position and raised pusher position 300*c* for the robot 100 in accordance with one embodiment.
Figure 3A:
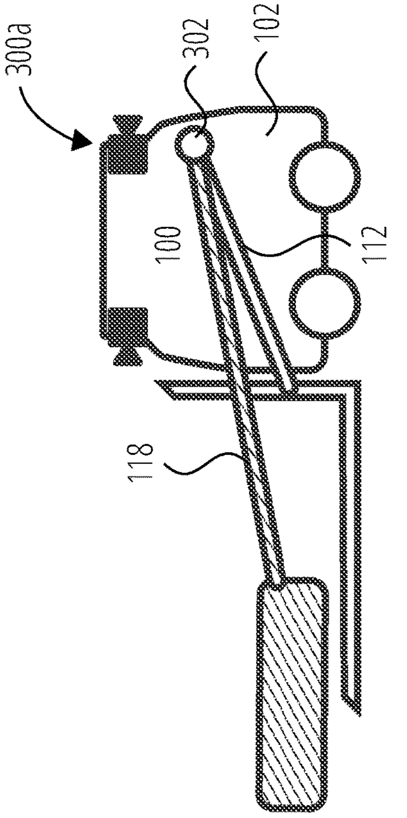
FIG. 3A illustrates a lowered scoop position and lowered pusher position 300*a* for the robot 100 in accordance with one embodiment.
Figure 3B:
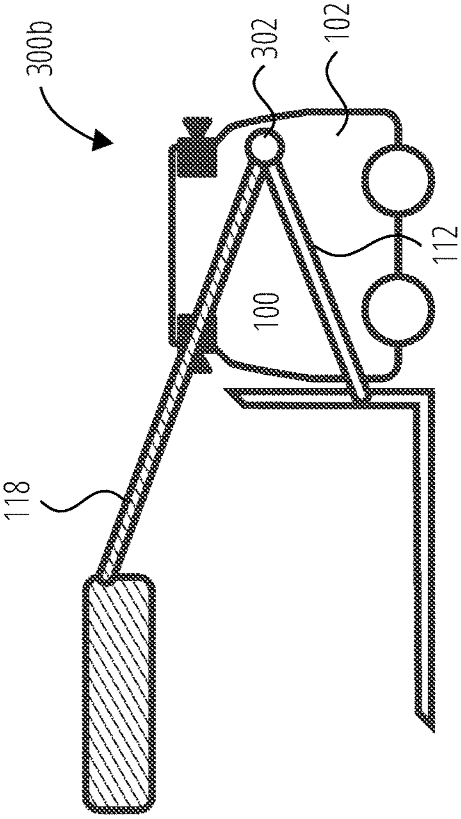
FIG. 3B illustrates a lowered scoop position and raised pusher position 300*b* for the robot 100 in accordance with one embodiment.

FIG. 3A through FIG. 3C illustrate a robot 100 such as that introduced with respect to FIG. 1A through FIG. 2E. In such an embodiment, the pusher pad arms 118 may be controlled by a servo or other actuator at the same point of connection 302 with the chassis 102 as the scoop arms 112. The robot 100 may be seen disposed in a lowered scoop position and lowered pusher position 300*a*, a lowered scoop position and raised pusher position 300*b*, and a raised scoop position and raised pusher position 300*c*. This robot 100 may be configured to perform the algorithms disclosed herein.

The point of connection shown between the scoop arms 112/pusher pad arms 118 and the chassis 102 is an exemplary position and is not intended to limit the physical location of this point of connection. Such connection may be made in various locations as appropriate to the construction of the chassis 102 and arms, and the applications of intended use.

Figure 4C:
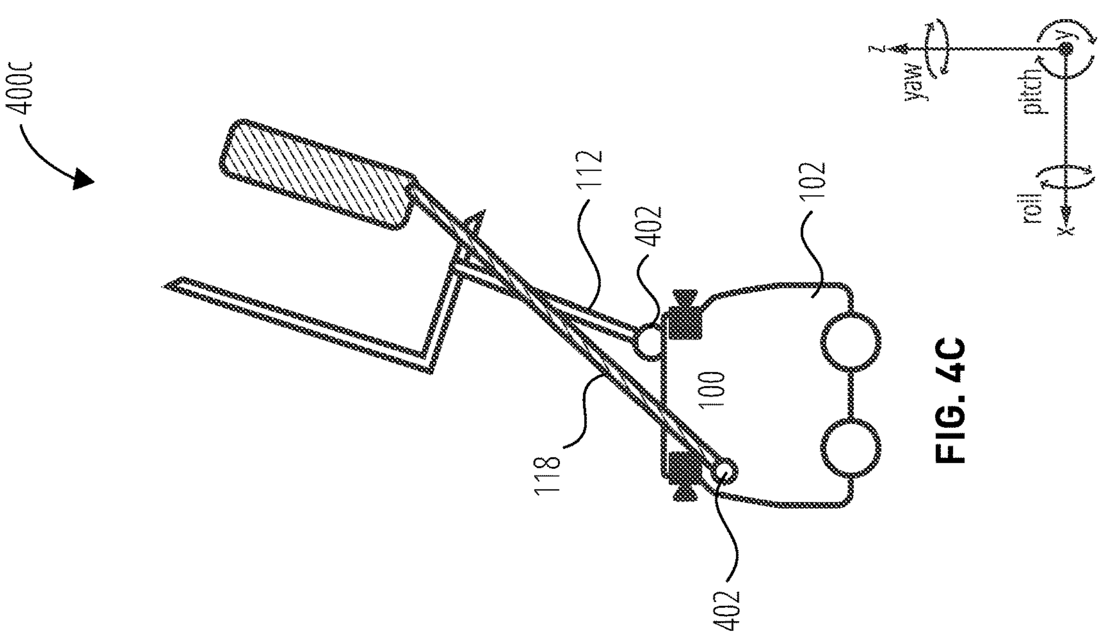
FIG. 4C illustrates a raised scoop position and raised pusher position 400*c* for the robot 100 in accordance with one embodiment.
Figure 4A:
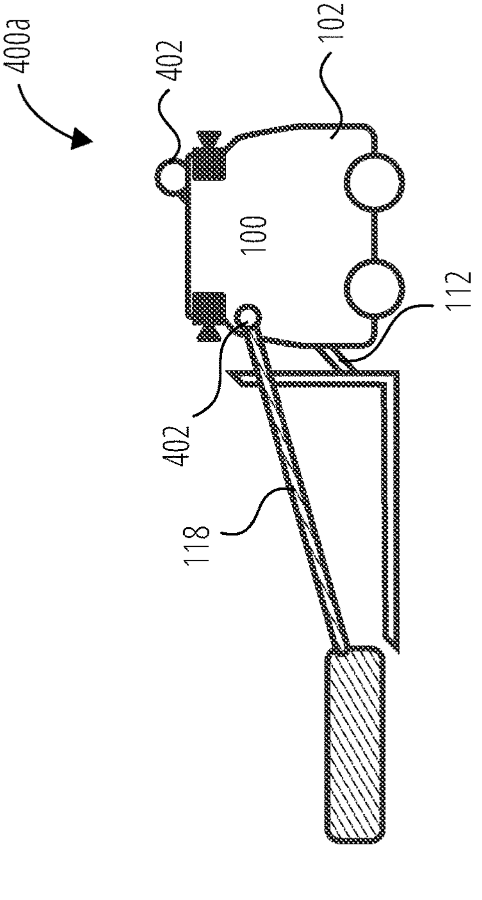
FIG. 4A illustrates a lowered scoop position and lowered pusher position 400*a* for the robot 100 in accordance with one embodiment.
Figure 4B:
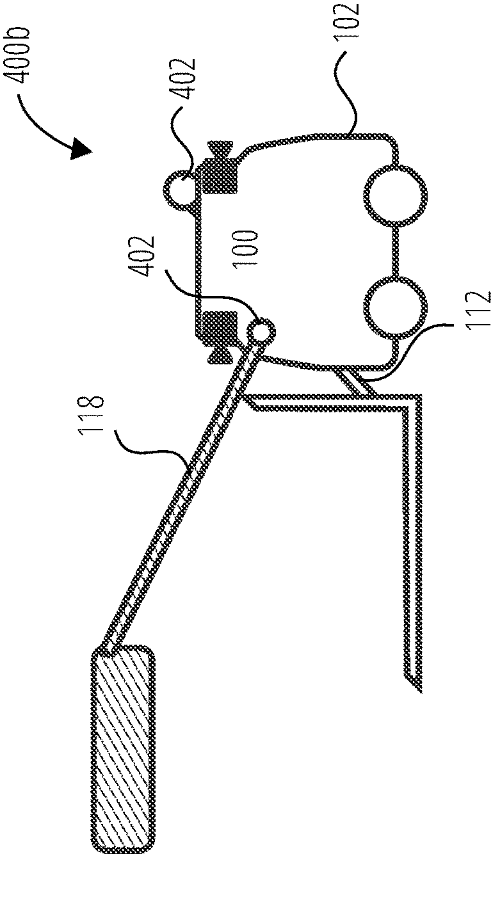
FIG. 4B illustrates a lowered scoop position and raised pusher position 400*b* for the robot 100 in accordance with one embodiment.

FIG. 4A through FIG. 4C illustrate a robot 100 such as that introduced with respect to FIG. 1A through FIG. 2E. In such an embodiment, the pusher pad arms 118 may be controlled by a servo or servos (or other actuators) at different points of connection 402 with the chassis 102 from those controlling the scoop arm 112. The robot 100 may be seen disposed in a lowered scoop position and lowered pusher position 400*a*, a lowered scoop position and raised pusher position 400*b*, and a raised scoop position and raised pusher position 400*c*. This robot 100 may be configured to perform the algorithms disclosed herein.

The different points of connection 402 between the scoop arm and chassis and the pusher pad arms and chassis shown are exemplary positions and not intended to limit the physical locations of these points of connection. Such connections may be made in various locations as appropriate to the construction of the chassis and arms, and the applications of intended use.

FIG. 5 illustrates a robot 100 such as was previously introduced in a front drop position 500. The arms of the robot 100 may be positioned to form a containment area 210 as previously described.

The robot 100 may be configured with a scoop pivot point 502 where the scoop 110 connects to the scoop arm 112. The scoop pivot point 502 may allow the scoop 110 to be tilted forward and down while the scoop arm 112 is raised, allowing objects in the containment area 210 to slide out and be deposited in an area to the front 202 of the robot 100.

Figure 6A:
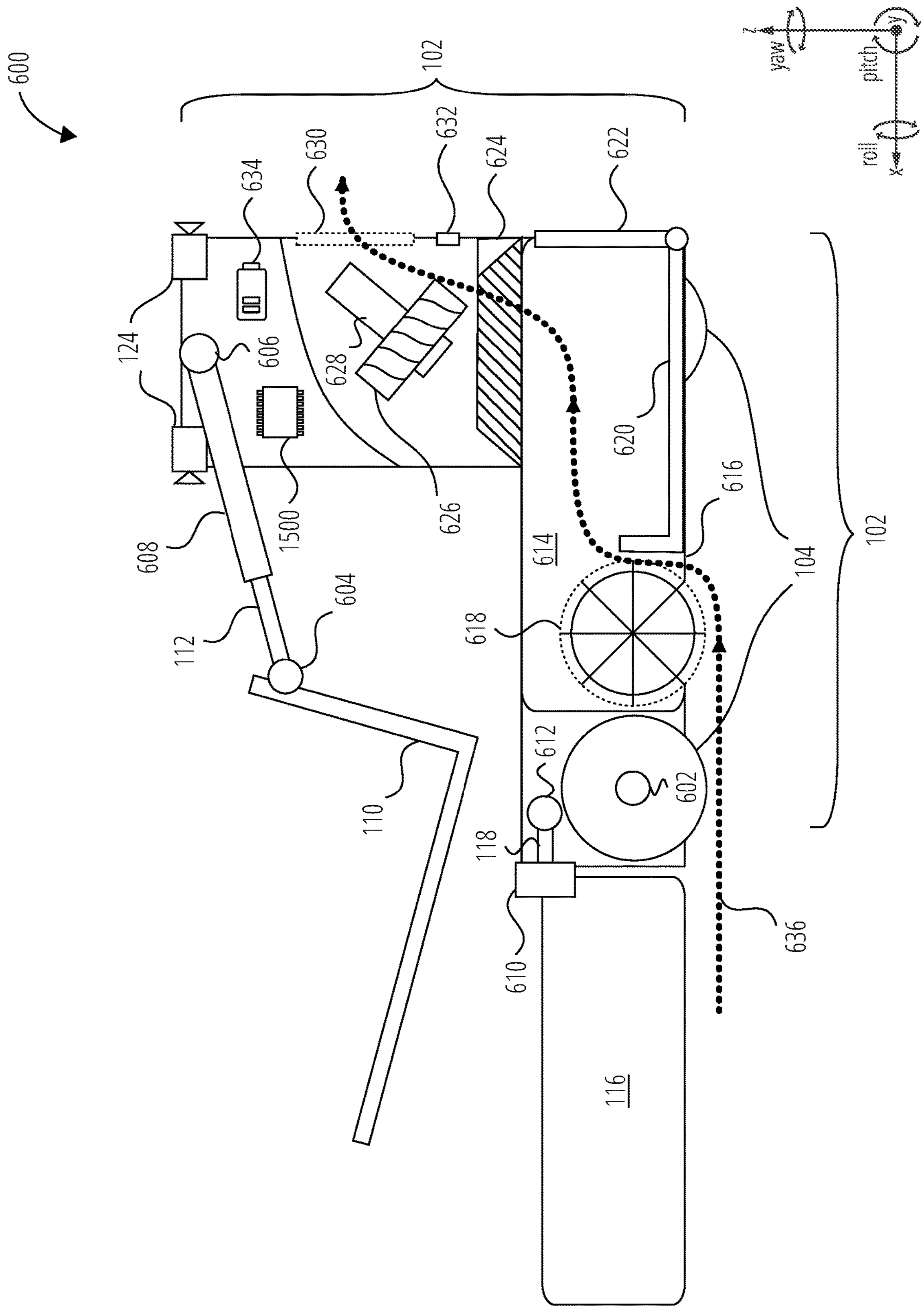
FIG. 6A illustrates a left side view of a tidying robot 600 in accordance with one embodiment.
Figure 6B:
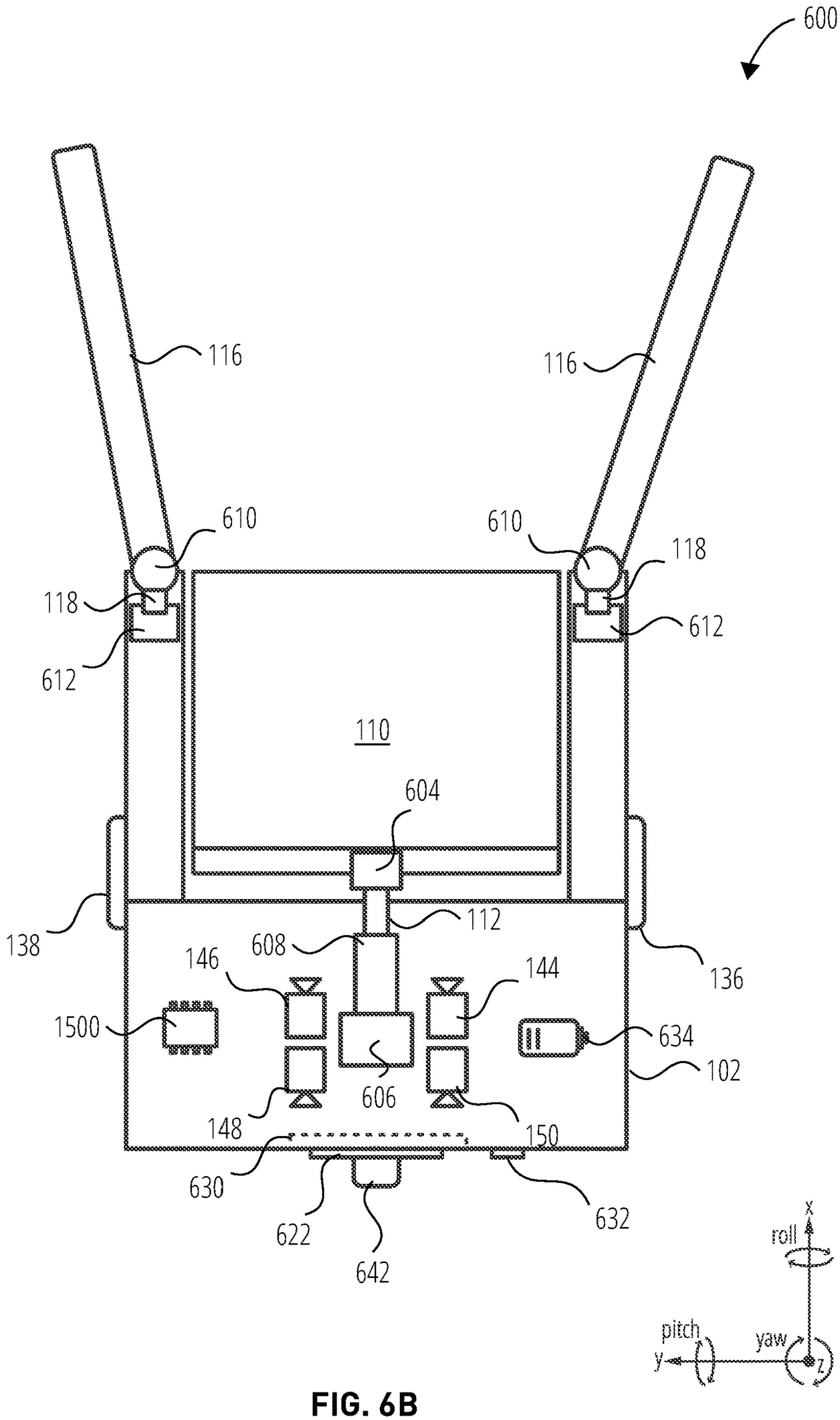
FIG. 6B illustrates a top view of a tidying robot 600 in accordance with one embodiment.
Figure 6C:
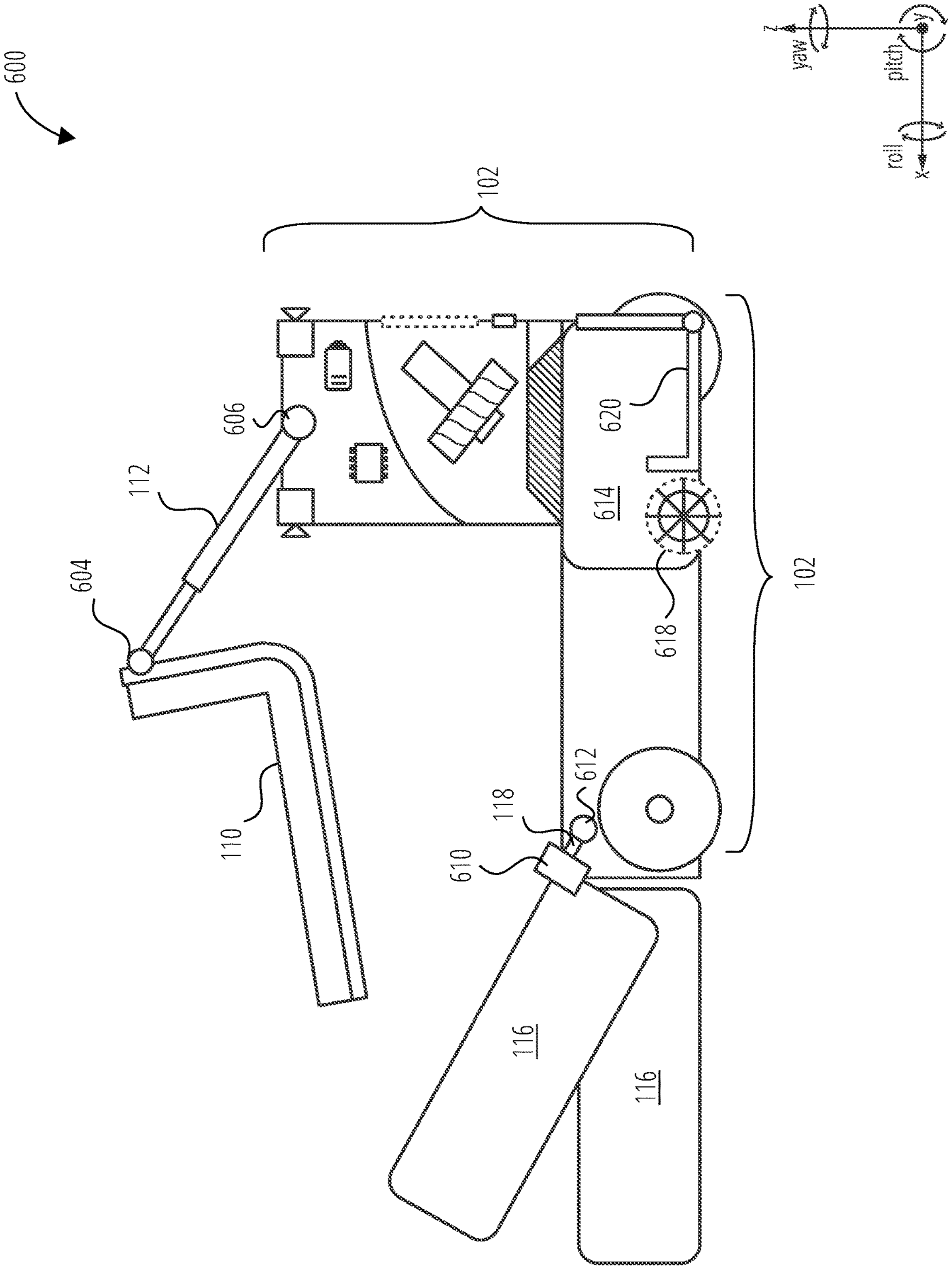
FIG. 6C illustrates a left side view of a tidying robot 600 in an alternative position in accordance with one embodiment.
Figure 6D:
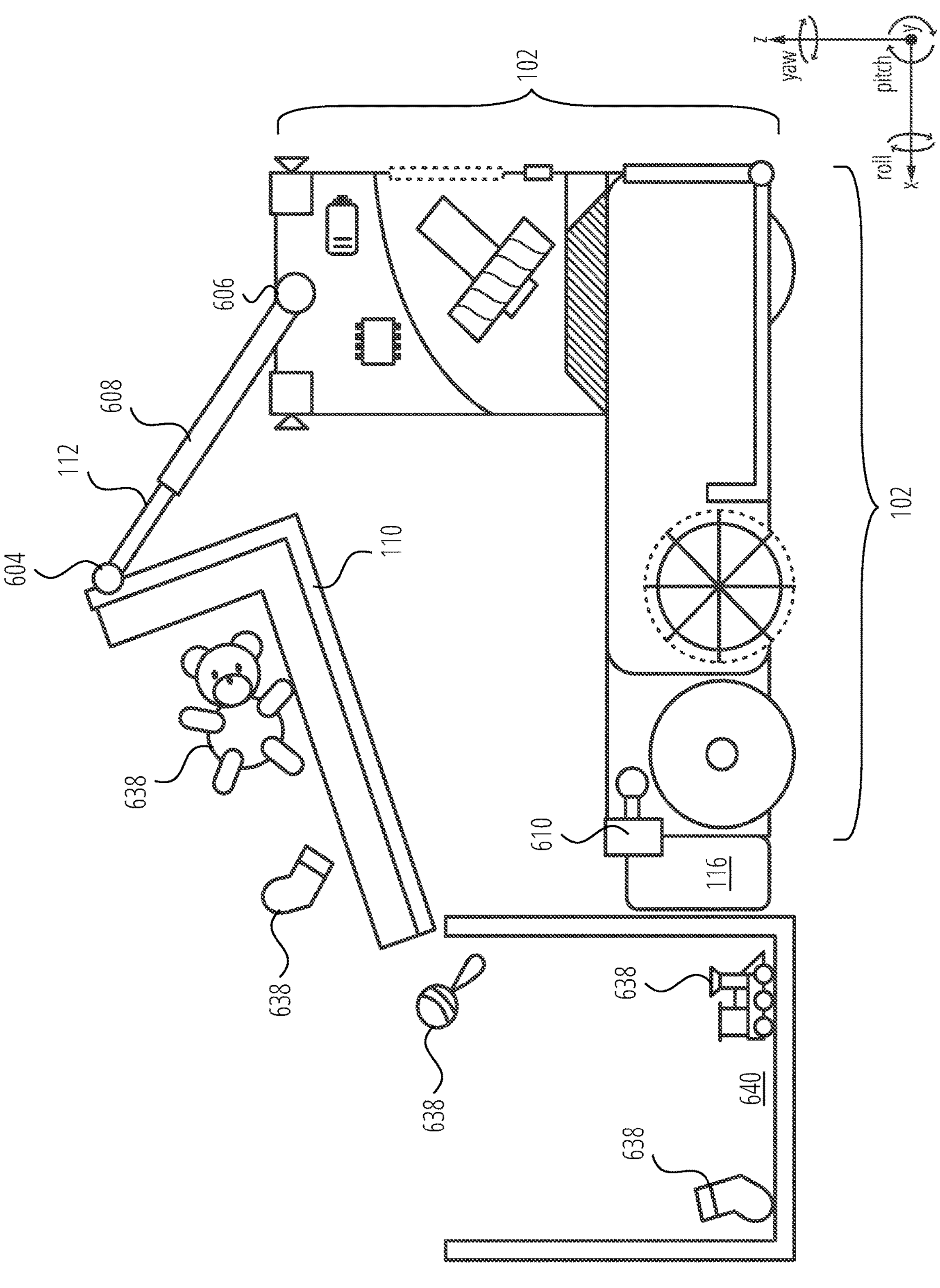
FIG. 6D illustrates a tidying robot 600 performing a front dump in accordance with one embodiment.

FIG. 6A-FIG. 6D illustrate a tidying robot 600 in accordance with one embodiment. FIG. 6A shows a left side view, FIG. 6B shows a top view, FIG. 6C shows a left side view of the tidying robot 600 in an alternative position, and FIG. 6D shows the tidying robot 600 performing a front dump action. The tidying robot 600 may comprise a chassis 102, a mobility system 104 and at least one motor 602 to actuate it; a scoop 110 and an associated motor 604 to rotate the scoop 110 into different positions; a scoop arm 112 and an associated motor 606 and linear actuator 608 to raise/lower and extend the scoop arm 112, respectively; pusher pads 116 and associated motors 610 to rotate the pusher pads 116 into different positions; pusher pad arms 118 and associated motors 612 to raise, lower, and extend the pusher pad arms 118; a vacuum compartment 614 having an intake port 616, a rotating brush 618, a dirt collector 620, a dirt release latch 622, a filter 624, a fan 626 and a motor 628 to actuate it, and an exhaust port 630; a charge connector 632 to connect to the charging station 700 described in greater detail with respect to FIG. 7A and FIG. 7B below; a battery 634; cameras 124; and a robotic control system 1500, as described in greater detail with respect to FIG. 15.

The tidying robot 600 may be configured, incorporate features of, and behave similarly to the robot 100 described with respect to the preceding figures. In addition to the features of the robot 100, the tidying robot 600 may incorporate a vacuuming system. A vacuum compartment 614 may have an intake port 616 allowing airflow 636 into the vacuum compartment 614. The intake port 616 may be configured with a rotating brush 618 to impel dirt and dust into the vacuum compartment 614. Airflow 636 may be induced by a fan 626 to flow through the vacuum compartment 614 from the intake port 616 to an exhaust port 630, exiting the vacuum compartment 614 at the exhaust port 630. The exhaust port 630 may be covered by a grating or other element permeable to airflow 636 but able to prevent the ingress of objects into the chassis 102 of the tidying robot 600.

Figure 7B:
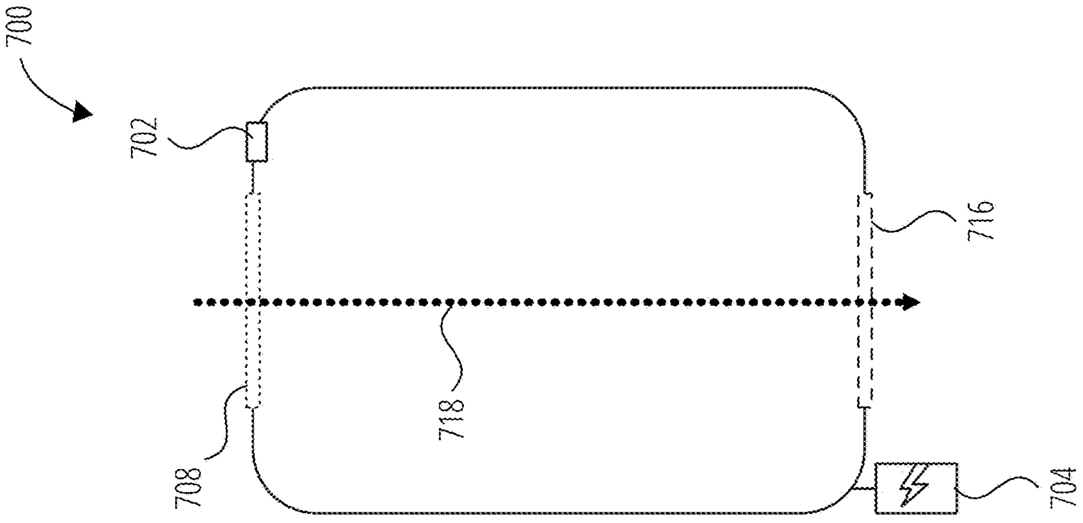
FIG. 7B illustrates a top view of a charging station 700 in accordance with one embodiment.
Figure 7A:
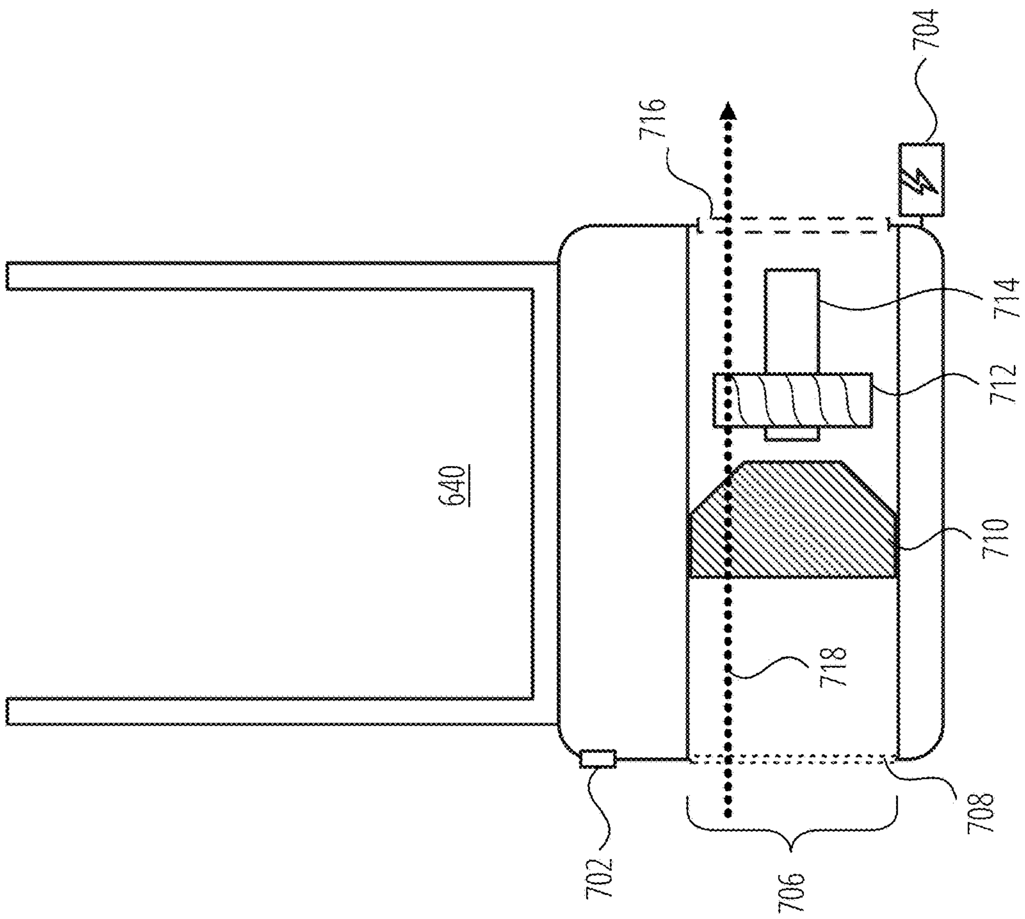
FIG. 7A illustrates a left side view of a charging station 700 in accordance with one embodiment.

A filter 624 may be disposed between the intake port 616 and the exhaust port 630. The filter 624 may prevent dirt and dust from entering and clogging the fan 626. The filter 624 may be disposed such that blocked dirt and dust are deposited within a dirt collector 620. The dirt collector 620 may be closed off from the outside of the chassis 102 by a dirt release latch 622. The dirt release latch 622 may be configured to open when the tidying robot 600 is docked at a charging station 700 with a vacuum compartment 614 emptying system, as is illustrated in FIG. 7A and FIG. 7B below.

The drawings in this disclosure may not be to scale. One of ordinary skill in the art will realize that elements, such as the rotating brush, may be located further back in the device, as shown in FIG. 6C.

As illustrated in FIG. 6B, the mobility system 104 of the tidying robot 600 may include a right front wheel 136, a left front wheel 138, and a single rear wheel 642, in contrast to the four wheels shown for the robot 100. In one embodiment, the motor 602 of the mobility system 104 may actuate the right front wheel 136 and left front wheel 138 while the single rear wheel 642 provides support and reduced friction with no driving force, as indicated in FIG. 6A. In another embodiment, the tidying robot 600 may have additional motors to provide all-wheel drive, may use a different number of wheels, or may use caterpillar tracks or other mobility devices in lieu of wheels.

As indicated in FIG. 6B, the cameras 124 of the tidying robot 600 may comprise a front right camera 144, a front left camera 146, a rear left camera 148, and a rear right camera 150, as is shown and described for the robot 100.

In one embodiment, as shown in FIG. 6B, the scoop arm 112 may be configured with a linear actuator 608. This may allow the scoop arm 112 to extend and retract linearly, moving the scoop 110 away from or toward the chassis 102 of the tidying robot 600, independently from the rotation of the scoop 110 or scoop arm 112.

FIG. 6C and FIG. 6D illustrate degrees of freedom of motion with which the tidying robot 600 may be configured. Each pusher pad 116 may be able to raise and lower through the action of the motors 612 upon the pusher pad arms 118. Each pusher pad 116 may also be able to rotate horizontally through the action of the motors 610 upon the pusher pads 116, such that the pusher pads 116 may fold inward, as illustrated in FIG. 6D.

The scoop 110 may be rotated vertically with respect to the scoop arm 112 through the action of its motor 604. As previously described, it may be moved away from or toward the chassis 102 through the action of a linear actuator 608 configured with the scoop arm 112. The scoop 110 may also be raised and lowered by the rotation of the scoop arm 112, actuated by the motor 606.

FIG. 6D illustrates how the positions of the components of the tidying robot 600 may be configured such that the pusher pads 116 may be folded against the chassis 102 through the action of motor 610 so the tidying robot 600 may approach a bin 640, and the scoop 110 may be raised by motor 606, extended by linear actuator 608, and tilted by motor 604 so that tidyable objects 638 carried in the scoop 110 may be deposited in a bin 640.

FIG. 7A and FIG. 7B illustrate a charging station 700 in accordance with one embodiment. FIG. 7A shows a left side view and FIG. 7B shows a top view. The charging station 700 may comprise a bin 640, a charge connector 702, a power source connection 704, and a vacuum emptying system 706 including an intake port 708, a filter bag 710, a fan 712, a motor 714, and an exhaust port 716.

The bin 640 may be configured on top of the charging station 700 so that a tidying robot 600 may deposit objects in the scoop 110 into the bin 640. The charge connector 702 may be electrically coupled to the power source connection 704. The power source connection 704 may be a cable connector configured to couple through a cable to an alternating current (AC) or direct current (DC) source, a battery, or a wireless charging port, as will be readily apprehended by one of ordinary skill in the art. In one embodiment, the power source connection 704 is a cable and male connector configured to couple with 120V AC power, such as may be provided by a conventional U. S. home power outlet.

The vacuum emptying system 706 may include an intake port 708 allowing air flow 718 into the vacuum emptying system 706. The intake port 708 may be configured with a flap or other component to protect the interior of the vacuum emptying system 706 when a tidying robot 600 is not docked. A filter bag 710 may be disposed between the intake port 708 and a fan 712 to catch dust and dirt carried by the air flow 718 into the vacuum emptying system 706. The fan 712 may be powered by a motor 714. The fan 712 may pull the air flow 718 from the intake port 708 to the exhaust port 716, which may be configured to allow the air flow 718 to exit the intake port 708. The exhaust port 716 may be covered with a grid to protect the interior of the vacuum emptying system 706.

Figure 8:
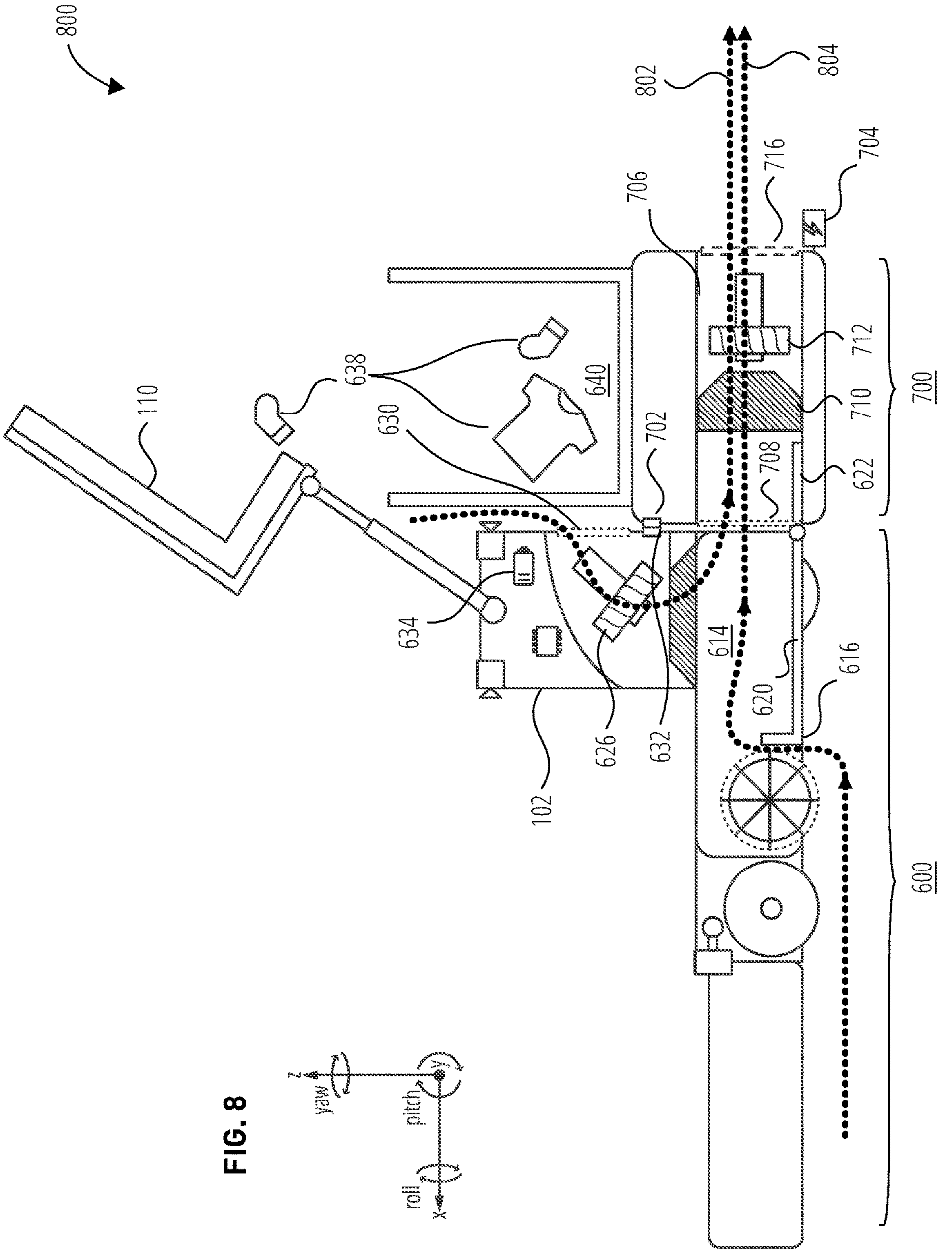
FIG. 8 illustrates a tidying robot interaction with charging station 800 in accordance with one embodiment.

FIG. 8 illustrates a tidying robot interaction with charging station 800 in accordance with one embodiment. The tidying robot 600 may back up to and dock with the charging station 700 as shown. In a docked state, the charge connector 632 may electrically couple with the charge connector 702 such that electrical power from the power source connection 704 may be carried to the battery 634 and the battery 634 may be recharged toward its maximum capacity for future use.

When the tidying robot 600 is docked at a charging station 700 having a bin 640, the scoop 110 may be raised and rotated up and over the tidying robot 600 chassis 102, allowing tidyable objects 638 in the scoop 110 to drop into the bin 640.

When the tidying robot 600 docks at its charging station 700, the dirt release latch 622 may lower, allowing the vacuum compartment 614 to interface with the vacuum emptying system 706. Where the intake port 708 is covered by a protective element, the dirt release latch 622 may interface with that element to open the intake port 708 when the tidying robot 600 is docked. The fan 626 may remain inactive or may reverse direction, permitting or compelling airflow 802 through the exhaust port 630, into the vacuum compartment 614, across the dirt collector 620, over the dirt release latch 622, into the intake port 708, through the filter bag 710, and out the exhaust port 716, in conjunction with the operation of the fan 712. The action of the fan 712 may also pull airflow 804 in from the intake port 616, across the dirt collector 620, over the dirt release latch 622, into the intake port 708, through the filter bag 710, and out the exhaust port 716. In combination, airflow 802 and airflow 804 may pull dirt and dust from the dirt collector 620 into the filter bag 710, emptying the dirt collector 620 for future vacuuming tasks. The filter bag 710 may be manually discarded and replaced on a regular basis.

Figure 9:
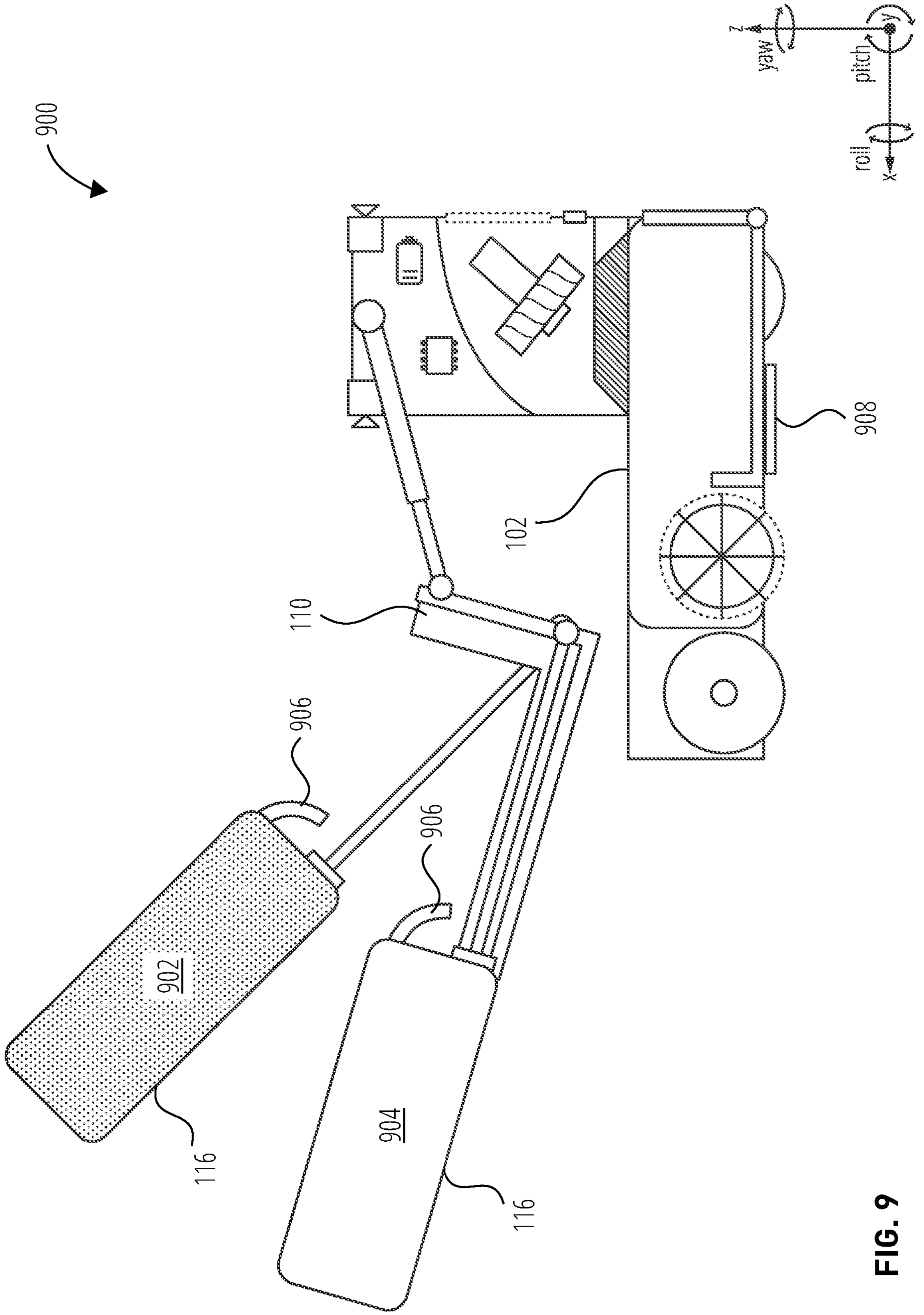
FIG. 9 illustrates a tidying robot 900 in accordance with one embodiment.

FIG. 9 illustrates a tidying robot 900 in accordance with one embodiment. The tidying robot 900 may be configured as described previously with respect to the robot 100 of FIG. 1A-FIG. 5 and the tidying robot 600 of FIG. 6A-FIG. 6D and FIG. 8. In addition, the tidying robot 900 may also include hooks 906 attached to its pusher pads 116 and a mop pad 908.

Figure 10A:
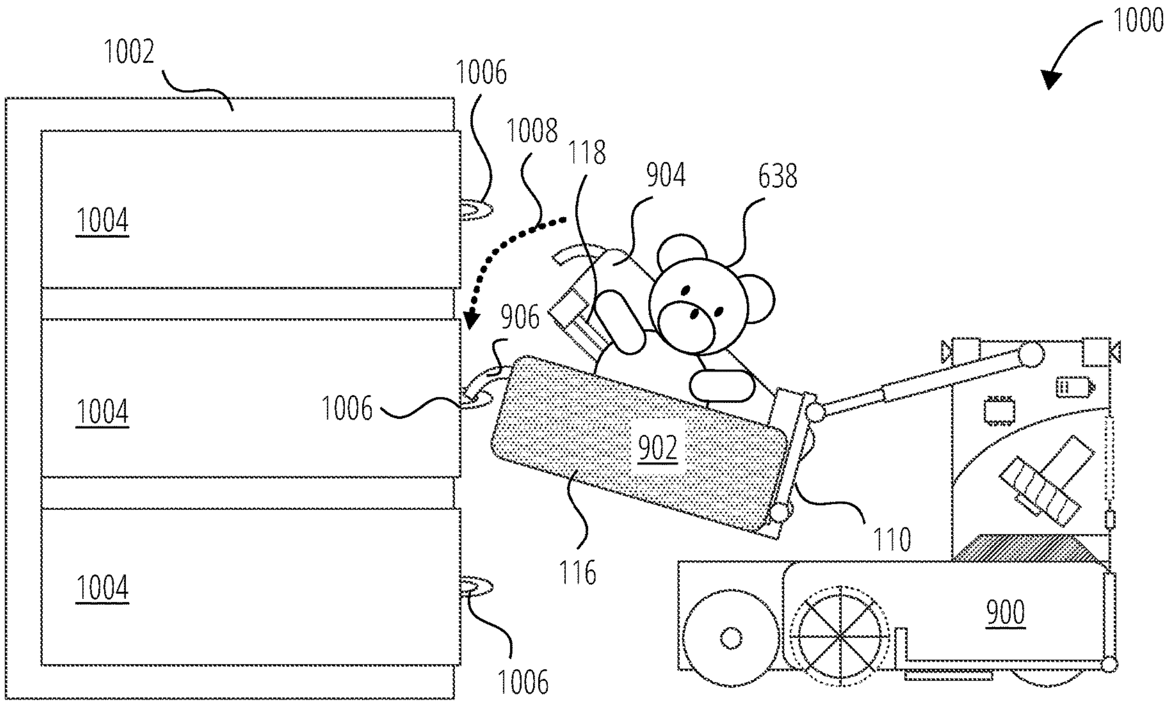
FIG. 10A-FIG. 10D illustrate a tidying robot interacting with drawers 1000 in accordance with one embodiment.
Figure 10B:
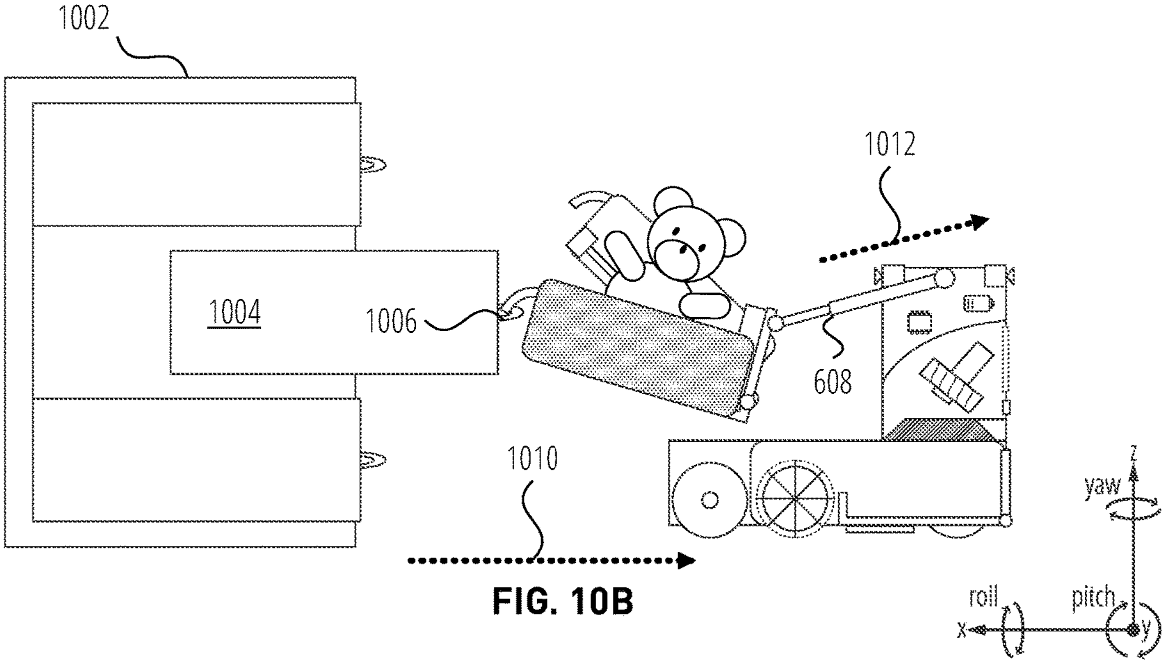
Figure 10C:
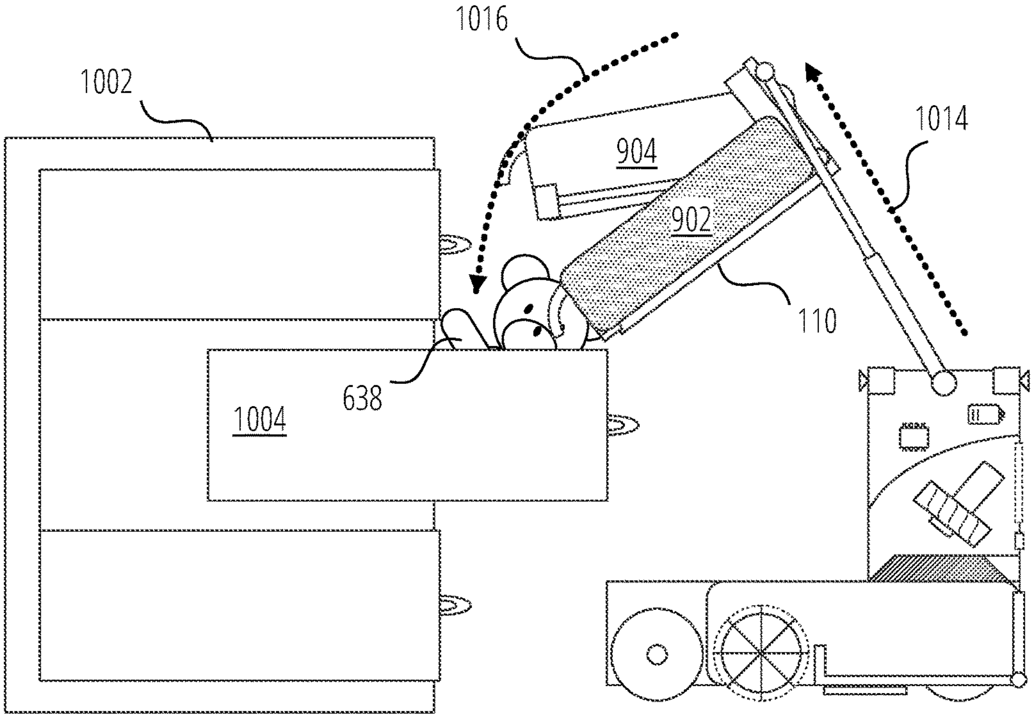
Figure 10D:
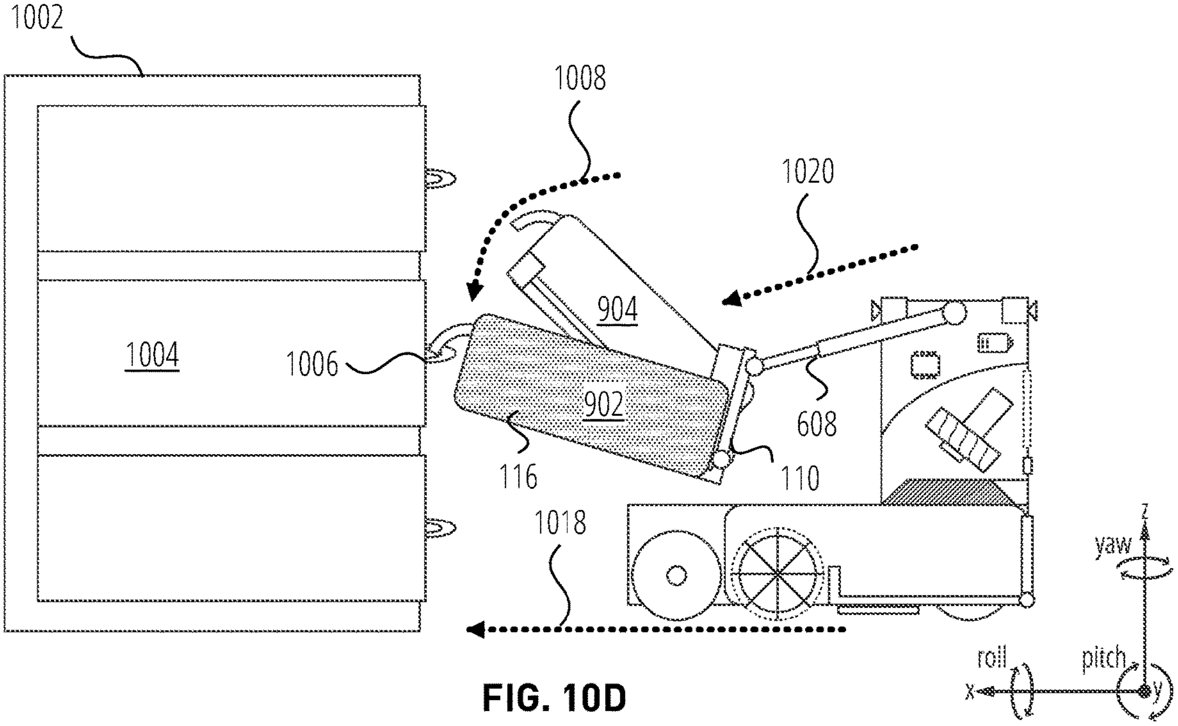

In one embodiment, the pusher pads 116 may be attached to the back of the scoop 110 as shown, instead of being attached to the chassis 102 of the tidying robot 900. There may be a hook on each of the pusher pads 116 such that, when correctly positioned, the hook 906 may interface with a handle in order to open or close a drawer, as illustrated with respect to FIG. 10A-FIG. 10D. Alternatively, there may be an actuated gripper on the back of the pusher arms that may similarly be used to grasp a handle to open or close drawers. When the pusher pads 116 are being used to push or sweep objects into the scoop 110, the pusher pad inner surfaces 902 may be oriented inward, as indicated by pusher pad inner surface 902 (patterned) and pusher pad outer surface 904 (solid) as illustrated in FIG. 9, keeping the hooks 906 from impacting surrounding objects. When the hooks 906 are needed, the pusher pads 116 may fold out and back against the scoop such that the solid pusher pad outer surfaces 904 face inward, the patterned pusher pad inner surfaces 902 face outward, and the hooks are oriented forward for use, as shown in FIG. 10A.

In one embodiment, the tidying robot 900 may include a mop pad 908 that may be used to mop a hard floor such as tile, vinyl, or wood during the operation of the tidying robot 900. The mop pad 908 may be a fabric mop pad that may be used to mop the floor after vacuuming. The mop pad 908 may be removably attached to the bottom of the tidying robot 900 chassis 102 and may need to be occasionally removed and washed or replaced when dirty.

In one embodiment, the mop pad 908 may be attached to an actuator to raise and lower it onto and off of the floor. In this way, the tidying robot 900 may keep the mop pad 908 raised during operations such as tidying objects on carpet, but may lower the mop pad 908 when mopping a hard floor. In one embodiment, the mop pad 908 may be used to dry mop the floor. In one embodiment, the tidying robot 900 may be able to detect and distinguish liquid spills or sprayed cleaning solution and may use the mop pad 908 to absorb spilled or sprayed liquid. In one embodiment, a fluid reservoir may be configured within the tidying robot 900 chassis 102, and may be opened or otherwise manipulated to wet the mop pad 908 with water or water mixed with cleaning fluid during a mopping task. In another embodiment, such a fluid reservoir may couple to spray nozzles at the front of the chassis 102, which may wet the floor in front of the mop pad 908, the mop pad 908 then wiping the floor and absorbing the fluid.

FIG. 10A-FIG. 10D illustrate a tidying robot interacting with drawers 1000 in accordance with one embodiment. When tidyable objects 638 in the scoop 110 of the tidying robot 900 belong in a drawer 1004 of a cabinet 1002, the tidying robot 900 may move one of its pusher pads 116 to engage 1008 its hook 906 with the handle 1006 of the drawer 1004. The tidying robot 900 may then drive backward 1010 to pull the drawer 1004 open. Alternatively, the linear actuator 608 may pull inward 1012 to retract the scoop 110 and open the drawer 1004.

With the drawer 1004 open, the tidying robot 900 may raise 1014 and rotate 1016 the scoop 110 to deposit tidyable objects 638 into the drawer 1004. Once the tidyable objects 638 are deposited in the drawer 1004, the tidying robot 900 may once again move one of its pusher pads 116 to engage 1008 its hook 906 with the handle 1006 of the drawer 1004. The tidying robot 900 may then drive forward 1018 to push the drawer 1004 closed. Alternatively, the linear actuator 608 may push outward 1020 to extend the scoop 110 and close the drawer 1004.

Figure 11:
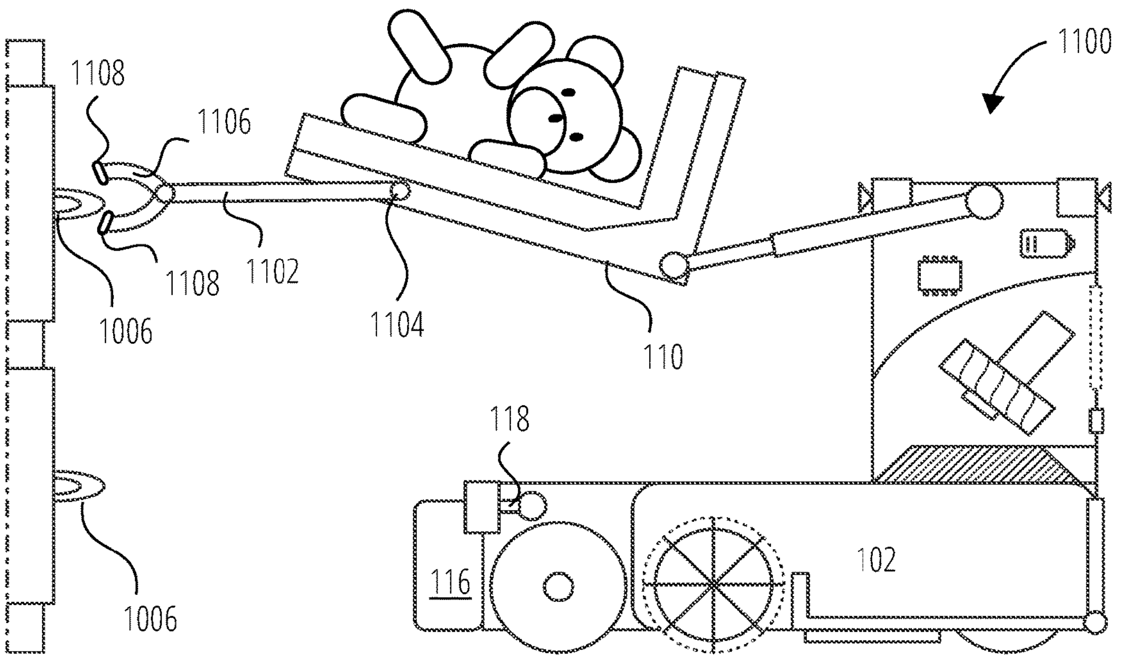
FIG. 11 illustrates a tidying robot 1100 in accordance with one embodiment.

FIG. 11 illustrates a tidying robot 1100 in accordance with one embodiment. The tidying robot 1100 may be configured to perform the actions illustrated in FIG. 10A through FIG. 10D with respect to the tidying robot interacting with drawers 1000. In contrast to the hooks 906 shown on the pusher pads 116 of the tidying robot 900 illustrated in FIG. 9, the tidying robot 1100 may comprise a gripper arm 1102 attached to the scoop 110 at a gripper pivot point 1104. The pusher pads 116, rather than being attached to the scoop 110, may be attached via pusher pad arms 118 to the chassis 102, as shown. The gripper arm 1102 may be configured with an actuated gripper 1106 that may be manipulated to open and close in order to hook onto or grip objects such as the handles 1006 shown. To improve gripping abilities, the actuated gripper 1106 may include gripper tips 1108. The gripper tips 1108 may be of a shape to increase friction force at the ends of the actuated gripper 1106. The gripper tips 1108 may be made from a high-grip substance such as rubber or silicone. In one embodiment, the gripper tips 1108 may be magnetic. In one embodiment, a second gripper arm 1102 may connect to the other side of the scoop 110, providing two grippers for improved performance when manipulating large or heavy objects.

Figure 12:
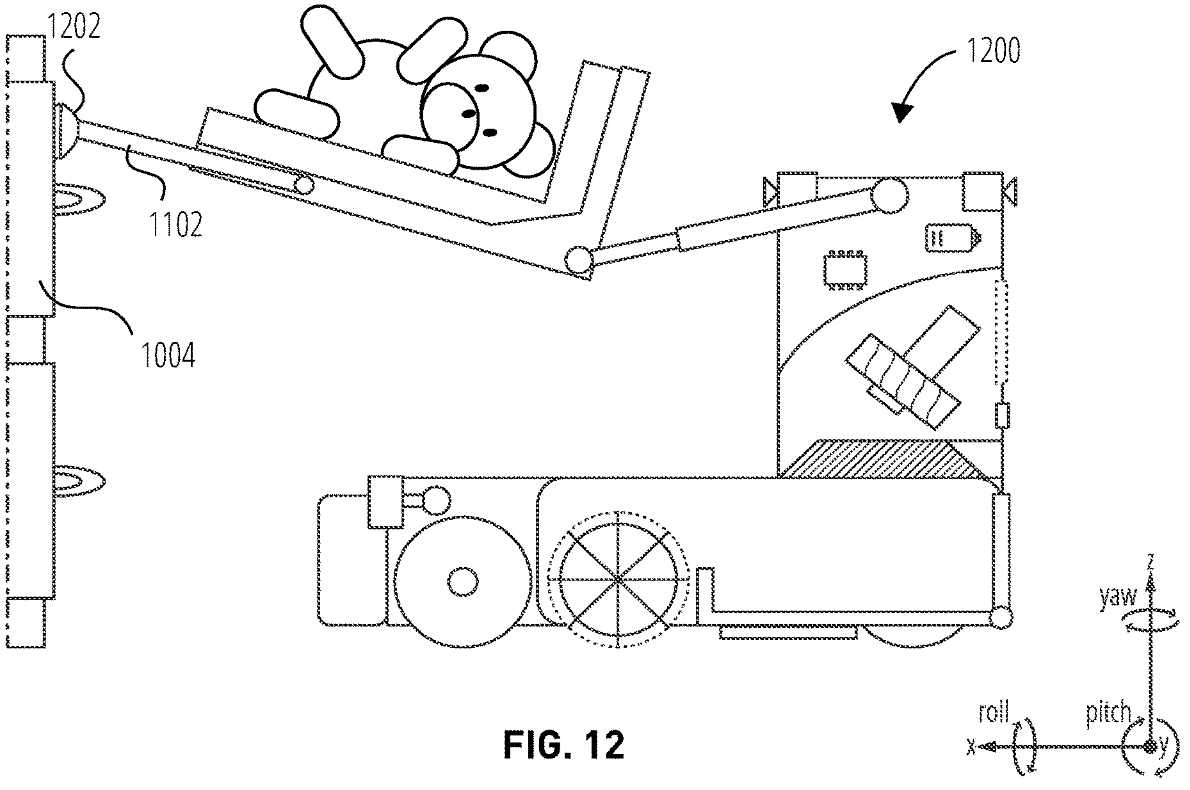
FIG. 12 illustrates a tidying robot 1200 in accordance with one embodiment.

FIG. 12 illustrates a tidying robot 1200 in accordance with one embodiment. Similar to the tidying robot 1100 illustrated in FIG. 11, the tidying robot 1200 may be configured with one or more gripper arms 1102 as shown. The gripper arms 1102 of the tidying robot 1200 may be configured with passive grippers 1202. The passive grippers 1202 may be suction cups or magnets or may have similar means to attach temporarily to a surface of an object, such as a drawer 1004, for the purpose of manipulating that object.

Figure 13:
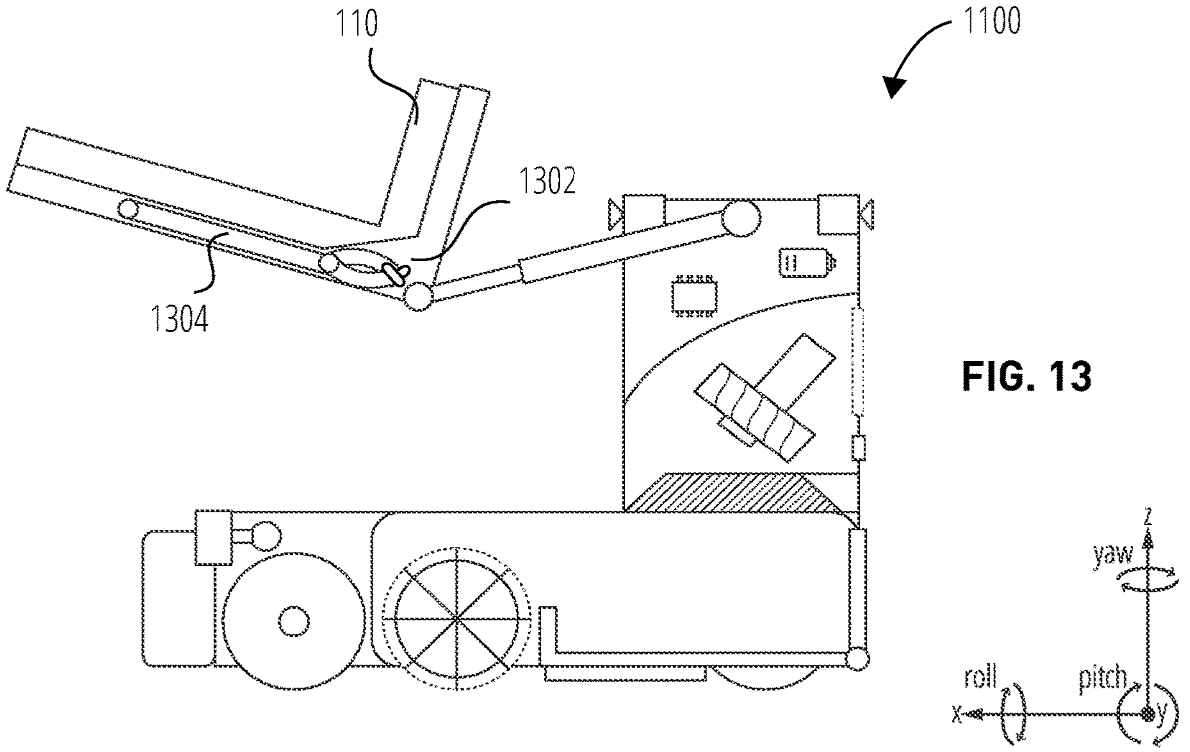
FIG. 13 illustrates a tidying robot 1100 in accordance with one embodiment.

FIG. 13 illustrates a tidying robot 1100 in an alternative position in accordance with one embodiment. The shape of the scoop 110 may include a recessed area 1302, allowing the gripper of either the tidying robot 1100 or the tidying robot 1200 to be configured in a stowed position 1304 as shown.

Figure 14:
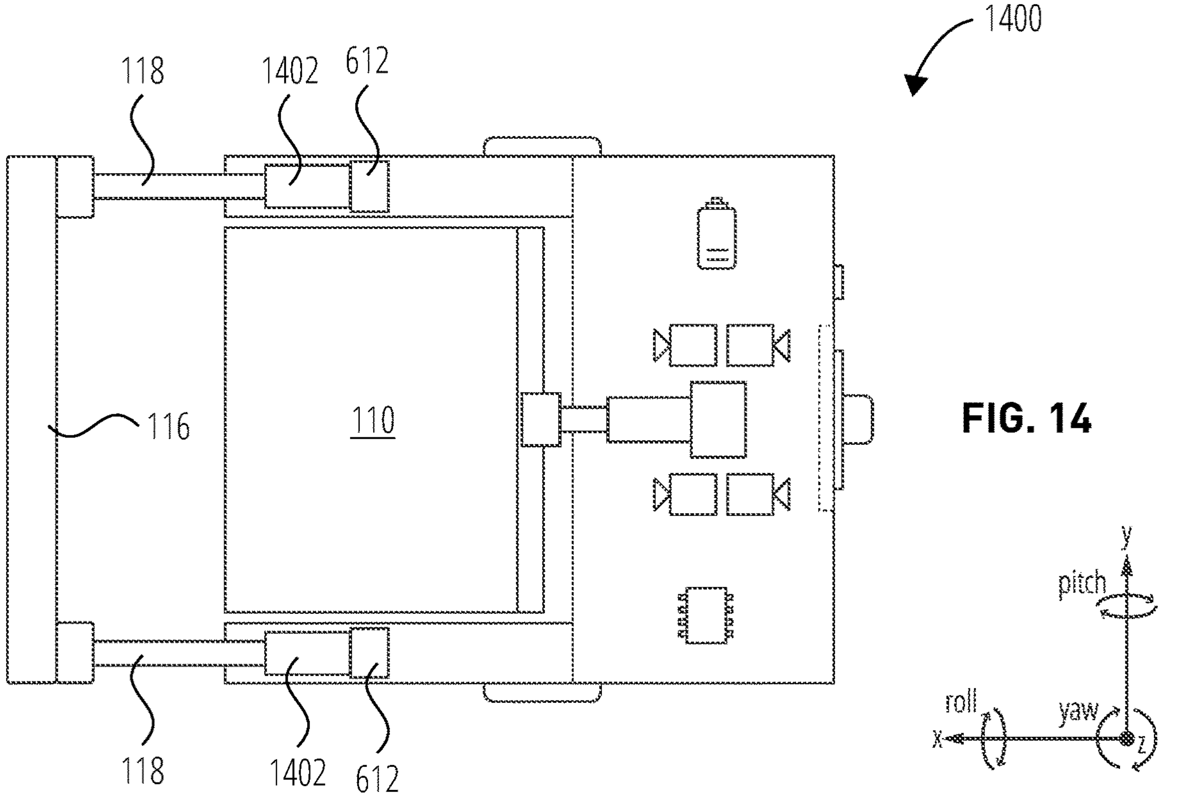
FIG. 14 illustrates a tidying robot 1400 in accordance with one embodiment.

FIG. 14 illustrates a tidying robot 1400 in accordance with one embodiment. The tidying robot 1400 may be configured similarly to other robots illustrated herein, but may have a single pusher pad 116 spanning the width of the tidying robot 1400. The pusher pad 116 may be able to raise and lower in conjunction with or separately from the scoop 110 through the action of one or more motors 612. One or more linear actuators 1402 may be configured to extend and retract the pusher pad 116, allowing it to sweep objects into the scoop 110.

Figure 15:
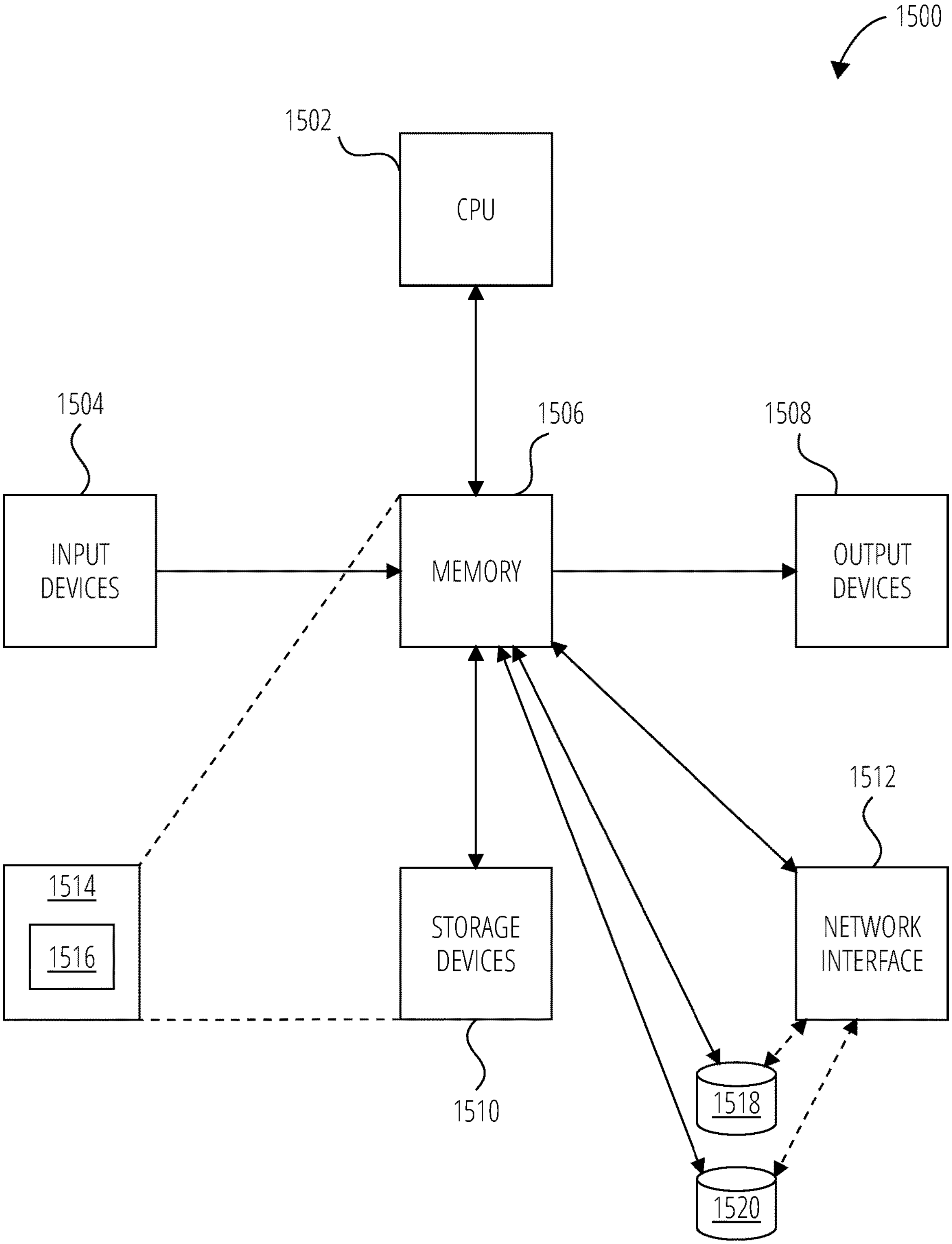
FIG. 15 illustrates an embodiment of a robotic control system 1500 to implement components and process steps of the system described herein.

FIG. 15 depicts an embodiment of a robotic control system 1500 to implement components and process steps of the systems described herein. Some or all portions of the robotic control system 1500 and its operational logic may be contained within the physical components of a robot and/or within a cloud server in communication with the robot and/or within the physical components of a user's mobile computing device, such as a smartphone, tablet, laptop, personal digital assistant, or other such mobile computing devices. In one embodiment, aspects of the robotic control system 1500 on a cloud server and/or user's mobile computing device may control more than one robot at a time, allowing multiple robots to work in concert within a working space.

Input devices 1504 (e.g., of a robot or companion device such as a mobile phone or personal computer) comprise transducers that convert physical phenomena into machine internal signals, typically electrical, optical, or magnetic signals. Signals may also be wireless in the form of electromagnetic radiation in the radio frequency (RF) range but also potentially in the infrared or optical range. Examples of input devices 1504 are contact sensors which respond to touch or physical pressure from an object or proximity of an object to a surface, mice which respond to motion through space or across a plane, microphones which convert vibrations in the medium (typically air) into device signals, scanners which convert optical patterns on two or three-dimensional objects into device signals. The signals from the input devices 1504 are provided via various machine signal conductors (e.g., busses or network interfaces) and circuits to memory 1506.

The memory 1506 is typically what is known as a first- or second-level memory device, providing for storage (via configuration of matter or states of matter) of signals received from the input devices 1504, instructions and information for controlling operation of the central processing unit or CPU 1502, and signals from storage devices 1510. The memory 1506 and/or the storage devices 1510 may store computer-executable instructions and thus forming logic 1514 that when applied to and executed by the CPU 1502 implement embodiments of the processes disclosed herein. Logic 1514 may include portions of a computer program, along with configuration data, that are run by the CPU 1502 or another processor. Logic 1514 may include one or more machine learning models 1516 used to perform the disclosed actions. In one embodiment, portions of the logic 1514 may also reside on a mobile or desktop computing device accessible by a user to facilitate direct user control of the robot.

Information stored in the memory 1506 is typically directly accessible to the CPU 1502 of the device. Signals input to the device cause the reconfiguration of the internal material/energy state of the memory 1506, creating in essence a new machine configuration, influencing the behavior of the robotic control system 1500 by configuring the CPU 1502 with control signals (instructions) and data provided in conjunction with the control signals.

Second- or third-level storage devices 1510 may provide a slower but higher capacity machine memory capability. Examples of storage devices 1510 are hard disks, optical disks, large-capacity flash memories or other non-volatile memory technologies, and magnetic memories.

In one embodiment, memory 1506 may include virtual storage accessible through a connection with a cloud server using the network interface 1512, as described below. In such embodiments, some or all of the logic 1514 may be stored and processed remotely.

The CPU 1502 may cause the configuration of the memory 1506 to be altered by signals in storage devices 1510. In other words, the CPU 1502 may cause data and instructions to be read from storage devices 1510 in the memory 1506 which may then influence the operations of CPU 1502 as instructions and data signals, and which may also be provided to the output devices 1508. The CPU 1502 may alter the content of the memory 1506 by signaling to a machine interface of memory 1506 to alter the internal configuration and then converted signals to the storage devices 1510 alter its material internal configuration. In other words, data and instructions may be backed up from memory 1506, which is often volatile, to storage devices 1510, which are often non-volatile.

Output devices 1508 are transducers that convert signals received from the memory 1506 into physical phenomena such as vibrations in the air, patterns of light on a machine display, vibrations (i.e., haptic devices), or patterns of ink or other materials (i.e., printers and 3-D printers).

The network interface 1512 receives signals from the memory 1506 and converts them into electrical, optical, or wireless signals to other machines, typically via a machine network. The network interface 1512 also receives signals from the machine network and converts them into electrical, optical, or wireless signals to the memory 1506. The network interface 1512 may allow a robot to communicate with a cloud server, a mobile device, other robots, and other network-enabled devices.

In one embodiment, a global database 1518 may provide data storage available across the devices that comprise or are supported by the robotic control system 1500. The global database 1518 may include maps, robotic instruction algorithms, robot state information, static, movable, and tidyable object reidentification fingerprints, labels, and other data associated with known static, movable, and tidyable object reidentification fingerprints, or other data supporting the implementation of the disclosed solution. The global database 1518 may be a single data structure or may be distributed across more than one data structure and storage platform, as may best suit an implementation of the disclosed solution. In one embodiment, the global database 1518 is coupled to other components of the robotic control system 1500 through a wired or wireless network, and in communication with the network interface 1512.

In one embodiment, a robot instruction database 1520 may provide data storage available across the devices that comprise or are supported by the robotic control system 1500. The robot instruction database 1520 may include the programmatic routines that direct specific actuators of the tidying robot, such as are described with respect to FIG. 1A-FIG. 6D, FIG. 9, and FIG. 11-FIG. 14, to actuate and cease actuation in sequences that allow the tidying robot to perform individual and aggregate motions to complete tasks.

Figure 16:
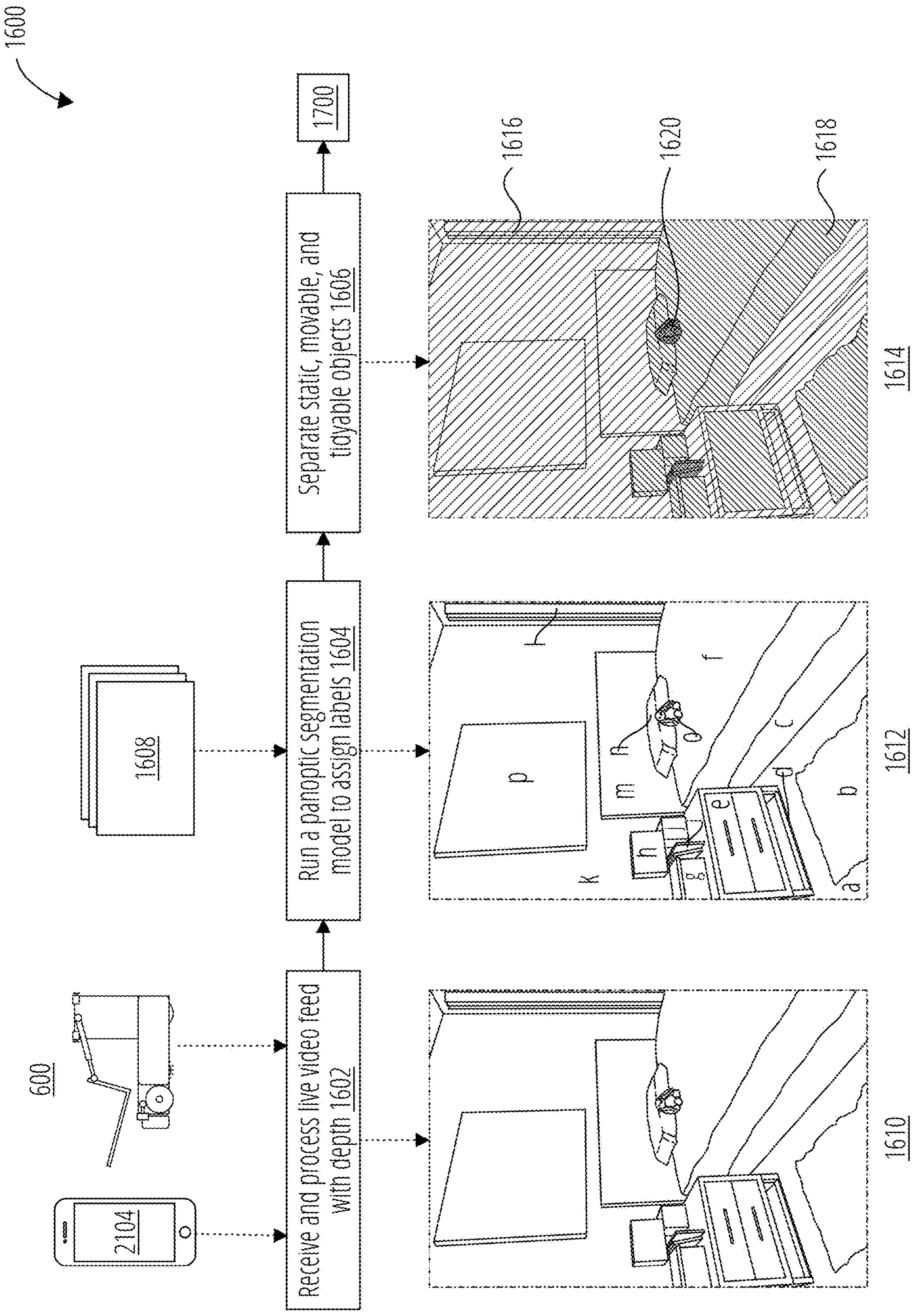
FIG. 16 illustrates a video-feed segmentation routine 1600 in accordance with one embodiment.

FIG. 16 illustrates a video-feed segmentation routine 1600 in accordance with one embodiment. Although the example video-feed segmentation routine 1600 depicts a particular sequence of operations, the sequence may be altered without departing from the scope of the present disclosure. For example, some of the operations depicted may be performed in parallel or in a different sequence that does not materially affect the function of the video-feed segmentation routine 1600. In other examples, different components of an example device or system that implements the video-feed segmentation routine 1600 may perform functions at substantially the same time or in a specific sequence.

According to some examples, the method includes receiving and processing live video with depth at block 1602. The live video feed may capture an environment to be tidied. For example, the mobile computing device 2104 illustrated in FIG. 21 may be configured to receive and process live video with depth using a camera configured as part of the mobile computing device 2104 in conjunction with the robotic control system 1500. This live video may be used to begin mapping the environment to be tidied, and to support the configuration and display of an AR user interface 2600 such as is described with respect to FIG. 26A. Alternatively, the tidying robot previously disclosed may be configured to receive and process live video with depth using their cameras 124 in conjunction with the robotic control system 1500. This may support the robot's initialization, configuration, and operation as disclosed herein. The live video feed may include images of a scene 1610 across the environment to be tidied. These may be processed to display an augmented reality view to a user on a global map of the environment to be tidied.

According to some examples, the method includes running a panoptic segmentation model 1608 to assign labels at block 1604. For example, the panoptic segmentation model 1608 illustrated in FIG. 16 may run a model to assign labels. The model may assign a semantic label (such as an object type), an instance identifier, and a movability attribute (such as static, movable, and tidyable) for each pixel in an image of a scene 1610 (such as is displayed in a frame of captured video). The panoptic segmentation model 1608 may be configured as part of the logic 1514 of the robotic control system 1500 in one embodiment. The panoptic segmentation model 1608 may in this manner produce a segmented image 1612 for each image of a scene 1610. Elements detected in the segmented image 1612 may in one embodiment be labeled as shown:

a. floor
b. rug
c. bedframe
d. nightstand
e. drawer
f. bedspread
g. box
h. lamp
i. books
j. picture
k. wall
l. curtains
m. headboard
n. pillow
o. stuffed animal
p. painting According to some examples, the method includes separating the segmented image into static objects 1616, movable objects 1618, and tidyable objects 1620 at block 1606. For example, the robotic control system 1500 illustrated in FIG. 15 may separate static, movable, and tidyable objects. Using the segmented image 1612 and assigned labels, static structures in the represented scene, such as floors, walls, and large furniture, may be separated out as static objects 1616 from movable objects 1618 like chairs, doors, and rugs, and tidyable objects 1620 such as toys, books, and clothing. Upon completion of the video-feed segmentation routine 1600, the mobile device, tidying robot, and robotic control system may act to perform the static object identification routine 1700 illustrated in FIG. 17 based on the objects separated into static objects, movable objects, and tidyable objects 1614.

Figure 17:
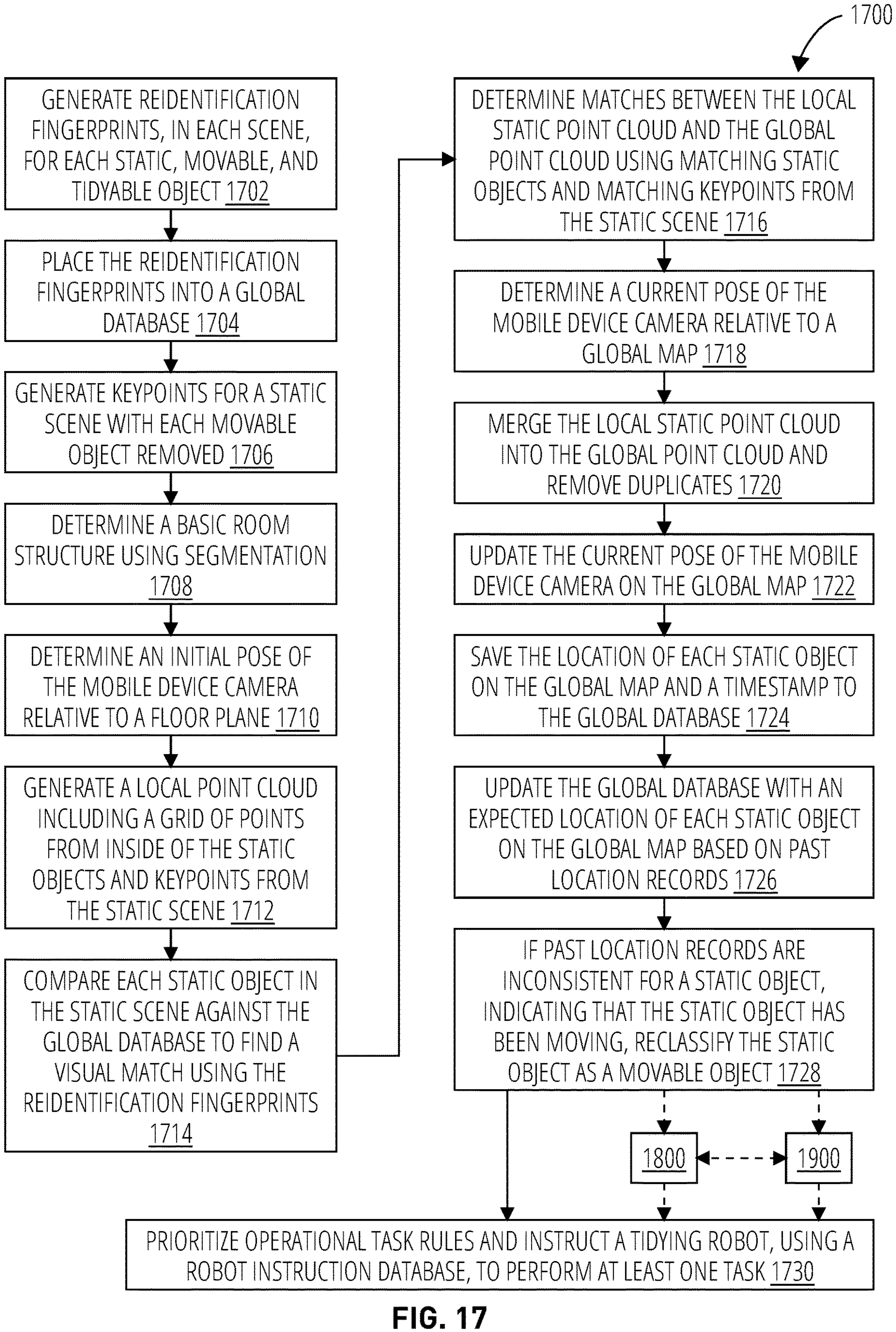
FIG. 17 illustrates a static object identification routine 1700 in accordance with one embodiment.

FIG. 17 illustrates a static object identification routine 1700 in accordance with one embodiment. The mobile device, such as a user's smartphone or tablet or the tidying robot, may use a mobile device camera to detect static objects in order to localize itself within the environment, since such objects may be expected to remain in the same position.

The indoor room structure such as the floor segmentation, wall segmentation, and ceiling segmentation may be used to orient the mobile device camera relative to the floor plane. This may provide the relative vertical position and orientation of the mobile device camera relative to the floor, but not necessarily an exact position on the map.

Scale invariant keypoints may be generated using the pixels in the segmented image 1612 that correspond with static objects, and these keypoints may be stored as part of a local point cloud.

Reidentification fingerprints may also be generated for each static object in the image frame and stored as part of a local point cloud.

Matching takes place between the local point cloud (based on the current mobile device camera frame) and the global point cloud (based on visual keypoints and static objects on the global map). This is used to localize the mobile device camera relative to the global map.

The mobile device camera may be the cameras 124 mounted on the tidying robot as previously described. The mobile device camera may also be a camera configured as part of a user's smartphone, tablet, or other commercially available mobile computing device.

Although the example static object identification routine 1700 depicts a particular sequence of operations, the sequence may be altered without departing from the scope of the present disclosure. For example, some of the operations depicted may be performed in parallel or in a different sequence that does not materially affect the function of the static object identification routine 1700. In other examples, different components of an example device or system that implements the static object identification routine 1700 may perform functions at substantially the same time or in a specific sequence. This static object identification routine 1700 may be performed by the robotic control system 1500 described with respect to FIG. 15.

According to some examples, the method includes generating reidentification fingerprints, in each scene, for each static, movable, and tidyable object at block 1702. This may be performed using a segmented image including static scene structure elements and omitting other elements. These reidentification fingerprints may act as query sets (query object fingerprints 2008) used in the object identification with fingerprints 2000 process described with respect to FIG. 20A and FIG. 20B. According to some examples, the method includes placing the reidentification fingerprints into a global database at block 1704. The global database may store data for known static, movable, and tidyable objects. This data may include known object fingerprints to be used as described with respect to FIG. 20A and FIG. 20B.

According to some examples, the method includes generating keypoints for a static scene with each movable object removed at block 1706. According to some examples, the method includes determining a basic room structure using segmentation at block 1708. The basic room structure may include at least one of a floor, a wall, and a ceiling. According to some examples, the method includes determining an initial pose of the mobile device camera relative to a floor plane at block 1710.

According to some examples, the method includes generating a local point cloud including a grid of points from inside of the static objects and keypoints from the static scene at block 1712. According to some examples, the method includes comparing each static object in the static scene against the global database to find a visual match using the reidentification fingerprints at block 1714. This may be performed as described with respect to object identification with fingerprints 2000 of FIG. 20A and FIG. 20B. According to some examples, the method includes determining matches between the local static point cloud and the global point cloud using matching static objects and matching keypoints from the static scene at block 1716.

According to some examples, the method includes determining a current pose of the mobile device camera relative to a global map at block 1718. The global map may be a previously saved map of the environment to be tidied. According to some examples, the method includes merging the local static point cloud into the global point cloud and remove duplicates at block 1720. According to some examples, the method includes updating the current pose of the mobile device camera on the global map at block 1722.

According to some examples, the method includes saving the location of each static object on the global map and a timestamp to the global database at block 1724. In one embodiment, new reidentification fingerprints for the static objects may also be saved to the global database. The new reidentification fingerprints to be saved may be filtered to reduce the number of fingerprints saved for an object.

According to some examples, the method includes updating the global database with an expected location of each static object on the global map based on past location records at block 1726. According to some examples, if past location records are inconsistent for a static object, indicating that the static object has been moving, the method includes reclassifying the static object as a movable object at block 1728.

Reclassifying the static object as a movable object may include generating an inconsistent static object location alert. The inconsistent static object location alert may be provided to the robotic control system of a tidying robot, such as that illustrated in FIG. 15, as feedback to refine, simplify, streamline, or reduce the amount of data transferred to instruct the tidying robot to perform at least one robot operation. The static object may then be reclassified as a movable object by updating the object's movability attribute in the global database. The global map may also be updated to reflect the reclassified movable object. Operational task rules may be prioritized based on the movability attributes and/or the updated movability attributes, thereby optimizing the navigation of the tidying robot or increasing the efficiency in power utilization by the tidying robot.

According to some examples, the method includes instructing a tidying robot, using a robot instruction database, such as the robot instruction database 1520 described with respect to FIG. 15, to perform at least one task at block 1730. Tasks may include sorting objects on the floor, tidying specific objects, tidying a cluster of objects, pushing objects to the side of a room, executing a sweep pattern, and executing a vacuum pattern.

In one embodiment, the robotic control system may perform steps to identify moveable objects or tidyable objects after it has identified static objects. The static object identification routine 1700 may in one embodiment be followed by the movable object identification routine 1800 or the tidyable object identification routine 1900 described below with respect to FIG. 18 and FIG. 19, respectively. Either of these processes may continue on to the performance of the other, or to the instruction of the tidying robot at block 1730.

Figure 18:
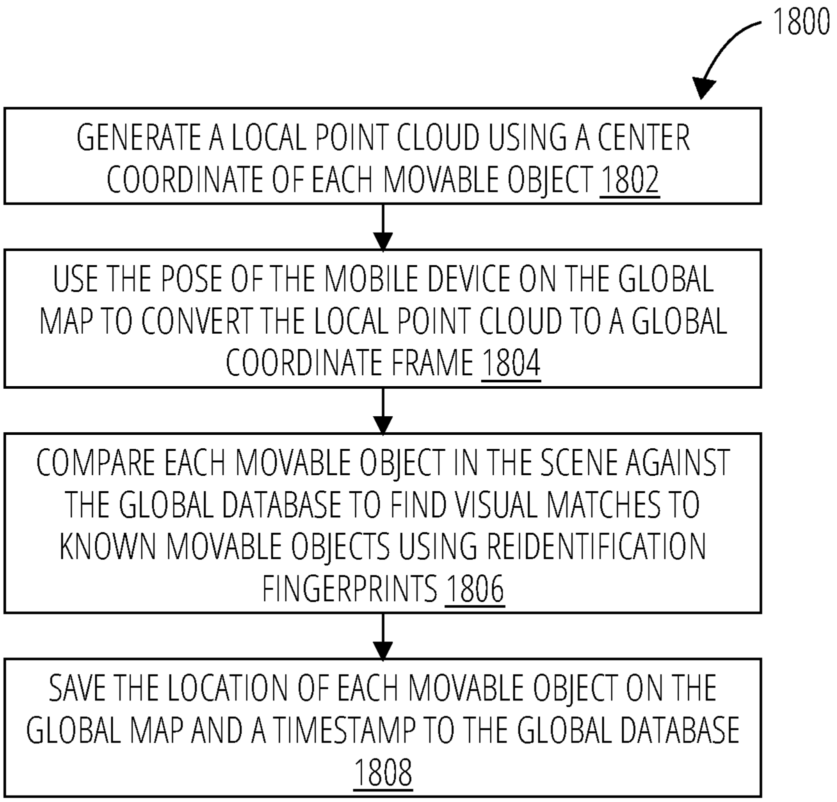
FIG. 18 illustrates a movable object identification routine 1800 in accordance with one embodiment.

FIG. 18 illustrates a movable object identification routine 1800 in accordance with one embodiment. Although the example movable object identification routine 1800 depicts a particular sequence of operations, the sequence may be altered without departing from the scope of the present disclosure. For example, some of the operations depicted may be performed in parallel or in a different sequence that does not materially affect the function of the movable object identification routine 1800. In other examples, different components of an example device or system that implements the movable object identification routine 1800 may perform functions at substantially the same time or in a specific sequence.

According to some examples, the method includes generating a local point cloud using a center coordinate of each movable object at block 1802. According to some examples, the method includes using the pose of the mobile device (either a user's mobile computing device or the tidying robot) on the global map to convert the local point cloud to a global coordinate frame at block 1804. According to some examples, the method includes comparing each movable object in the scene against the global database to find visual matches to known movable objects using reidentification fingerprints at block 1806.

According to some examples, the method includes saving the location of each movable object on the global map and a timestamp to the global database at block 1808. In one embodiment, new reidentification fingerprints for the movable objects may also be saved to the global database. The new reidentification fingerprints to be saved may be filtered to reduce the number of fingerprints saved for an object.

Figure 19:
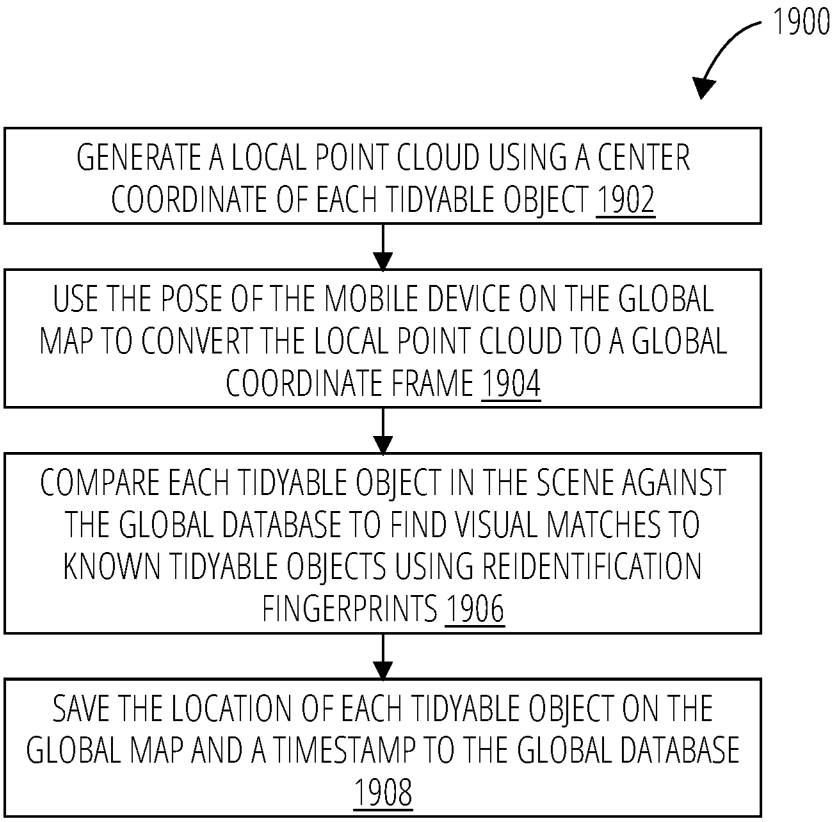
FIG. 19 illustrates a tidyable object identification routine 1900 in accordance with one embodiment.

FIG. 19 illustrates a tidyable object identification routine 1900 in accordance with one embodiment. Although the example tidyable object identification routine 1900 depicts a particular sequence of operations, the sequence may be altered without departing from the scope of the present disclosure. For example, some of the operations depicted may be performed in parallel or in a different sequence that does not materially affect the function of the tidyable object identification routine 1900. In other examples, different components of an example device or system that implements the tidyable object identification routine 1900 may perform functions at substantially the same time or in a specific sequence.

According to some examples, the method includes generating a local point cloud using a center coordinate of each tidyable object at block 1902. According to some examples, the method includes using the pose of the mobile device (either a user's mobile computing device or the tidying robot) on the global map to convert the local point cloud to a global coordinate frame at block 1904. According to some examples, the method includes comparing each tidyable object in the scene against the global database to find visual matches to known tidyable objects using reidentification fingerprints at block 1906.

According to some examples, the method includes saving the location of each tidyable object on the global map and a timestamp to the global database at block 1908. In one embodiment, new reidentification fingerprints for the tidyable objects may also be saved to the global database. The new reidentification fingerprints to be saved may be filtered to reduce the number of fingerprints saved for an object. In one embodiment, the user may next use an AR user interface to identify home locations for tidyable objects. These home locations may also be saved in the global database.

Figure 20A:
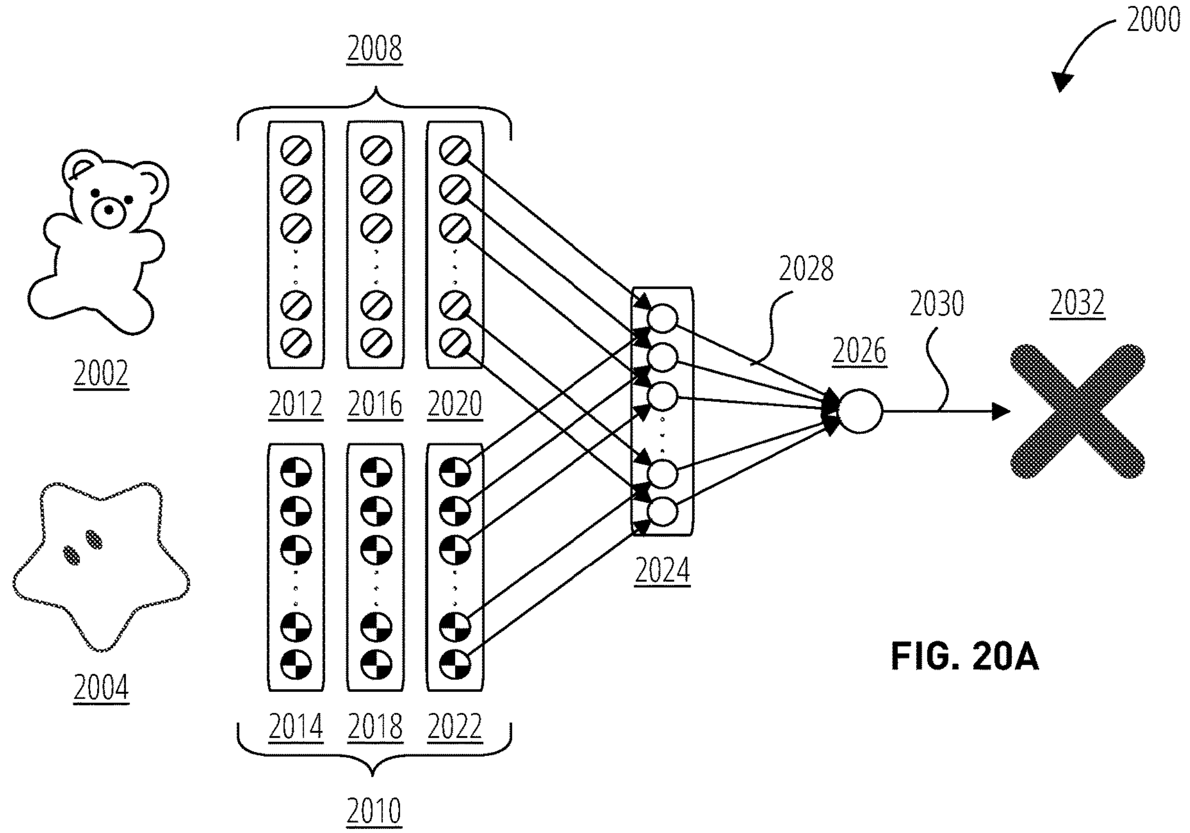
FIG. 20A and FIG. 20B illustrate object identification with fingerprints 2000 in accordance with one embodiment.
Figure 20B:
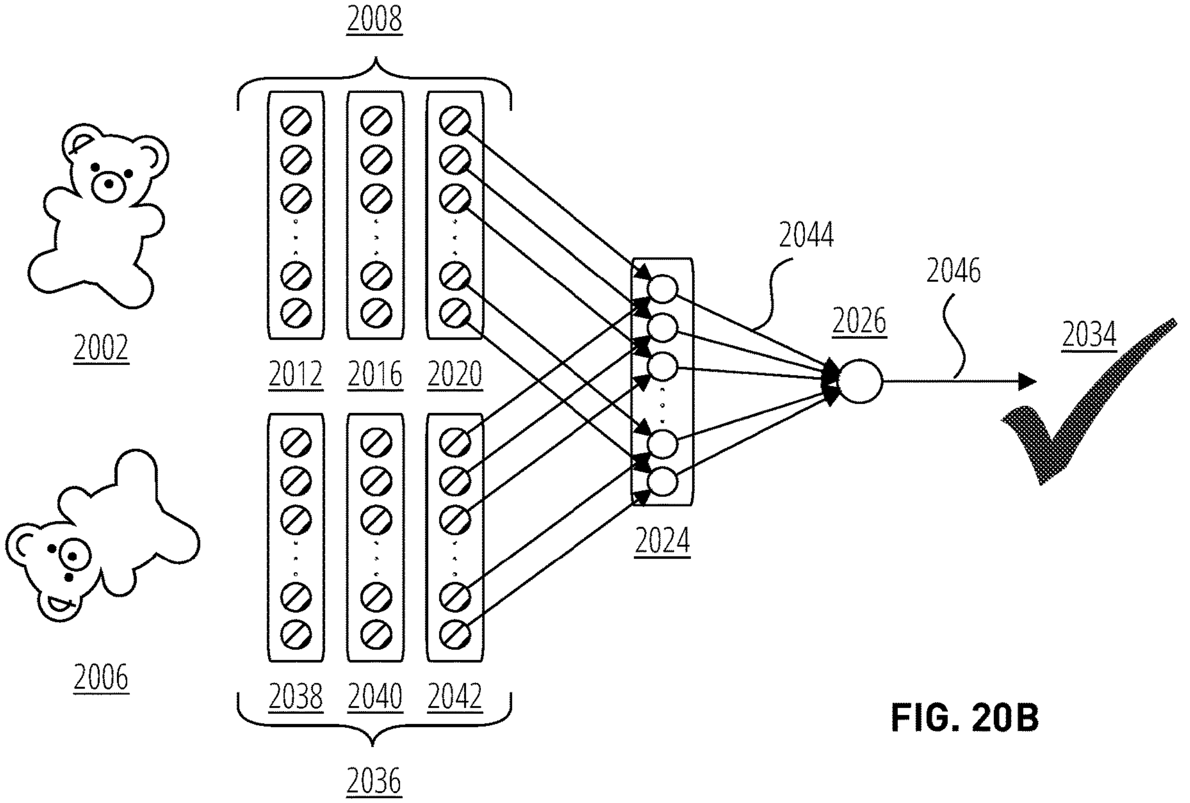

FIG. 20A and FIG. 20B illustrate object identification with fingerprints 2000 in accordance with one embodiment. FIG. 20A shows an example where a query set of fingerprints does not match the support set. FIG. 20B shows an example where the query set does match the support set.

A machine learning algorithm called meta-learning may be used to re-identify objects detected after running a panoptic segmentation model 1608 on a frame from an image of a scene 1610 as described with respect to FIG. 16. This may also be referred to as few-shot learning.

Images of objects are converted into embeddings using a convolutional neural network (CNN). The embeddings may represent a collection of visual features that may be used to compare visual similarity between two images. In one embodiment, the CNN may be specifically trained to focus on reidentifying whether an object is an exact visual match (i.e, determine if it is an image of the same object).

A collection of embeddings that represent a particular object may be referred to as a re-identification fingerprint. When re-identifying an object, a support set or collection of embeddings for each known object and a query set including several embeddings for the object being re-identified may be used. For example, for query object 2002, query object fingerprint 2008 may comprise the query set and may include query object embedding 2012, query object embedding 2016, and query object embedding 2020. Known objects 2004 and 2006 may each be associated with known object fingerprint 2010 and known object fingerprint 2036, respectively. Known object fingerprint 2010 may include known object embedding 2014, known object embedding 2018, and known object embedding 2022. Known object fingerprint 2036 may include known object embedding 2038, known object embedding 2040, and known object embedding 2042.

Embeddings may be compared in a pairwise manner using a distance function to generate a distance vector that represents the similarity of visual features. For example, distance function 2024 may compare the embeddings of query object fingerprint 2008 and known object fingerprint 2010 in a pairwise manner to generate distance vectors 2028. Similarly, the embeddings of query object fingerprint 2008 and known object fingerprint 2036 may be compared pairwise to generate distance vectors 2044.

A probability of match may then be generated using a similarity function that takes all the different distance vector (s) as input. For example, similarity function 2026 may use distance vectors 2028 as input to generate a probability of a match 2030 for query object 2002 and known object 2004. The similarity function 2026 may likewise use distance vectors 2044 as input to generate a probability of a match 2046 for query object 2002 and known object 2006. Note that because an object may look visually different when viewed from different angles it is not necessary for all of the distance vector(s) to be a strong match.

Additional factors may also be taken into account when determining the probability of a match such as object position on the global match and the object type as determined by the panoptic segmentation model. This is especially important when a small support set is used.

Taking these factors into account, the probability of a match 2030 may indicate no match 2032 between query object 2002 and known object 2004. On the other hand, the probability of a match 2046 may indicate a match 2034 between query object 2002 and known object 2006. Query object 2002 may thus be re-identified with high confidence as known object 2006 in one embodiment.

Once an object has been re-identified with high confidence, embeddings from the query set (query object fingerprint 2008) may be used to update the support set (known object fingerprint 2036). This may improve the reliability of re-identifying an object again in the future. However, the support set may not grow indefinitely and may have a maximum number of samples.

In one embodiment, a prototypical network may be chosen, where different embeddings for each object in the support set are combined into an "average embedding" or "representative embedding" which may then be compared with the query set to generate a distance vector as an input to help determine the probability of a match. In one embodiment, more than one "representative embedding" for an object may be generated if the object looks visually different from different angles.

Figure 21:
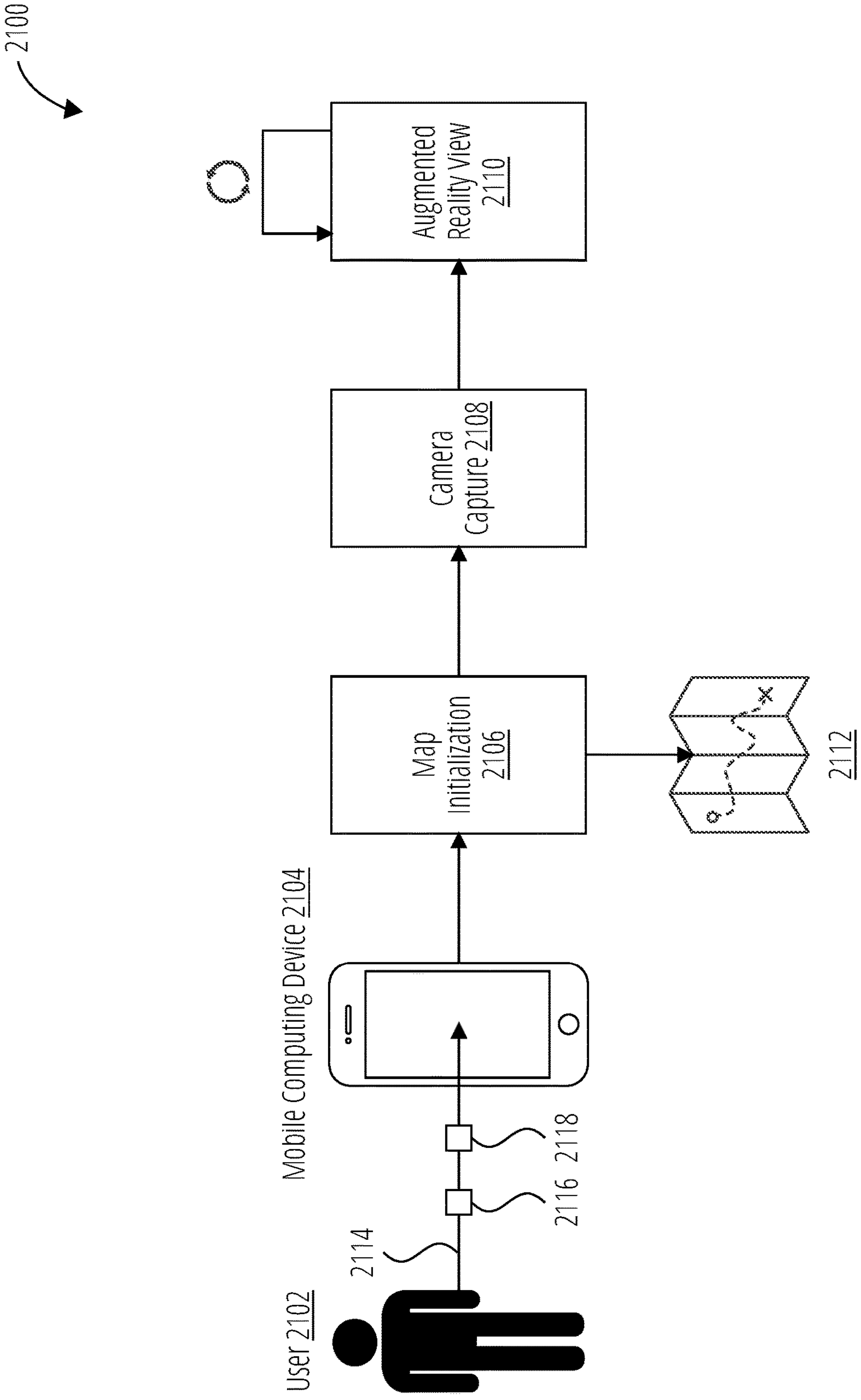
FIG. 21 illustrates a map configuration routine 2100 in accordance with one embodiment.

FIG. 21 illustrates a map configuration routine 2100 in accordance with one embodiment. User 2102 may use a mobile computing device 2104 to perform map initialization at block 2106. In this manner, the environment to be tidied may be mapped either starting from a blank map or from a previously saved map to generate a new or updated global map 2112.

A camera on the mobile computing device 2104 may be used to perform the camera capture at block 2108, providing a live video feed. The live video feed from the mobile device's camera may be processed to create an augmented reality interface that user 2102 may interact with. The augmented reality display may show users 2102 existing operational task rules such as:

- Push objects to side: Selects group of objects (e.g., based on object type or an area on map) to be pushed or placed along the wall, into an open closet, or otherwise to an area out of the way of future operations.
- Sweep Pattern: Marks an area on the map for the robot to sweep using pusher pads and scoop.
- Vacuum pattern: Marks an area on the map for the robot to vacuum.
- Mop pattern: Marks an area on the map for the robot to mop.
- Tidy cluster of objects: Selects groups of objects (e.g., based on object type or an area on the map) to be tidied and dropped at a home location.
- Sort on floor: Selects groups of objects (e.g., based on object type or an area on the map) to be organized on the floor based on a sorting rule.
- Tidy specific object: Selects a specific object to be tidied and dropped at a home location.

The augmented reality view may be displayed to the user 2102 on their mobile computing device 2104 as they map the environment and at block 2110. Using an augmented reality view such as that displayed with respect to FIG. 26A, along with a top-down, two-dimensional map, the user 2102 may configure different operational task rules through user input signals 2114.

| Task | Target | Home |
|---|---|---|
| High-level information describing the task to be completed.<br>Task Type<br>Task Priority<br>Task Schedule | Specifies what objects and locations are to be tidied or cleaned.<br>Target Object Identifier<br>Target Object Type<br>Target Object Pattern<br>Target Area<br>Target Marker Object | Specifies the home location where tidied objects are to be placed.<br>Home Object Label<br>Home Object Identifier<br>Home Object Type<br>Home Area<br>Home Position |

User input signals 2114 may indicate user selection of a tidyable object detected in the environment to be tidied, identification of a home location for the selected tidyable object, custom categorization of the selected tidyable object, identification of a portion of the global map as a bounded area, generation of a label for the bounded area to create a named bounded area, and definition of at least one operational task rule that is an area-based rule using the named bounded area, wherein the area-based rule controls the performance of the robot operation when the tidying robot is located in the named bounded area. Determining bounded areas and area-based rules is described in additional detail with respect to FIG. 22A-FIG. 22C. Other elements of the disclosed solution may also be configured or modified based on user input signals 2114, as will be well understood by one of ordinary skill in the art.

In one embodiment, the camera may be a camera 124 of a robot such as those previously disclosed, and these steps may be performed similarly based on artificial intelligence analysis of known floor maps of tidying areas and detected objects, rather than an augmented reality view. In one embodiment, rules may be pre-configured within the robotic control system, or may be provided to the tidying robot through voice commands detected through a microphone configured as part of the sensing system 106.

Figure 22A:
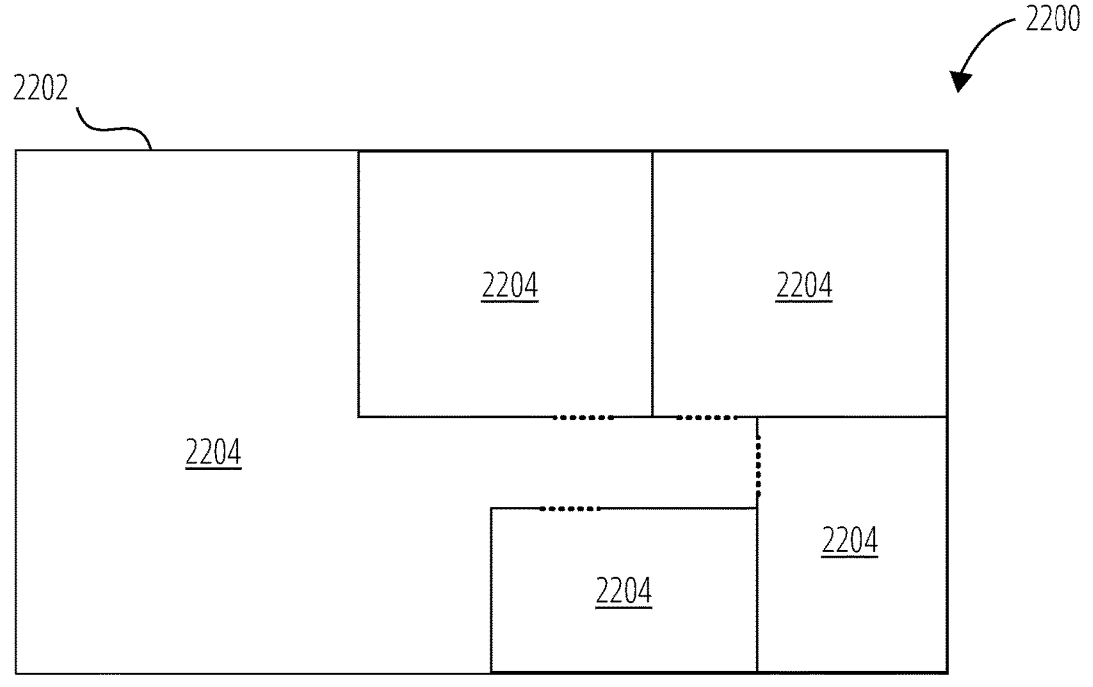
FIG. 22A illustrates a starting state for a floor map 2200 in accordance with one embodiment.
Figure 22B:
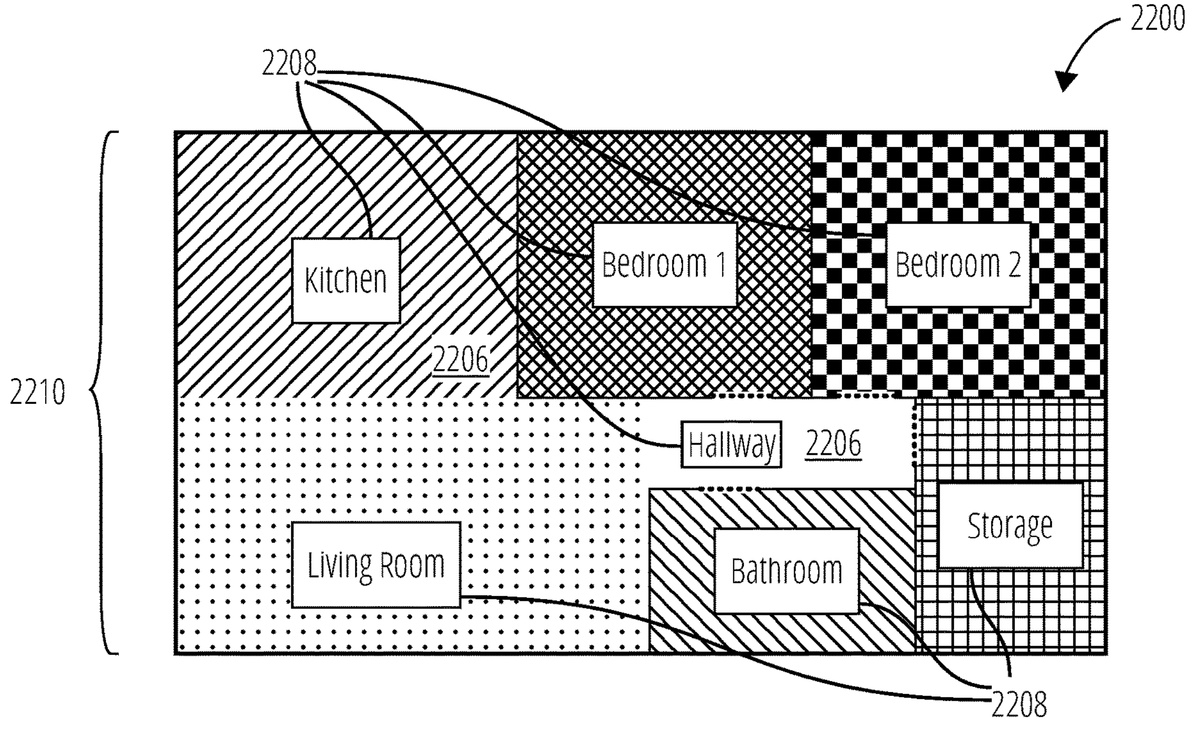
FIG. 22B illustrates a floor map 2200 with areas identified by a user in accordance with one embodiment.
Figure 22C:
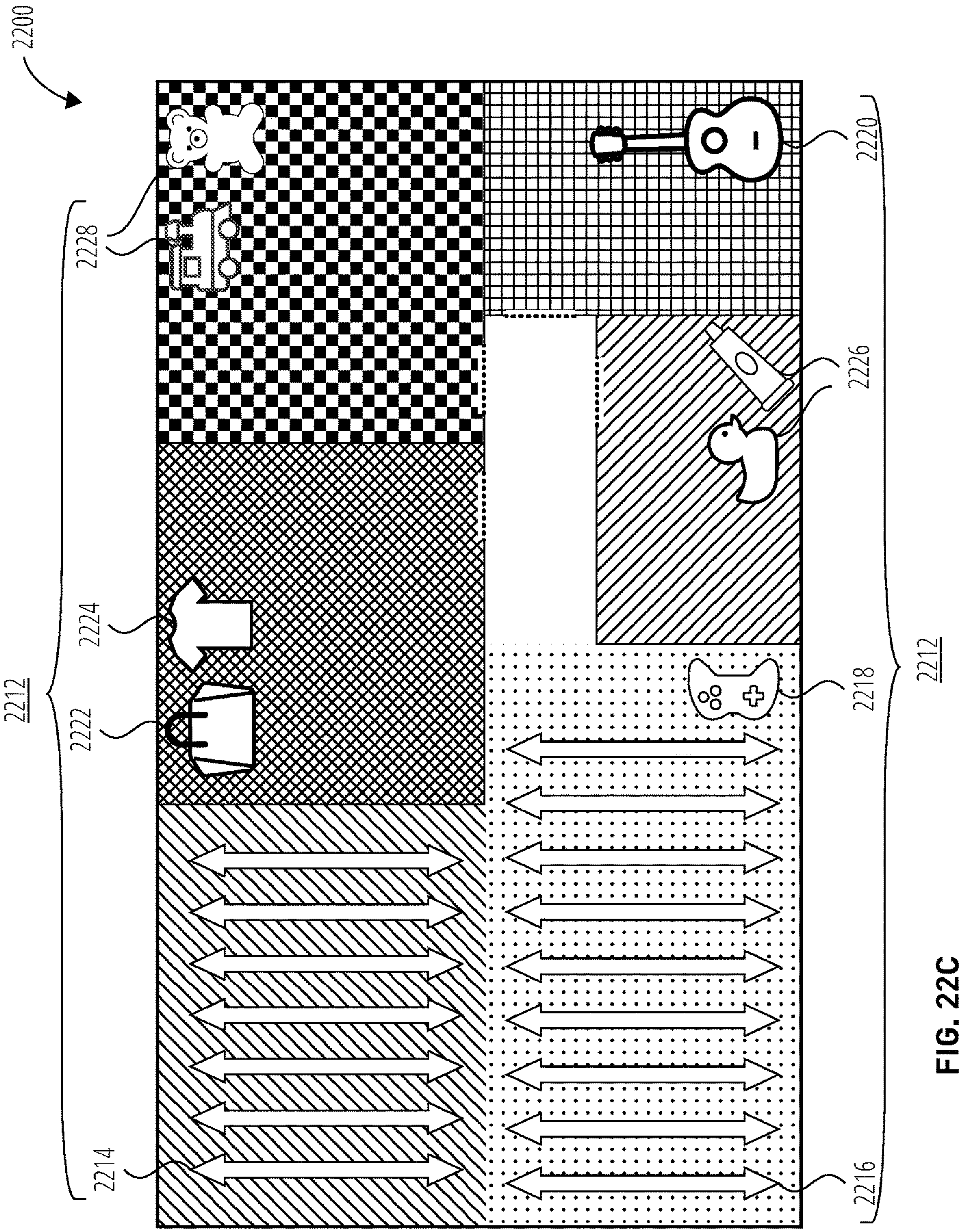
FIG. 22C illustrates a floor map 2200 with rules established by a user in accordance with one embodiment.

FIG. 22A-FIG. 22C illustrate a floor map 2200 in accordance with one embodiment. In one embodiment, the floor map 2200 may be generated based on the basic room structure detected by a mobile device according to the process illustrated in static object identification routine 1700. FIG. 22A shows a starting state 2202 with initial bounded areas 2204, FIG. 22B shows additional bounded areas 2206 as well as area labels 2208 applied to form named bounded areas 2210, and FIG. 22C shows area-based rules 2212 for the areas.

Users may name areas on the map and then create operational task rules based on these areas. At its starting state 2202, the floor map 2200 may have no areas assigned or may have some initial bounded areas 2204 identified based on detected objects, especially static objects such as walls, windows, and doorframes that indicate where one area ends and another area begins. Users may subdivide the map by providing bounded area selection signals 2116 to set area boundaries and, in one embodiment, may mark additional bounded areas 2206 on the map using their mobile device by providing label selection signals 2118. Area labels 2208 may be applied by the user or may be generated based on detected objects as described below to form named bounded areas 2210.

The panoptic segmentation model may include object types for both static objects and moveable objects. When such objects are detected in a location associated with an area on the floor map 2200, such objects may be used to generate suggested area names based on what objects appear in that given area. For example:

Oven+Fridge+Microwave⇒Kitchen
Bed Frame+Mattress⇒Bedroom
Toilet+Shower⇒Bathroom
Couch+Television⇒Living Room The named bounded areas 2210 may then be used to establish area-based rules 2212. For example, area-based rules 2212 may include a time rule 2214, such as a rule to sweep the kitchen if the robot is operating between 8:00 PM and 9:00 PM on weekdays. A similar time rule 2216 may be created to also vacuum the living room if the robot is operating between 8:00 PM and 9:00 PM on weekdays.

Additional area-based rules 2212 may be created around tidying up a specific object or tidying up objects of a certain type and setting the drop off location to be within a home area. For example, an object rule 2218 may be created to place a game console remote at a specific home location in the living room area. Another object rule 2220 may be created to place a guitar in a storage closet. Category rule 2222 and category rule 2224 may be created such that objects of a specific category (such as "bags" and "clothing", respectively) are placed in a first bedroom. Category rule 2226 may call for "bathroom items" to be placed in the bathroom. Category rule 2228 may instruct the robot to place "toys" in a second bedroom.

The following describes a set of different operational task rules that may be used to configure the robot's tidying behavior.

| Field | Description | Values |
|---|---|---|
| Task Type | Type of operational task robot may take | Task List [TIDY_OBJECT], [TIDY_CLUSTER], [VACUUM], [SWEEP], [PUSH_TO_SIDE], [SORT_ON_FLOOR], [RETURN_TO_DOCK] |
| Task Priority | Relative priority of when operational task is to be taken | Priority List [PRIORITY_1], [PRIORITY_2], . . . , [PRIORITY_10] |
| Task Schedule | Schedule in terms of what time(s) and what day(s) when task may be performed | Time(s) Start Time, End Time Day(s) All Days, Days of Week, Days of Month, Days of Year |
| Target Object Identifier | Used to select object(s) during pickup. Identifier that may visually uniquely identify a specific object in the environment to be picked up. A technique called meta learning may be used for this where several embeddings are generated that allow us to measure visual similarity against a reference set. This set of embeddings may be called a re-identification fingerprint. | Re-identification fingerprint Embedding 1: $[A_1, B_1, C_1, \ldots Z_1]$ Embedding 2: $[A_2, B_2, C_2, \ldots Z_2]$ Embedding 3: $[A_3, B_3, C_3, \ldots Z_3]$ . . . Embedding N: $[A_N, B_N, C_N, \ldots Z_N]$ |
| Target Object Type | Used to select object(s) during pickup. Identifier that classifies objects based on their semantic type that allows us to specify a collection of similar objects to be picked up. This may be from a list of predefined types, or a user may create a custom type. | Type List [CLOTHES], [MAGNETIC_TILES], [DOLLS], [PLAY_FOOD], [SOFT_TOYS], [BALLS], [BABY_TOYS], [TOY_ANIMALS], [BLOCKS], [LEGOS], [BOOKS], [TOY_VEHICLES], [MUSIC], [ARTS_CRAFTS], [PUZZLES], [DRESS_UP], [PET_TOYS], [SPORTS], [GAMES], [PLAY_TRAINS], [TOY_DINOSAURS], [KITCHEN], [TOOLS], [SHOES], [GARBAGE], . . . , [MISCELLANEOUS] |
| Target Object Pattern | Used to select object(s) during pickup. Specialized pattern matching classification rule that may be used to further sort objects beyond just type in selecting what objects to pick up. This may be from a list of predefined patterns, or a user may create a custom pattern. | Pattern List [COLOR], [SOLID_STRIPES_PLAID], [WOOD_PLASTIC_METAL], . . . , [CROCHET_KNIT_SEWN] |
| Target Object Size | Used to select object(s) during pickup. Group objects based on their size by looking at whether they would fit within a given volume. (E.g. X_SMALL: fits in a 0.5 cm radius sphere, SMALL: fits in a 3 cm radius sphere, | Size List [X_SMALL], [SMALL], [MEDIUM], [LARGE], [X_LARGE], [XX_LARGE] |

-continued

| Field | Description | Values |
|---|---|---|
| | MEDIUM: fits in a 6 cm radius sphere, LARGE: fits in a 12 cm radius sphere, X_LARGE: fits in a 24 cm radius sphere, XX LARGE: doesn't fit in 24 cm radius sphere) | |
| Target Area | Used to select object(s) during pickup.<br>Users may mark areas on a saved map of the environment such as assigning names to rooms or even marking specific sections within a room.<br>This may be from a list of predefined areas, or a user may create a custom area. | Area List<br>[ANY_AREA], [LIVING_ROOM], [KITCHEN], [DINING ROOM], [PLAY_AREA], [BEDROOM_1], [BEDROOM_2], [BEDROOM_3], [BATHROOM_1], [BATHROOM_2], . . . , [ENTRANCE] |
| Target Marker Object | Used to select object(s) during pickup.<br>Identifier that may visually uniquely identify a specific object in the environment to be used as a marker where adjacent objects may be picked up. For example, a marker may be a specific mat or chair holding objects desired to be picked up. Typically markers may not be picked up themselves.<br>A technique called meta learning may be used for this where several embeddings are generated that allow us to measure visual similarity against a reference set.<br>This set of embeddings may be called a re-identification fingerprint. | Re-identification fingerprint<br>Embedding 1: $[A_1, B_1, C_1, \ldots Z_1]$<br>Embedding 2: $[A_2, B_2, C_2, \ldots Z_2]$<br>Embedding 3: $[A_3, B_3, C_3, \ldots Z_3]$<br>. . .<br>Embedding N: $[A_N, B_N, C_N, \ldots Z_N]$ |
| Home Object Label | Used to identify a home location for drop off.<br>Label is attached to a destination home object where target object(s) are to be dropped off. Often such a destination home object will be a bin.<br>Bin label may be be a human readable label with a category type such as "Clothes" or "Legos", or it might be a machine readable label such as a quick response (QR) code.<br>This may be from a list of predefined types, or a user may create a custom type. | Destination Label<br>[CLOTHES], [MAGNETIC_TILES], [DOLLS], [PLAY_FOOD], [SOFT_TOYS], [BALLS], [BABY_TOYS], [TOY_ANIMALS], [BLOCKS], [LEGOS], [BOOKS], [TOY_VEHICLES], [MUSIC], [ARTS_CRAFTS], [PUZZLES], [DRESS_UP], [PET_TOYS], [SPORTS], [GAMES], [PLAY_TRAINS], [TOY_DINOSAURS], [KITCHEN], [TOOLS], [SHOES], [GARBAGE], . . . , [MISCELLANEOUS] |
| Home Object Identifier | Used to identify a home location for drop off.<br>Identifier that may visually uniquely identify a specific object in the environment where target object(s) are to be dropped off. Often such a destination home object will be a bin.<br>A technique called meta learning may be used for this where several embeddings are generated that allow us to measure visual similarity against a reference set.<br>This set of embeddings may be called a re-identification fingerprint. | Re-identification fingerprint<br>Embedding 1: $[A_1, B_1, C_1, \ldots Z_1]$<br>Embedding 2: $[A_2, B_2, C_2, \ldots Z_2]$<br>Embedding 3: $[A_3, B_3, C_3, \ldots Z_3]$<br>. . .<br>Embedding N: $[A_N, B_N, C_N, \ldots Z_N]$ |

-continued

| Field | Description | Values |
|---|---|---|
| Home Object Type | Used to identify a home location for drop off. Identifier that classifies objects based on their semantic type that allows us to create rules for a destination type where target object(s) are to be dropped off. This may be from a list of predefined types, or a user may create a custom type. | Type List [BIN], [FLOOR], [BED], [RUG], [MAT], [SHELF], [WALL], [COUNTER], [CHAIR], . . . , [COUCH] |
| Home Area | Used to identify a home location for drop off. Users may mark areas on a saved map of the environment such as assigning names to rooms or even marking specific sections within a room where target object(s) are to be dropped off. This may be from a list of predefined areas, or a user may create a custom area. | Area List [ANY_AREA], [LIVING_ROOM], [KITCHEN], [DINING ROOM], [PLAY_AREA], [BEDROOM_1], [BEDROOM_2], [BEDROOM_3], [BATHROOM_1], [BATHROOM_2], . . . , [ENTRANCE] |
| Home Position | Used to identify a home location for drop off. Users may mark a specific position relative to a destination home object where an object is to be dropped off. This will typically be relative to a standard home object orientation such as a bin or a shelf having a clear front, back, left, and right when approached by the robot. This may be from a list of predefined positions, or a user may create a custom position. | Position [FRONT_CENTER], [FRONT_LEFT], [FRONT_RIGHT], [MID_CENTER], [MID_LEFT], [MID_RIGHT], [BACK_CENTER], [BACK_LEFT], . . . , [BACK_RIGHT] |

Figure 23:
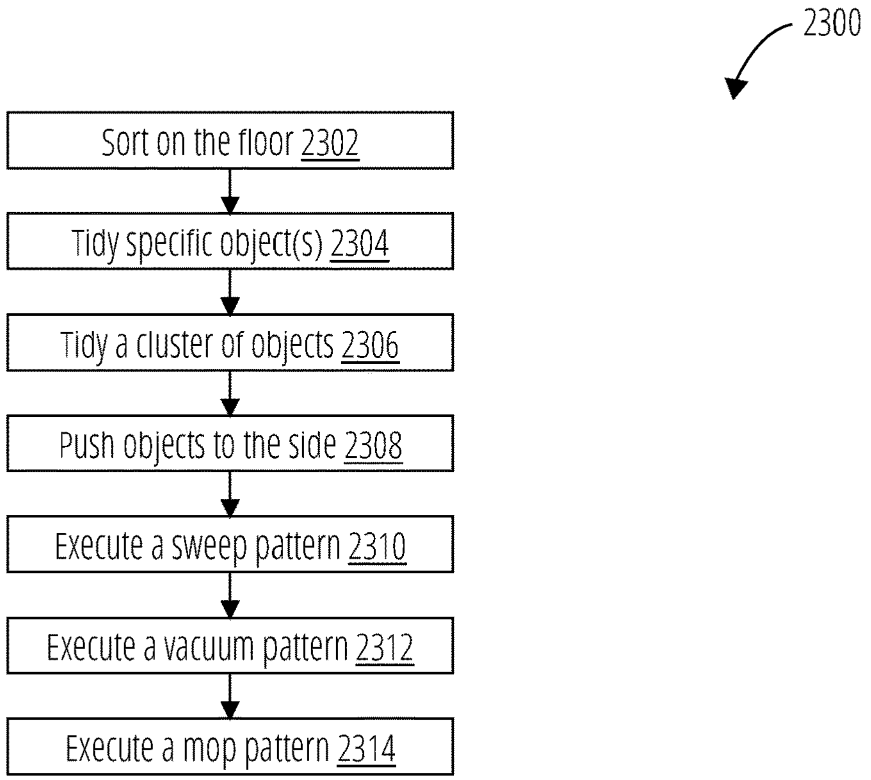
FIG. 23 illustrates an exemplary multi-stage tidying routine 2300 in accordance with one embodiment.

FIG. 23 illustrates an exemplary multi-stage tidying routine 2300 in accordance with one embodiment. Although the example exemplary multi-stage tidying routine 2300 depicts a particular sequence of operations, the sequence may be altered without departing from the scope of the present disclosure. For example, some of the operations depicted may be performed in parallel or in a different sequence that does not materially affect the function of the exemplary multi-stage tidying routine 2300. In other examples, different components of an example device or system that implements the exemplary multi-stage tidying routine 2300 may perform functions at substantially the same time or in a specific sequence.

According to some examples, the method includes sorting on the floor at block 2302. For example, the tidying robot 600 illustrated in FIG. 6A may sort on the floor. The tidying robot may initially sort objects located on the floor. This sorting may group the objects based on an object type for easier pickup.

According to some examples, the method includes tidying specific object(s) at block 2304. The tidying robot may put away a specific object or specific objects, dropping them at their home locations.

According to some examples, the method includes tidying a cluster of objects at block 2306. The tidying robot may tidy clusters of objects, dropping them at their home locations. In one embodiment, the robot may collect multiple objects having the same home location as one cluster to be tidied.

According to some examples, the method includes pushing objects to the side at block 2308. The tidying robot may push remaining objects without home locations to the side of the room they currently reside in, along the wall, into an open closet, or otherwise to an area out of the way of future operations.

According to some examples, the method includes executing a sweep pattern at block 2310. The tidying robot may use pusher pads having brushes to sweep dirt and debris from the floor into the scoop. The robot may then transport the dirt and debris to a garbage bin and dump it therein.

According to some examples, the method includes executing a vacuum pattern at block 2312. The tidying robot may vacuum up any remaining fine dust and dirt, leaving the floor clear. In one embodiment, the vacuumed dust and dirt may be stored in the robot's dust bin and emptied later at the charging dock.

According to some examples, the method includes executing a mop pattern at block 2314. For example, the tidying robot 900 illustrated in FIG. 9 may execute a mop pattern. The tidying robot may wet-mop the floor using a mop pad to further deep-clean a hard floor such as tile, vinyl, or wood.

This staged approach may allow the robot to progressively tidy a messy room by breaking the cleaning effort into manageable tasks, such as organizing objects on the floor before trying to put them away, putting objects away before sweeping, sweeping up dirt and debris such as food pieces before vacuuming up finer particles, etc.

FIG. 24 illustrates an AR user routine 2400 in accordance with one embodiment. The AR user routine 2400 describes a high-level process for how the user may interact with the AR user interface using a mobile device to create operational task rules such as setting home locations for objects. Although the example AR user routine 2400 depicts a particular sequence of operations, the sequence may be altered without departing from the scope of the present disclosure. For example, some of the operations depicted may be performed in parallel or in a different sequence that does not materially affect the function of the AR user routine 2400. In other examples, different components of an example device or system that implements the AR user routine 2400 may perform functions at substantially the same time or in a specific sequence.

According to some examples, the method includes processing live video into a segmented view at block 2402. For example, the robotic control system 1500 illustrated in FIG. 15 may process live video into a segmented view. A live video feed captured by, for example, a mobile device camera, may be processed to generate a segmented view, separating a scene into static objects, movable objects, and tidyable objects.

According to some examples, the method includes using static objects to update the global map and localize the mobile device at block 2404. For example, the robotic control system 1500 illustrated in FIG. 15 may use static objects to update the global map and localize the mobile device. The static part of the scene captured in the live video feed and segmented as static objects may be used to update the global map and localize the mobile device within the environment in a way that is resilient to objects being moved.

According to some examples, the method includes uniquely identifying movable objects at block 2406. For example, the robotic control system 1500 illustrated in FIG. 15 may uniquely identify movable objects. Movable objects may be uniquely identified against a database of known objects. The position of these objects may be updated on the global map. The database of known objects may also be updated as needed based on identification of the movable objects.

According to some examples, the method includes uniquely identifying tidyable objects at block 2408. For example, the robotic control system 1500 illustrated in FIG. 15 may uniquely identify tidyable objects. Tidyable objects may be identified against a database of known objects. The position of these objects may be updated on the global map. The database of known objects may also be updated as needed based on the identification of the tidyable objects.

According to some examples, the method includes displaying the AR user interface to the user at block 2410. For example, the mobile computing device 2104 illustrated in FIG. 21 may display the AR user interface to the user. The AR user interface may guide the user in configuring a map and setting home locations for tidyable objects.

According to some examples, the method includes identification by a user of home locations for tidyable objects using tidyable object home location identification routine 2500. According to some examples, the method includes saving updates to a global known tidyable objects database at block 2412 when the tidyable object home location identification routine 2500 is complete.

FIG. 25 illustrates a tidyable object home location identification routine 2500 in accordance with one embodiment. Although the example tidyable object home location identification routine 2500 depicts a particular sequence of operations, the sequence may be altered without departing from the scope of the present disclosure. For example, some of the operations depicted may be performed in parallel or in a different sequence that does not materially affect the function of the tidyable object home location identification routine 2500. In other examples, different components of an example device or system that implements the tidyable object home location identification routine 2500 may perform functions at substantially the same time or in a specific sequence.

According to some examples, the method includes selecting a displayed tidyable object at block 2502. For example, the user 2102 illustrated in FIG. 21 may select a displayed tidyable object. Tidyable objects identified at block 2408 of the AR user routine 2400 may be displayed in the AR user interface. The user may interact with the AR user interface to touch, tap, click on, or otherwise indicate the selection of a particular tidyable object in the AR user interface, as is described in additional detail with respect to the AR user interface 2600 illustrated in FIG. 26A-FIG. 26I.

According to some examples, the method includes generating a list of suggested home locations at block 2504. For example, the robotic control system 1500 illustrated in FIG. 15 may generate a list of suggested home locations. A list of suggested home locations for the user-selected tidyable object may be generated. In one embodiment, the list may comprise a set of all home locations previously indicated in a user-configured map. In one embodiment, categories pertaining to the presently selected tidyable object may be used to refine a list of possible home locations to prioritize the display of those home locations previously identified for similarly categorized objects.

According to some examples, the method includes indicating object selection and showing the home location list at block 2506. For example, the mobile computing device 2104 illustrated in FIG. 21 may indicate object selection and show the home location list. The tidyable object indicated by the user may be displayed as selected in the AR user interface using such techniques as colored outlines, halos, bounding boxes, periodic motions or transformations, and other techniques as will be readily understood by one of ordinary skill in the art. The list of home locations previously identified may also be displayed in the AR user interface. In one embodiment, this list may be a text list comprising labels for locations the user has previously configured in the map for the environment to be tidied. In another embodiment, the user or a machine learning process may associate thumbnails captured using the mobile device camera with identified home locations, and the list displayed in the AR user interface may be a set of these thumbnails. Combinations thereof, and other list display formats which are well understood in the art, may also be used.

According to some examples, the method includes requesting display adjustment at block 2508. For example, the user 2102 illustrated in FIG. 21 may request display adjustment. In one embodiment, the user may interact with the AR user interface to adjust which portion of the list of home locations is displayed or to request a different list of home locations be displayed. The user may wish to adjust the view displayed in the AR user interface by zooming or panning to different portions of the environment.

According to some examples, the method includes quickly touching and releasing the selected object at block 2510. For example, the user 2102 illustrated in FIG. 21 may quickly touch and release. In one embodiment, the user may tap the selected object on the mobile device touchscreen display, i.e., may quickly touch and release the object without dragging. In one embodiment, the quick touch and release action may set the selected object's current location as its home location.

According to some examples, the method includes touching and dragging the selected object to a list suggestion at block 2512. For example, the user 2102 illustrated in FIG. 21 may touch and drag the object to a list suggestion. In one embodiment, the user may touch the selected object in the AR user interface, and may, while still touching the object on their mobile device touchscreen display, drag their finger along the display surface toward a displayed element in the home location list. In one embodiment, a visual overlap of the object with a home location list element in the displayed AR user interface may set the listed location as the home location for the selected object. In another embodiment, the home location may not be set until the user releases their finger from their mobile device touchscreen display.

According to some examples, the method includes touching and dragging the selected object to a map location at block 2514. For example, the user 2102 illustrated in FIG. 21 may touch and drag an object to map location. In one embodiment, the user may touch the selected object in the AR user interface, and may, while still touching the object on their mobile device touchscreen display, drag their finger along the display surface toward a map location shown in the AR user interface. In one embodiment, when the user releases their finger from their mobile device touchscreen display, that map location may be set as the selected object's home location.

According to some examples, the method includes other user actions at block 2516. It will be readily apprehended by one of ordinary skill in the art that a number of user interactions with a mobile device touchscreen display may be interpretable as triggers for any number of algorithmic actions supported by the robotic control system. The user may re-tap a selected object to deselect it. A user may be presented with a save and exit control, or a control to exit the AR user interface without saving. Other tabs in an application that includes the AR user interface may provide the user with additional actions. It will also be readily apprehended that a computing device without a touch screen may also support use of the AR user interface, and may thus be used to perform the same operational actions at a user's instigation, though the user actions initiating those actions may differ. The user may click a mouse instead of tapping a screen. The user may use voice commands. The user may use the tab key, arrow keys, and other keys on a keyboard connected to the computing device. This process represents an exemplary user interaction with the AR user interface in support of the disclosed solution.

Once a user interaction for one selected tidyable object is completed, this process may repeat, allowing the selection of a next object and a next, until the user is finished interacting with the AR user interface.

Figure 26A:
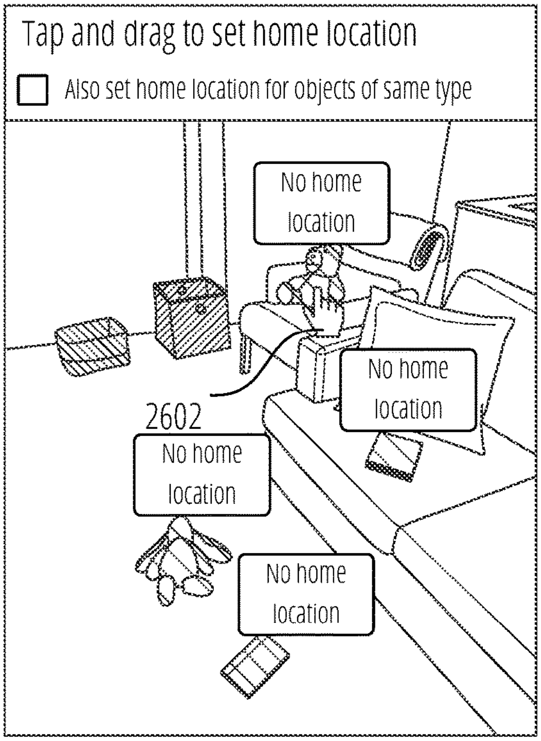
FIG. 26A-FIG. 26I illustrate user interactions with an AR user interface 2600 in accordance with one embodiment.
Figure 26B:
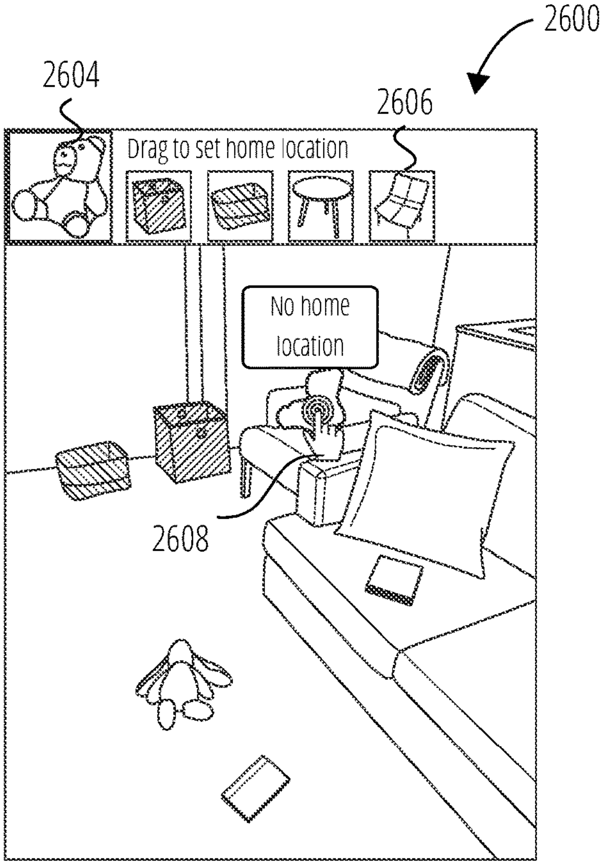

FIG. 26A-FIG. 26I illustrate exemplary user interactions with an AR user interface 2600 providing an augmented reality view in accordance with one embodiment. FIG. 26A and FIG. 26B show exemplary AR user interactions for setting a home location of a bear to be the chair the bear is currently sitting on. The user may first tap to select an object 2602 such as the bear to generate a user input signal. The AR user interface 2600 may accept that user input signal, and with an object selected and identified 2604, the AR user interface 2600 may display a list of suggested home locations 2606. The user may then perform a quick touch and release action 2608 to set the bear's home location to its current location, the AR user interface 2600 accepting this additional user input signal.

Figure 26C:
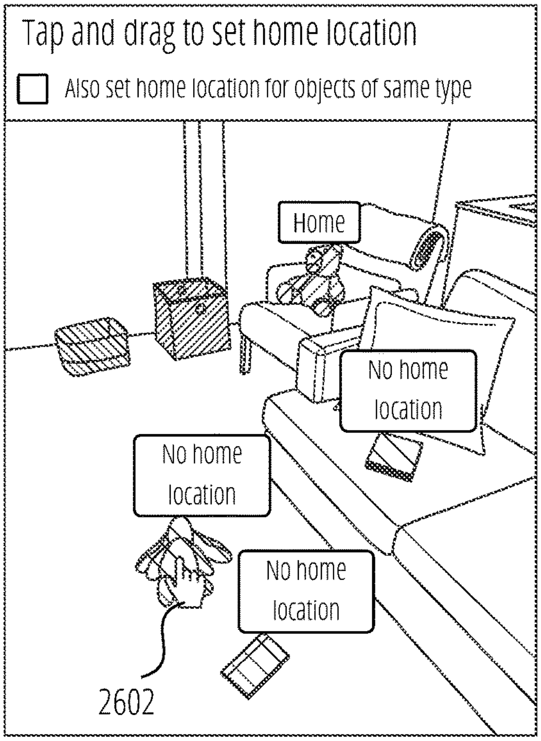
Figure 26D:
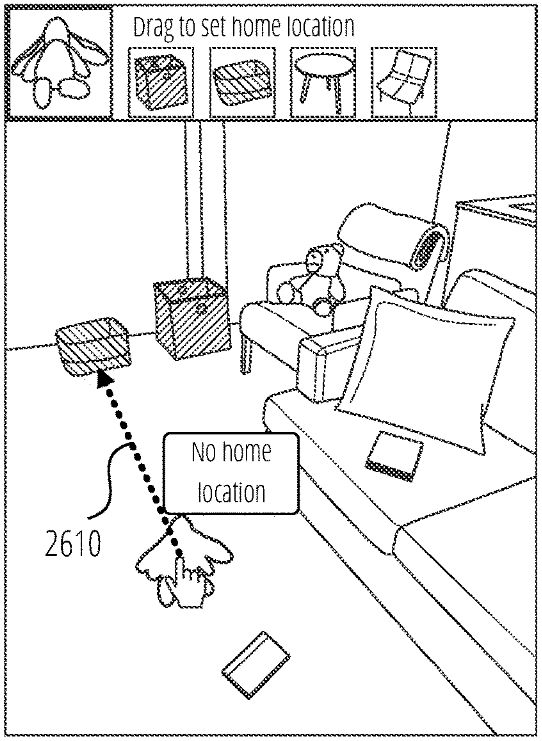

FIG. 26C and FIG. 26D illustrate exemplary AR user interactions for setting a home location of a stuffed rabbit to be a bin across the room. The user may tap to select an object 2602 such as the rabbit, then perform a drag to a map location action 2610 to set that map location, i.e., the dragged-to bin, as the rabbit's home location.

Figure 26E:
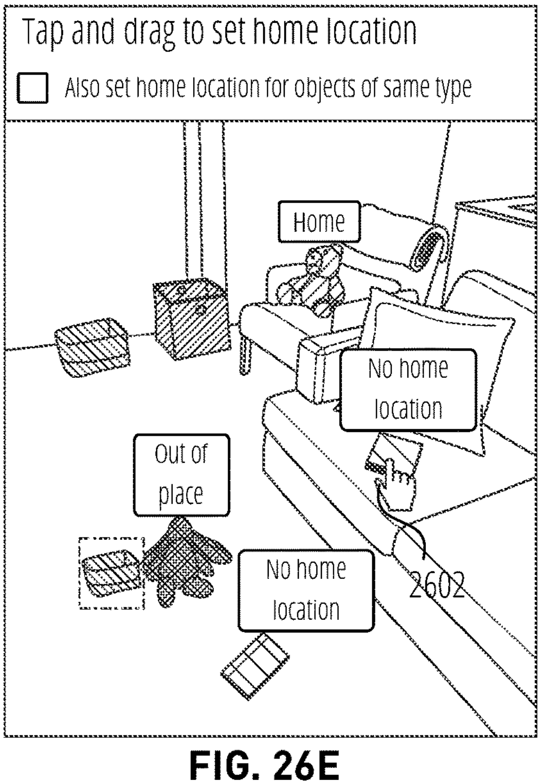
Figure 26F:
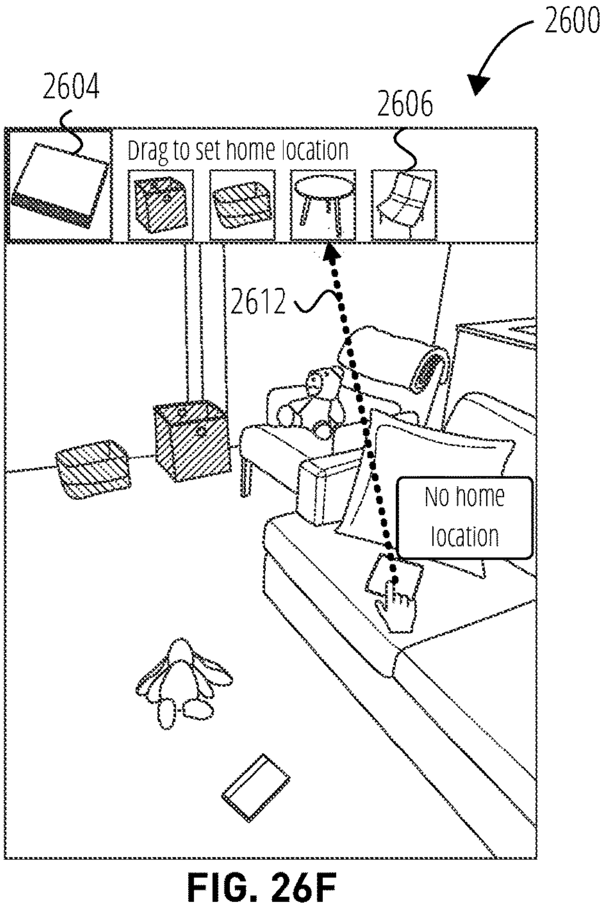

FIG. 26E and FIG. 26F illustrate exemplary AR user interactions for setting a home location of a first book to be a coffee table. The user may tap to select an object 2602 such as the first book. The user may then perform a drag to suggested home location action 2612 to identify one of the home locations in the suggested home locations 2606 bar (i.e., the coffee table) as the desired home location for that book.

Figure 26G:
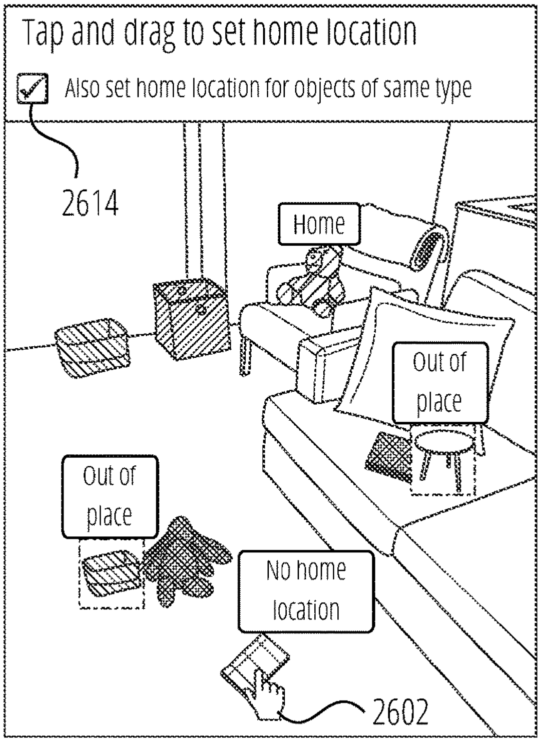
Figure 26H:
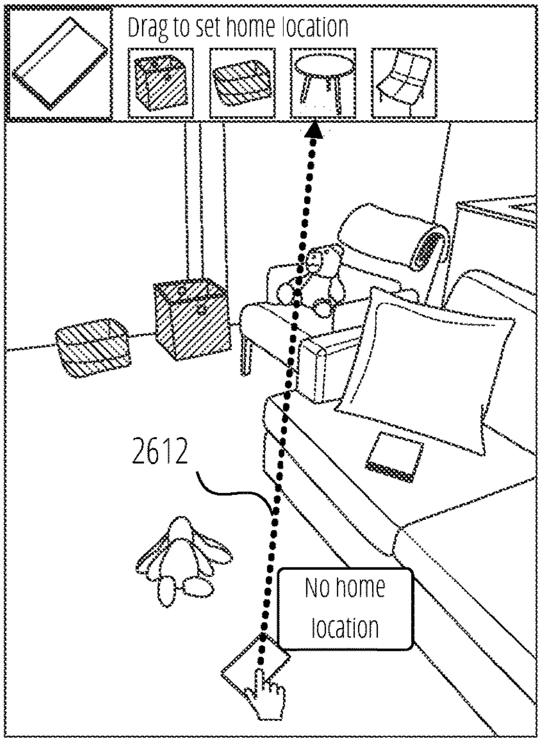

FIG. 26G and FIG. 26H illustrate exemplary AR user interactions for setting a home location of a second book and other books to be the coffee table. The user may tap to select an object 2602 such as the second book. The user may then select the check box to set selection for multiple objects of the same type 2614. In this way, when the user performs the drag to suggested home location action 2612 (i.e., the coffee table) for the selected book, this also sets the coffee table as the home location for other objects of type "book".

Figure 26I:
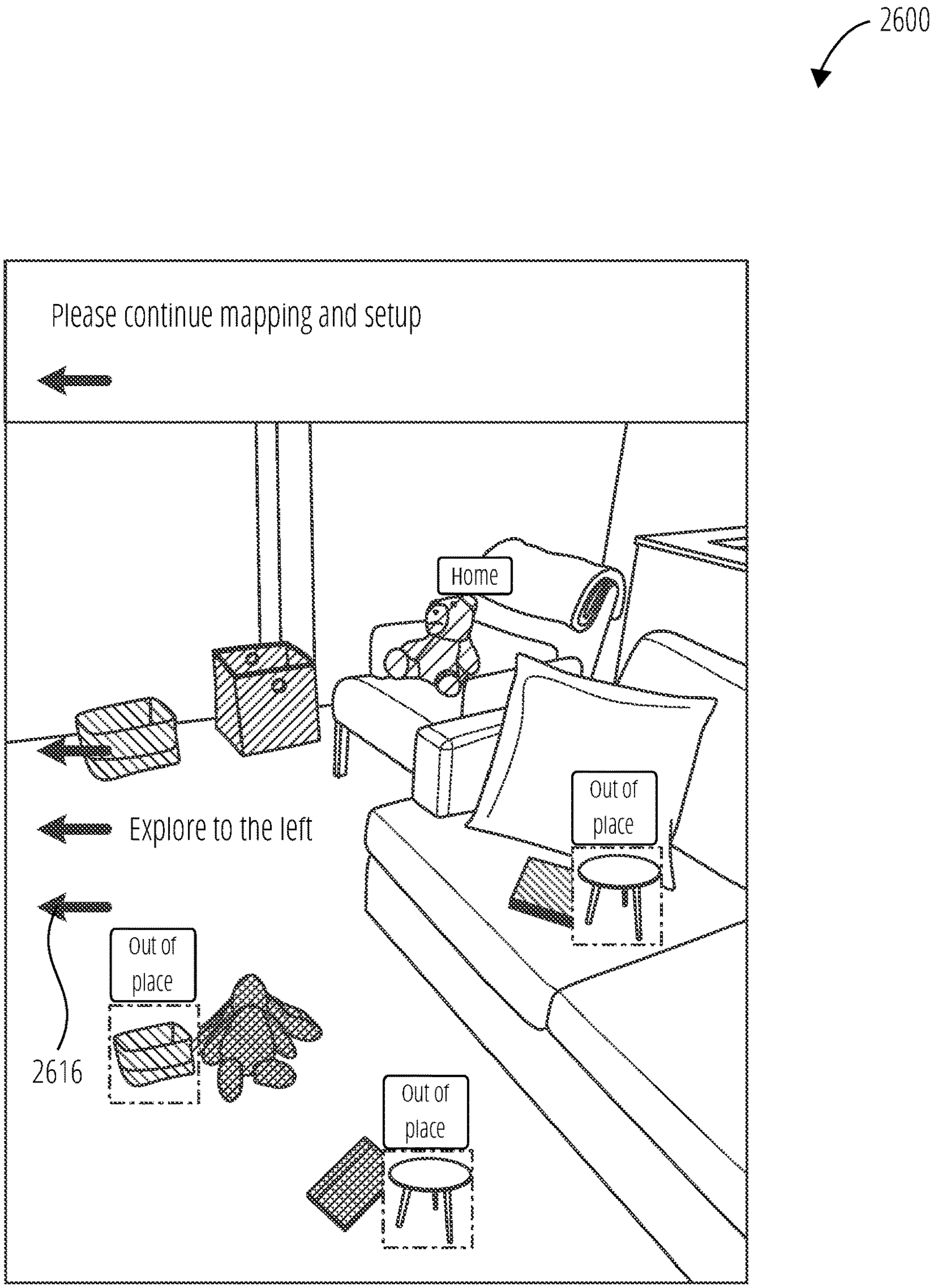

In FIG. 26I, the AR user interface 2600 guides the user to explore another scene 2616 in order to continue mapping and configuring operational task rules in other areas of the home.

In the augmented reality interface, a bar of suggested home locations 2606 may be displayed for a specific object, for an object type, or for a group of objects. These suggested home locations may be generated in several ways:

- Previous location of target object: There may be a global database of known tidyable objects that gets updated both when the robot re-identifies a specific object and when a mobile device re-identifies a specific object. Suggested home locations 2606 may be generated based on where an object has been previously located in the environment.
- Home location of similar objects: The home location of objects with similar properties (e.g., type, size, or pattern) may be used to generate recommendations. For example, if the home location of other stuffed animals is set to a bed, the bed may be recommended as a home location for other stuffed animals.
- Label matching: Bin labels may include a human- and robot-readable category name, such as "LEGO" or "balls". These labels may be used to generate recommendations for objects that have a similar type.
- Previous location of similar objects: There may be a global database of known tidyable objects that may include previous locations of objects that have similar properties (e.g., type, size or pattern) that may be used to generate recommendations. For example, if a shelf commonly has books on it, the shelf may be recommended as a home location for a target object of type "book".

Figure 27:
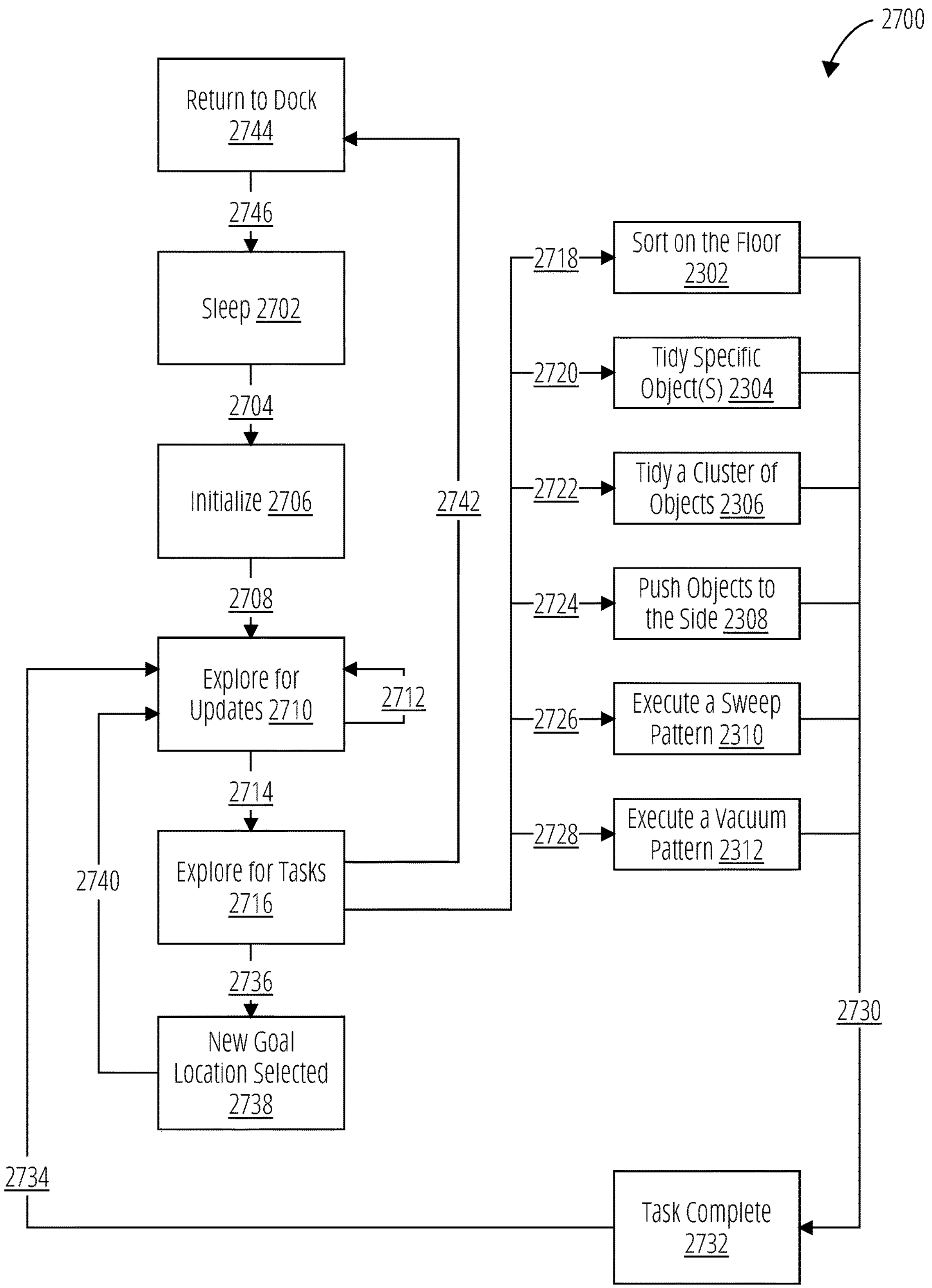
FIG. 27 illustrates a robot operation state diagram 2700 in accordance with one embodiment.

FIG. 27 illustrates a robot operation state diagram 2700 in accordance with one embodiment. A tidying robot may begin in a sleep 2702 state. In this sleep 2702 state, the robot may be sleeping and charging at the charging station 700.

When the robot wakes up 2704, it may transition to an initialize 2706 state. During the initialize 2706 state, the robot may perform a number of system checks and functions preparatory to its operation, including loading existing maps.

Once the robot is ready 2708, it may transition to an explore for updates 2710 state. During the explore for updates 2710 state, the robot may update its global map and the robot may be localized within that map by processing video frames captured by the robot's cameras and other sensor data. The robot keeps exploring 2712 until the map is updated and the robot is localized 2714.

Once the map is updated and the robot is localized 2714, the robot may transition to an explore for tasks 2716 state. In its explore for tasks 2716 state, the robot may compare a prioritized task list against map information to find its next task for execution. In another embodiment, the robot may be instructed to navigate a pattern throughout the environment looking for tasks to perform. In one embodiment, the prioritized task list may indicate the robot is to perform a process such as the exemplary multi-stage tidying routine 2300. Where the robot finds objects to sort 2718, it may perform block 2302 of the exemplary multi-stage tidying routine 2300. Where the robot finds specific objects to tidy 2720, it may perform block 2304 of the exemplary multi-stage tidying routine 2300 after performing block 2302 as needed. Where the robot finds a cluster of objects to tidy 2722, it may perform block 2306 of the exemplary multi-stage tidying routine 2300 after performing block 2302 and block 2304 as needed. Where the robot finds objects to be pushed to the side 2724, it may perform block 2308 of the exemplary multi-stage tidying routine 2300 after performing blocks 2302 through 2306 as needed. Where the robot finds an area that needs sweeping 2726, it may perform block 2310 of the exemplary multi-stage tidying routine 2300 after performing blocks 2302 through 2308 as needed. Where the robot finds an area that needs vacuuming 2728, it may perform block 2312 of the exemplary multi-stage tidying routine 2300 after performing blocks 2302 through 2310 as needed. In one embodiment, the robot may determine that an area needs to be mopped after it has been swept and/or vacuumed and may perform a mopping task after block 2310 or block 2312. Once the robot determines a task is finished 2730, it may mark the task complete 2732, then it continues exploring 2734. The robot may then transition back through the explore for updates 2710 state and the explore for tasks 2716 state.

If the robot selects a new goal location 2736, it may transition from the explore for tasks 2716 state to the new goal location selected 2738 state, allowing it to view and map previously unobserved scenes in the environment. The robot navigates to the new location 2740 and returns to the explore for updates 2710 state.

While the robot is in the explore for tasks 2716 state, if it determines its battery is low or there is nothing to tidy 2742, it may transition to the return to dock 2744 state. In this state, the robot may select a point near its charging station 700 as its goal location, may navigate to that point, and may then dock with the charging station 700 to charge. When the robot is docked and charging 2746, it may return to the sleep 2702 state.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

LISTING OF DRAWING ELEMENTS

100 robot
102 chassis
104 mobility system
106 sensing system
108 capture and containment system
110 scoop
112 scoop arm
114 scoop arm pivot point
116 pusher pad
118 pusher pad arm
120 pad pivot point
122 pad arm pivot point
124 camera
126 front camera
128 rear camera
130 lidar sensor
132 IMU sensor
134 communications
136 right front wheel
138 left front wheel
140 right rear wheel
142 left rear wheel
144 front right camera
146 front left camera
148 rear left camera
150 rear right camera
**200*a*** lowered scoop position and lowered pusher position
**200*b*** lowered scoop position and raised pusher position
**200*c*** raised scoop position and raised pusher position
**200*d*** pusher pads extended
**200*e*** pusher pads retracted
202 front
204 lowered pusher position
206 lowered scoop position
208 raised pusher position
210 containment area
212 raised scoop position
214 rear
216 extended pusher pads
218 closed pusher pads
**300*a*** lowered scoop position and lowered pusher position
**300*b*** lowered scoop position and raised pusher position
**300*c*** raised scoop position and raised pusher position
302 same point of connection
**400*a*** lowered scoop position and lowered pusher position
**400*b*** lowered scoop position and raised pusher position
**400*c*** raised scoop position and raised pusher position
402 different point of connection
500 front drop position
502 scoop pivot point
600 tidying robot
602 motor
604 motor
606 motor
608 linear actuator
610 motor
612 motor
614 vacuum compartment
616 intake port
618 rotating brush
620 dirt collector
622 dirt release latch
624 filter
626 fan
628 motor
630 exhaust port
632 charge connector
634 battery
636 airflow
638 tidyable object
640 bin
642 single rear wheel
700 charging station
702 charge connector
704 power source connection
706 vacuum emptying system
708 intake port
710 filter bag
712 fan
714 motor
716 exhaust port
718 air flow
800 tidying robot interaction with charging station
802 airflow
804 airflow
900 tidying robot
902 pusher pad inner surface
904 pusher pad outer surface
906 hook
908 mop pad

1000 tidying robot interacting with drawers
1002 cabinet
1004 drawer
1006 handle
1008 engage
1010 drive backward
1012 pull inward
1014 raise
1016 rotate
1018 drive forward
1020 push outward
1100 tidying robot
1102 gripper arm
1104 gripper pivot point
1106 actuated gripper
1108 gripper tip
1200 tidying robot
1202 passive gripper
1302 recessed area
1304 stowed position
1400 tidying robot
1402 linear actuator
1500 robotic control system
1502 CPU
1504 input devices
1506 memory
1508 output devices
1510 storage devices
1512 network interface
1514 logic
1516 machine learning model
1518 global database
1520 robot instruction database
1600 video-feed segmentation routine
1602 block
1604 block
1606 block
1608 panoptic segmentation model
1610 image of a scene
1612 segmented image
1614 objects separated into static objects, movable objects, and tidyable objects
1616 static object
1618 movable object
1620 tidyable object
1700 static object identification routine
1702 block
1704 block
1706 block
1708 block
1710 block
1712 block
1714 block
1716 block
1718 block
1720 block
1722 block
1724 block
1726 block
1728 block
1730 block
1800 movable object identification routine
1802 block
1804 block
1806 block
1808 block
1900 tidyable object identification routine
1902 block
1904 block
1906 block
1908 block
2000 object identification with fingerprints
2002 query object
2004 known object
2006 known object
2008 query object fingerprint
2010 known object fingerprint
2012 query object embedding
2014 known object embedding
2016 query object embedding
2018 known object embedding
2020 query object embedding
2022 known object embedding
2024 distance function
2026 similarity function
2028 distance vectors
2030 probability of a match
2032 no match
2034 match
2036 known object fingerprint
2038 known object embedding
2040 known object embedding
2042 known object embedding
2044 distance vectors
2046 probability of a match
2100 map configuration routine
2102 user
2104 mobile computing device
2106 block
2108 block
2110 block
2112 global map
2114 user input signal
2116 bounded area selection signal
2118 label selection signal
2200 floor map
2202 starting state
2204 initial bounded areas
2206 additional bounded areas
2208 area labels
2210 named bounded areas
2212 area-based rules
2214 time rule
2216 time rule
2218 object rule
2220 object rule
2222 category rule
2224 category rule
2226 category rule
2228 category rule
2300 exemplary multi-stage tidying routine
2302 block
2304 block
2306 block
2308 block
2310 block
2312 block
2314 block
2400 AR user routine
2402 block
2404 block
2406 block
2408 block
2410 block 2412 block
2500 tidyable object home location identification routine
2502 block
2504 block
2506 block
2508 block
2510 block
2512 block
2514 block
2516 block
2600 AR user interface
2602 tap to select an object
2604 identified
2606 suggested home locations
2608 quick touch and release action
2610 drag to a map location action
2612 drag to suggested home location action
2614 set selection for multiple objects of the same type
2616 explore another scene
2700 robot operation state diagram
2702 sleep
2704 wakes up
2706 initialize
2708 robot is ready
2710 explore for updates
2712 keeps exploring
2714 the map is updated and the robot is localized
2716 explore for tasks
2718 finds objects to sort
2720 finds specific objects to tidy
2722 finds a cluster of objects to tidy
2724 finds objects to be pushed to the side
2726 finds an area that needs sweeping
2728 finds an area that needs vacuuming
2730 is finished
2732 task complete
2734 continues exploring
2736 selects a new goal location
2738 new goal location selected
2740 navigates to the new location
2742 battery is low or there is nothing to tidy
2744 return to dock
2746 is docked and charging

What is claimed is:

1. A method comprising:

receiving, at a mobile device camera, a live video feed comprising a plurality of images capturing an environment to be tidied;

running a panoptic segmentation model to assign a semantic label, an instance identifier, and a movability attribute to each pixel in each image of the live video feed, thereby producing a segmented image for each scene, wherein the instance identifier uniquely identifies the pixel for ease of reference, and wherein the movability attribute identifies the pixel as representing a static object, a movable object, or a tidyable object;

detecting static objects, movable objects, and tidyable objects from each segmented image based on the movability attribute, wherein reidentification fingerprints are captured for each object identified in the segmented image;

removing the movable objects and the tidyable objects from each scene to create a static scene;

generating keypoints for the static scene;

generating a local static point cloud including a grid of points from the pixels representing the static objects and the keypoints from the static scene;

comparing the reidentification fingerprints for each static object in the static scene against reidentification fingerprints for known static objects to detect visual matches to the known static objects, wherein the reidentification fingerprints for the known static objects are stored in a global database in communication with the mobile device;

determining matches between the local static point cloud and a global point cloud using matching static objects and matching the keypoints from the static scene;

determining a current pose of the mobile device camera relative to a global map, wherein the global map is a previously saved map of the environment to be tidied;

merging the local static point cloud into the global point cloud and removing duplicate points to update the current pose of the mobile device camera on the global map;

saving a location record for each static object to the global database, wherein the location record includes a timestamp and a location of each static object on the global map, on condition the location record for a static object is inconsistent with past location records stored in the global database for the static object, indicating that the static object has been moving:

generating an inconsistent static object location alert;

providing the inconsistent static object location alert to a robotic control system of a tidying robot as feedback to the robotic control system to instruct the tidying robot to perform at least one robot operation;

reclassifying the static object as a reclassified movable object by updating the movability attribute in the global database; and updating the global map to reflect the reclassified movable object;

prioritizing operational task rules based on at least one of the movability attributes and the updated movability attributes; and instructing the robotic control system of the tidying robot to perform the at least one robot operation utilizing the operational task rules and a robot instruction database.

2. The method of claim 1, wherein the mobile device is one of a mobile computing device operated by a user and the tidying robot.

3. The method of claim 1, further comprising:

generating a local movable point cloud using a center coordinate of each movable object;

using the current pose of the mobile device camera on the global map to convert the local movable point cloud to a global coordinate frame;

comparing the reidentification fingerprints for each movable object in the scene against reidentification fingerprints for known movable objects to detect visual matches to the known movable objects, wherein the reidentification fingerprints for the known movable objects are stored in the global database; and saving the location record for each movable object to the global database, wherein the location record includes the timestamp and a location of each movable object on the global map.

4. The method of claim 1, further comprising:

generating a local tidyable point cloud using a center coordinate of each tidyable object;

using the current pose of the mobile device camera on the global map to convert the local tidyable point cloud to a global coordinate frame;

comparing the reidentification fingerprints for each tidyable object in the scene against reidentification fingerprints for known tidyable objects to detect visual matches to the known tidyable objects, wherein the reidentification fingerprints for the known tidyable objects are stored in the global database; and saving the location record for each tidyable object to the global database, wherein the location record includes the timestamp and a location of each tidyable object on the global map.

5. The method of claim 1, further comprising:

saving the reidentification fingerprints for each static object, each movable object, and each tidyable object to the global database.

6. The method of claim 1, further comprising:

determining at least one bounded area on the global map by detecting areas bounded by static objects;

generating a label for the at least one bounded area to create a named bounded area based on at least one of the static objects, the movable objects, and the tidyable objects identified in the at least one bounded area; and defining at least one operational task rule that is an area-based rule using the named bounded area, wherein the area-based rule controls performance of the robot operation when the tidying robot is located in the named bounded area.

7. The method of claim 1, further comprising:

displaying an augmented reality view to a user of the global map of the environment to be tidied; and accepting a user input signal based on the augmented reality view indicating at least one of:

selection of a tidyable object detected in the environment to be tidied;

identification of a home location for the selected tidyable object;

custom categorization of the selected tidyable object;

identification of a portion of the global map as a bounded area;

generation of a label for the bounded area to create a named bounded area; and definition of at least one operational task rule that is an area-based rule using the named bounded area, wherein the area-based rule controls performance of the robot operation when the tidying robot is located in the named bounded area.

8. The method of claim 7, wherein the area-based rule is at least one of:

a time rule controlling the performance of the robot operation based on the timestamp;

an object rule controlling the performance of the robot operation based on detecting a specific tidyable object; and a category rule controlling the performance of the robot operation based on detecting a tidyable object of a specific category.

9. The method of claim 4, further comprising:

saving new reidentification fingerprints for each tidyable object to the global database.

10. The method of claim 1, wherein the robot operation comprises at least one of:

exploring for updates to the global map and the current pose of the tidying robot camera with respect to the global map;

selecting and navigating to a goal location on the global map;

exploring the goal location for tasks by comparing a prioritized task list against scene data and the global map to detect a next task, wherein the operational task rules for each task in the prioritized task list include a task priority;

navigating a pattern throughout the environment to be tidied to detect the next task;

using the operational task rules to determine the next task; and completing the next task.

11. The method of claim 10, wherein the prioritized task list comprises:

a sort tidyable objects on a floor of the environment task having the task priority of 1;

a tidy specific tidyable objects task having the task priority of 2;

a tidy clusters of tidyable objects task having the task priority of 3;

a push tidyable objects to a side of a room task having the task priority of 4;

an execute a sweep pattern task having the task priority of 5; and an execute a vacuum pattern task having the task priority of 6.

12. A computing apparatus comprising:

a processor; and a memory storing instructions that, when executed by the processor, configure the apparatus to:

receive, at a mobile device camera, a live video feed comprising a plurality of images capturing an environment to be tidied;

run a panoptic segmentation model to assign a semantic label, an instance identifier, and a movability attribute to each pixel in each image of the live video feed, thereby producing a segmented image for each scene, wherein the instance identifier uniquely identifies the pixel for ease of reference, and wherein the movability attribute identifies the pixel as representing a static object, a movable object, or a tidyable object;

detect static objects, movable objects, and tidyable objects from each segmented image based on the movability attribute, wherein reidentification fingerprints are captured for each object identified in the segmented image;

remove the movable objects and the tidyable objects from each scene to create a static scene;

generate keypoints for the static scene;

generate a local static point cloud including a grid of points from the pixels representing the static objects and the keypoints from the static scene;

compare the reidentification fingerprints for each static object in the static scene against reidentification fingerprints for known static objects to detect visual matches to the known static objects, wherein the reidentification fingerprints for the known static objects are stored in a global database in communication with the mobile device;

determine matches between the local static point cloud and a global point cloud using matching static objects and matching the keypoints from the static scene;

determine a current pose of the mobile device camera relative to a global map, wherein the global map is a previously saved map of the environment to be tidied;

merge the local static point cloud into the global point cloud and removing duplicate points to update the current pose of the mobile device camera on the global map;

save a location record for each static object to the global database, wherein the location record includes a timestamp and a location of each static object on the global map, on condition the location record for a static object is inconsistent with past location records stored on the global database for the static object, indicate that the static object has been moving:

generate an inconsistent static object location alert;

provide the inconsistent static object location alert to a robotic control system of a tidying robot as feedback to the robotic control system to instruct the tidying robot to perform at least one robot operation;

reclassify the static object as a reclassified movable object by updating the movability attribute in the global database; and update the global map to reflect the reclassified movable object;

prioritize operational task rules based on at least one of the movability attributes and the updated movability attributes; and instruct the robotic control system of the tidying robot to perform the at least one robot operation utilizing the operational task rules and a robot instruction database.

13. The computing apparatus of claim 12, wherein the mobile device is one of a mobile computing device operated by a user and the tidying robot.

14. The computing apparatus of claim 12, wherein the instructions further configure the apparatus to:

generate a local movable point cloud using a center coordinate of each movable object;

use the current pose of the mobile device camera on the global map to convert the local movable point cloud to a global coordinate frame;

compare the reidentification fingerprints for each movable object in the scene against reidentification fingerprints for known movable objects to detect visual matches to the known movable objects, wherein the reidentification fingerprints for the known movable objects are stored in the global database; and save the location record for each movable object to the global database, wherein the location record includes the timestamp and a location of each movable object on the global map.

15. The computing apparatus of claim 12, wherein the instructions further configure the apparatus to:

generate a local tidyable point cloud using a center coordinate of each tidyable object;

use the current pose of the mobile device camera on the global map to convert the local tidyable point cloud to a global coordinate frame;

compare the reidentification fingerprints for each tidyable object in the scene against reidentification fingerprints for known tidyable objects to detect visual matches to the known tidyable objects, wherein the reidentification fingerprints for the known tidyable objects are stored in the global database; and save the location record for each tidyable object to the global database, wherein the location record includes the timestamp and a location of each tidyable object on the global map.

16. The computing apparatus of claim 12, wherein the instructions further configure the apparatus to:

save the reidentification fingerprints for each static object, each movable object, and each tidyable object to the global database.

17. The computing apparatus of claim 12, wherein the instructions further configure the apparatus to:

determine at least one bounded area on the global map by detecting areas bounded by static objects;

generate a label for the at least one bounded area to create a named bounded area based on at least one of the static objects, the movable objects, and the tidyable objects identified in the at least one bounded area; and define at least one operational task rule that is an area-based rule using the named bounded area, wherein the area-based rule controls performance of the robot operation when the tidying robot is located in the named bounded area.

18. The computing apparatus of claim 12, wherein the instructions further configure the apparatus to:

display an augmented reality view to a user of the global map of the environment to be tidied; and accept a user input signal based on the augmented reality view indicating at least one of:

selection of a tidyable object detected in the environment to be tidied;

identification of a home location for the selected tidyable object;

custom categorization of the selected tidyable object;

identification of a portion of the global map as a bounded area;

generation of a label for the bounded area to create a named bounded area; and definition of at least one operational task rule that is an area-based rule using the named bounded area, wherein the area-based rule controls performance of the robot operation when the tidying robot is located in the named bounded area.

19. The computing apparatus of claim 12, wherein the robot operation comprises at least one of:

explore for updates to the global map and the current pose of the tidying robot camera with respect to the global map;

select and navigate to a goal location on the global map;

explore the goal location for tasks by comparing a prioritized task list against scene data and the global map to detect a next task, wherein the operational task rules for each task in the prioritized task list include a task priority;

navigate a pattern throughout the environment to be tidied to detect the next task;

use the operational task rules to determine the next task; and complete the next task.

20. A method comprising:

receiving, at a mobile device camera, a live video feed capturing an environment to be tidied, wherein the mobile device is one of a mobile computing device operated by a user and a tidying robot;

processing the live video feed, the live video feed comprising images of scenes, to display an augmented reality view to the user of a global map of the environment to be tidied;

running a panoptic segmentation model to assign a semantic label, an instance identifier, and a movability attribute to each pixel in each image, thereby producing a segmented image for each scene, wherein the instance identifier uniquely identifies the pixel for ease of reference, and wherein the movability attribute identifies the pixel as representing a static object, a movable object, or a tidyable object;

separating, from the segmented image for each scene, static objects from movable objects and tidyable objects;

generating reidentification fingerprints, in each scene, for each static object, each movable object, and each tidyable object;

placing the reidentification fingerprints into a global database including known static objects, known movable objects, and known tidyable objects;

generating keypoints for a static scene with each movable object and each tidyable object removed;

determining a basic room structure using segmentation, wherein the basic room structure includes at least one of a floor, a wall, and a ceiling;

determining an initial pose of the mobile device camera relative to a floor plane;

generating a local static point cloud including a grid of points from the pixels representing the static objects and the keypoints from the static scene;

comparing each static object in the static scene against the global database to find a visual match to the known static objects using the reidentification fingerprints;

determining matches between the local static point cloud and a global point cloud using matching static objects and matching the keypoints from the static scene;

determining a current pose of the mobile device camera relative to the global map, wherein the global map is a previously saved map of the environment to be tidied;

merging the local static point cloud into the global point cloud and removing duplicate points to update the current pose of the mobile device camera on the global map;

saving, to the global database, a location of each static object on the global map and a timestamp;

updating the global database with an expected location of each static object on the global map based on past location records, on condition the past location records are inconsistent for a static object indicating that the static object has been moving:

generating an inconsistent static object location alert;

providing the inconsistent static object location alert to a robotic control system of the tidying robot as feedback to the robotic control system to instruct the tidying robot to perform at least one robot operation;

reclassifying the static object as a reclassified movable object by updating the movability attribute in the global database; and updating the global map to reflect the reclassified movable object;

generating a local movable point cloud using a center coordinate of each movable object;

using the current pose of the mobile device camera on the global map to convert the local movable point cloud to a global coordinate frame;

comparing each movable object in the scene against the global database to find a visual match to the known movable objects using the reidentification fingerprints; and saving, to the global database, a location of each movable object on the global map and the timestamp;

generating a local tidyable point cloud using a center coordinate of each tidyable object;

using the current pose of the mobile device camera on the global map to convert the local tidyable point cloud to the global coordinate frame;

comparing each tidyable object in the scene against the global database to find a visual match to the known tidyable objects using the reidentification fingerprints; and saving, to the global database, a location of each tidyable object on the global map and the timestamp;

determining a bounded area on the global map by at least one of:

receiving a bounded area selection signal from the user; and detecting areas bounded by static objects;

determining a label for the bounded area to create a named bounded area by at least one of:

receiving a label selection signal from the user; and generating the label based on at least one of the static objects, the movable objects, and the tidyable objects identified in the bounded area;

defining at least one operational task rule that is an area-based rule using the named bounded area, wherein the area-based rule is at least one of:

a time rule controlling performance of the at least one robot operation based on the timestamp;

an object rule controlling the performance of the at least one robot operation based on detecting a specific tidyable object; and a category rule controlling the performance of the at least one robot operation based on detecting a tidyable object of a specific category;

wherein the area-based rule controls the performance of the at least one robot operation when the tidying robot is located in the named bounded area;

prioritizing operational task rules based on at least one of the movability attributes and the updated movability attributes; and instructing the tidying robot to perform the at least one robot operation utilizing the operational task rules and a robot instruction database.

* * * * *